US010282617B2

(12) United States Patent
Chen et al.

(10) Patent No.: US 10,282,617 B2
(45) Date of Patent: May 7, 2019

(54) METHODS AND SYSTEMS FOR PERFORMING SLEEPING OBJECT DETECTION AND TRACKING IN VIDEO ANALYTICS

(71) Applicant: QUALCOMM Incorporated, San Diego, CA (US)

(72) Inventors: Ying Chen, San Diego, CA (US); Ning Bi, San Diego, CA (US); Yang Zhou, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 74 days.

(21) Appl. No.: 15/645,455

(22) Filed: Jul. 10, 2017

(65) Prior Publication Data

US 2018/0285647 A1 Oct. 4, 2018

Related U.S. Application Data

(60) Provisional application No. 62/477,826, filed on Mar. 28, 2017.

(51) Int. Cl.
*G06K 9/00* (2006.01)
*H04N 7/18* (2006.01)
*G06K 9/46* (2006.01)

(52) U.S. Cl.
CPC ....... *G06K 9/00718* (2013.01); *G06K 9/4652* (2013.01); *G06K 2009/00738* (2013.01)

(58) Field of Classification Search
USPC ........ 382/100, 103, 106–107, 155, 162–168, 382/173, 181, 190, 199, 209, 219, 232,
(Continued)

(56) References Cited

U.S. PATENT DOCUMENTS

2006/0170769 A1* 8/2006 Zhou .................. G06K 9/00362
348/143
2009/0290020 A1 11/2009 McLeish et al.
(Continued)

*Primary Examiner* — Seyed H Azarian
(74) *Attorney, Agent, or Firm* — Qualcomm Incorporated

(57) ABSTRACT

Methods, apparatuses, and computer-readable media are provided for maintaining blob trackers for video frames. For example, a first blob tracker maintained for a current video frame is identified. The first blob tracker is associated with a blob detected in one or more video frames. The blob includes pixels of at least a portion of a foreground object in the one or more video frames. It is determined that the first blob tracker is a first type of tracker. Trackers having the first type are associated with objects that have transitioned at least partially into a background model (referred to as sleeping objects and sleeping trackers). One or more interactions are identified between the first blob tracker and at least one other blob tracker. The at least one other blob tracker can be the first type of tracker or can be a second type of tracker that is not a sleeping tracker (the second type of tracker is not associated with an object that has transitioned at least partially into the background model. A characteristic of the first blob tracker can then be modified based on the identified one or more interactions. Modifying the characteristic of the first blob tracker can include transitioning the first blob tracker from the first type of tracker to the second type of tracker, updating an appearance model of the first blob tracker, and/or other suitable characteristic of the first blob tracker.

30 Claims, 39 Drawing Sheets

(58) Field of Classification Search
USPC ................ 382/254, 274, 276, 286–291, 305; 348/143
See application file for complete search history.

(56) References Cited

U.S. PATENT DOCUMENTS

| | | |
|---|---|---|
| 2013/0028474 A1 | 1/2013 | Silver et al. |
| 2013/0051613 A1* | 2/2013 | Bobbitt .............. G06K 9/00771 382/103 |
| 2014/0003713 A1* | 1/2014 | Seow ....................... G06T 5/009 382/164 |
| 2015/0139484 A1* | 5/2015 | Wu .................... G06K 9/00624 382/103 |
| 2016/0063344 A1 | 3/2016 | Fan et al. |
| 2016/0225121 A1 | 8/2016 | Gupta et al. |

* cited by examiner

2100G

2100H

2200E

2200F

METHODS AND SYSTEMS FOR PERFORMING SLEEPING OBJECT DETECTION AND TRACKING IN VIDEO ANALYTICS

CROSS-REFERENCE TO RELATED APPLICATIONS

This application claims the benefit of U.S. Provisional Application No. 62/477,826, filed Mar. 28, 2017, which is hereby incorporated by reference, in its entirety and for all purposes.

FIELD

The present disclosure generally relates to video analytics, and more specifically to techniques and systems for detecting and tracking sleeping or stationary objects in video analytics.

BACKGROUND

Many devices and systems allow a scene to be captured by generating video data of the scene. For example, an Internet protocol camera (IP camera) is a type of digital video camera that can be employed for surveillance or other applications. Unlike analog closed circuit television (CCTV) cameras, an IP camera can send and receive data via a computer network and the Internet. The video data from these devices and systems can be captured and output for processing and/or consumption.

Video analytics, also referred to as Video Content Analysis (VCA), is a generic term used to describe computerized processing and analysis of a video sequence acquired by a camera. Video analytics provides a variety of tasks, including immediate detection of events of interest, analysis of pre-recorded video for the purpose of extracting events in a long period of time, and many other tasks. For instance, using video analytics, a system can automatically analyze the video sequences from one or more cameras to detect one or more events. In some cases, video analytics can send alerts or alarms for certain events of interest. More advanced video analytics is needed to provide efficient and robust video sequence processing.

BRIEF SUMMARY

In some embodiments, techniques and systems are described for performing sleeping object detection and tracking in video analytics. Video analytics can be based on background subtraction to detect and track motion objects. Such a video analytics system can contain a blob (or object) detection component and a blob (or object) tracking component. The blob detection component can use data from one or more video frames to generate or identify blobs for the one or more video frames. A blob represents at least a portion of one or more objects in a video frame (also referred to as a "picture"). Blob detection can utilize background subtraction to determine a background portion of a scene and a foreground portion of scene. Blobs can then be detected based on the foreground portion of the scene. The detected blobs can be provided, for example, for blob processing, object tracking by the blob (or object) tracking component, and other video analytics functions. For example, temporal information of the blobs can be used to identify stable objects or blobs so that a tracking layer can be established.

Background subtraction encounters issues when dealing with sleeping objects. A sleeping object is an object moving through a scene that becomes stationary or static. A blob (and the object represented by the blob) can be detected and further tracked based on background subtraction as long as the object is in motion. However, in some cases, it is possible for a moving object in a scene to stop moving. For such a sleeping object, the background subtraction model will transition the pixels of the object from foreground pixels to background pixels due to the nature of background subtraction adapting to local changes quickly, causing the object and its blob to fade into the background and no longer be detected and tracked. Techniques and systems described herein can detect sleeping objects so that the sleeping objects can continue to be tracked using video analytics.

Even after a sleeping object has been detected, it may be difficult and complicated to deal with interactions between the sleeping object and other objects. Examples of interactions between a sleeping object and other objects can include a sleeping object that interacts with one or more other normal trackers, a sleeping object that interacts with other sleeping objects, and other possible interactions. A sleeping object may also start to move again, in which case the object will have to be tracked well with the same tracker label. Techniques and systems described herein provide a complete scheme for sleeping object tracking in a video analytics system.

According to at least one example, a method of maintaining blob trackers for video frames is provided. The method includes identifying a first blob tracker maintained for a current video frame. The first blob tracker is associated with a blob detected in one or more video frames. The blob includes pixels of at least a portion of a foreground object in the one or more video frames. The method further includes determining the first blob tracker is a first type of tracker. Trackers of the first type are associated with objects that have transitioned at least partially into a background model (referred to herein as sleeping objects and sleeping trackers). The method further includes identifying one or more interactions between the first blob tracker and at least one other blob tracker. The at least one other blob tracker is the first type of tracker or a second type of tracker. Trackers of the second type are not associated with objects that have transitioned at least partially into the background model. The method further includes modifying a characteristic of the first blob tracker based on the identified one or more interactions.

In another example, an apparatus is provided for maintaining blob trackers for video frames. The apparatus includes a processor and a memory configured to store video data associated with the video frames. The processor is configured to and can identify a first blob tracker maintained for a current video frame. The first blob tracker is associated with a blob detected in one or more video frames. The blob includes pixels of at least a portion of a foreground object in the one or more video frames. The processor is further configured to and can determine the first blob tracker is a first type of tracker. Trackers of the first type are associated with objects that have transitioned at least partially into a background model (referred to herein as sleeping objects and sleeping trackers). The processor is further configured to and can identify one or more interactions between the first blob tracker and at least one other blob tracker. The at least one other blob tracker is the first type of tracker or a second type of tracker. Trackers of the second type are not associated with objects that have transitioned at least partially into the background model. The processor is further configured to and can modify a characteristic of the first blob tracker based on the identified one or more interactions.

In another example, a non-transitory computer-readable medium is provided having stored thereon instructions that, when executed by one or more processors, cause the one or more processor to: identify a first blob tracker maintained for a current video frame, wherein the first blob tracker is associated with a blob detected in one or more video frames, the blob including pixels of at least a portion of a foreground object in the one or more video frames; determine the first blob tracker is a first type of tracker, wherein trackers of the first type are associated with objects that have transitioned at least partially into a background model; identify one or more interactions between the first blob tracker and at least one other blob tracker, the at least one other blob tracker being the first type of tracker or a second type of tracker, wherein trackers of the second type are not associated with objects that have transitioned at least partially into the background model; and modify a characteristic of the first blob tracker based on the identified one or more interactions.

In another example, an apparatus is provided for maintaining blob trackers for video frames. The apparatus includes means for identifying a first blob tracker maintained for a current video frame. The first blob tracker is associated with a blob detected in one or more video frames. The blob includes pixels of at least a portion of a foreground object in the one or more video frames. The apparatus further includes means for determining the first blob tracker is a first type of tracker. Trackers of the first type are associated with objects that have transitioned at least partially into a background model (referred to herein as sleeping objects and sleeping trackers). The apparatus further includes means for identifying one or more interactions between the first blob tracker and at least one other blob tracker. The at least one other blob tracker is the first type of tracker or a second type of tracker. Trackers of the second type are not associated with objects that have transitioned at least partially into the background model. The apparatus further includes means for modifying a characteristic of the first blob tracker based on the identified one or more interactions.

In some aspects, modifying the characteristic of the first blob tracker includes transitioning the first blob tracker from the first type of tracker to the second type of tracker. In some aspects, modifying the characteristic of the first blob tracker includes updating an appearance model of the first blob tracker.

In some aspects, the one or more identified interactions include an interaction between the first blob tracker and a second blob tracker having the second type. In such aspects, identifying the interaction comprises: determining, for a first previous video frame, the second blob tracker is not intersecting the first blob tracker, wherein the first previous video frame is obtained earlier in time than the current video frame; determining, for a second video previous frame, the second blob tracker is intersecting the first blob tracker, wherein the second previous video frame is obtained earlier in time than the current video frame and later in time than the first previous video frame; and determining, for the current video frame, the second blob tracker is not intersecting the first blob tracker.

In some aspects, in response to identifying the interaction between the first blob tracker and the second blob tracker having the second type, modifying the characteristic of the first blob tracker includes: updating an appearance model of the first blob tracker using information of the current video frame, the updated appearance model including at least one or more of a color feature space or a color mass center of pixels of the current video frame included in a previous bounding region of the first blob tracker. In some aspects, the methods, apparatuses, and computer readable medium described above further comprise comparing the updated appearance model of the first blob tracker to a previous appearance model of the first blob tracker, the previous appearance model including at least one or more of a color feature space or a color mass center of pixels of a previous video frame included in the previous bounding region of the first blob tracker; and determining whether to transition the first blob tracker from the first type to the second type based on the comparison of the updated appearance model to the previous appearance model. In some aspects, the methods, apparatuses, and computer readable medium described above further comprise transitioning the first blob tracker from the first type to the second type when the updated appearance model is not within a threshold difference from the previous appearance model. In some aspects, the methods, apparatuses, and computer readable medium described above further comprise maintaining the first blob tracker as the first type when the updated appearance model is within a threshold difference from the previous appearance model.

In some aspects, the one or more identified interactions include an interaction between the first blob tracker and a second blob tracker having the second type. In such aspects, identifying the interaction comprises: determining, for a first previous video frame, the second blob tracker is not intersecting the first blob tracker, wherein the first previous video frame is obtained earlier in time than the current video frame; determining, for a second video previous frame, the second blob tracker is intersecting the first blob tracker, wherein the second previous video frame is obtained earlier in time than the current video frame and later in time than the first previous video frame; and determining, for the current video frame, the second blob tracker is to be transitioned from the second type of tracker to the first type of tracker.

In some aspects, in response to identifying the interaction between the first blob tracker and the second blob tracker having the second type, modifying the characteristic of the first blob tracker includes: updating an appearance model of the first blob tracker using information of the current video frame, the updated appearance model including at least one or more of a color feature space or a color mass center of pixels of the current video frame included in a previous bounding region of the first blob tracker. In some aspects, the methods, apparatuses, and computer readable medium described above further comprise transitioning the second blob tracker from the second type of tracker to the first type of tracker.

In some aspects, the one or more identified interactions include an interaction between the first blob tracker and a second blob tracker having the second type. In such aspects, identifying the interaction comprises: generating, for a first previous video frame, the second blob tracker within a region covered by the first blob tracker, wherein the second blob tracker is generated as a new type of tracker; transitioning, for a second video previous frame, the second blob tracker from the new type of tracker to the second type of tracker, wherein trackers of the second type and associated blobs are output as identified blob tracker-blob pairs, and wherein the second previous video frame is obtained earlier in time than the current video frame and later in time than the first previous video frame; and determining, for the current video frame, the second blob tracker is not intersecting the first blob tracker.

In some aspects, in response to identifying the interaction between the first blob tracker and the second blob tracker having the second type, modifying the characteristic of the first blob tracker includes: comparing a size of the second blob tracker to a size of the first blob tracker; and determining whether to remove the first blob tracker from a list of maintained blob trackers based on the size comparison between the first blob tracker and the second blob tracker. In some aspects, the methods, apparatuses, and computer readable medium described above further comprise removing the first blob tracker from the list of maintained blob trackers when the size of the second blob tracker is larger than a threshold size percentage of the size of the first blob tracker. In some aspects, the methods, apparatuses, and computer readable medium described above further comprise assigning a tracker label of the first blob tracker to the second blob tracker. In some aspects, the methods, apparatuses, and computer readable medium described above further comprise maintaining the first blob tracker in the list of maintained blob trackers as a tracker of the first type when the size of the second blob tracker is not larger than a threshold size percentage of the size of the first blob tracker.

In some aspects, the one or more identified interactions include an interaction between the first blob tracker and a second blob tracker having the second type. In such aspects, identifying the interaction comprises: generating, for a first previous video frame, the second blob tracker within a region covered by the first blob tracker; and determining, for the current video frame, the second blob tracker is no longer associated with any blobs. In some aspects, in response to identifying the interaction between the first blob tracker and the second blob tracker having the second type, modifying the characteristic of the first blob tracker includes updating an appearance model of the first blob tracker using information of the current video frame, the updated appearance model including at least one or more of a color feature space or a color mass center of pixels of the current video frame included in a previous bounding region of the first blob tracker.

In some aspects, the one or more identified interactions include an interaction between the first blob tracker and at least one blob tracker having the first type. In such aspects, modifying the characteristic of the first blob tracker includes: determining an amount of intersection between the first blob tracker and the at least one blob tracker; and updating an appearance model of the first blob tracker when the amount of intersection is less than an intersection threshold, the updated appearance model including at least one or more of a color feature space or a color mass center of pixels of the current video frame included in a previous bounding region of the first blob tracker.

In some aspects, the one or more identified interactions include an interaction between the first blob tracker and at least one blob tracker having the first type. In such aspects, modifying the characteristic of the first blob tracker includes: determining an amount of intersection between the first blob tracker and the at least one blob tracker; and removing the first blob tracker from a list of maintained blob trackers when the amount of intersection is greater than an intersection threshold. In some aspects, the methods, apparatuses, and computer readable medium described above further comprise maintaining the at least one blob tracker in the list of maintained blob trackers.

In some aspects, the one or more identified interactions include an interaction between the first blob tracker and at least two blob trackers having the first type. In such aspects, modifying the characteristic of the first blob tracker includes: determining an amount of intersection between the first blob tracker and the at least two blob trackers; generating a union bounding region when the amount of intersection is greater than a maximum intersection threshold, the union bounding region including a union of a bounding region of the first blob tracker and at least two bounding regions of the at least two blob trackers; and replacing the bounding region of the first blob tracker with the union bounding region. In some aspects, the methods, apparatuses, and computer readable medium described above further comprise removing the at least two blob trackers from a list of maintained blob trackers.

In some aspects, the methods, apparatuses, and computer readable medium described above further comprise: determining the first blob tracker has not interacted with any other blob trackers for a threshold number of video frames; and updating an appearance model of the first blob tracker when the first blob tracker has not interacted with any other blob trackers for the threshold number of video frames, the updated appearance model including at least one or more of a color feature space or a color mass center of pixels of the current video frame included in a previous bounding region of the first blob tracker.

In some aspects, determining the first blob tracker is the first type of tracker includes: comparing a current bounding region of the first blob tracker for the current video frame to a previous bounding region of the first blob tracker for a previous video frame, the previous video frame being obtained earlier in time than the current video frame; determining the current bounding region has decreased in size as compared to a size of the previous bounding region; and determining a first color characteristic of pixels of the current video frame included in the previous bounding region is within a threshold difference from a second color characteristic of pixels of the previous video frame included in the previous bounding region.

In some aspects, the second type of tracker includes at least one or more of a new tracker generated for the current frame, a tracker that is output as an identified blob tracker-blob pair with an associated blob, a tracker that is not associated with any blob in the current frame, a tracker associated with a blob merged with at least one other blob, or a combination thereof.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will become more apparent upon referring to the following specification, claims, and accompanying drawings.

BRIEF DESCRIPTION OF THE DRAWINGS

Illustrative embodiments of the present invention are described in detail below with reference to the following drawing figures.

DETAILED DESCRIPTION

Figure 1:
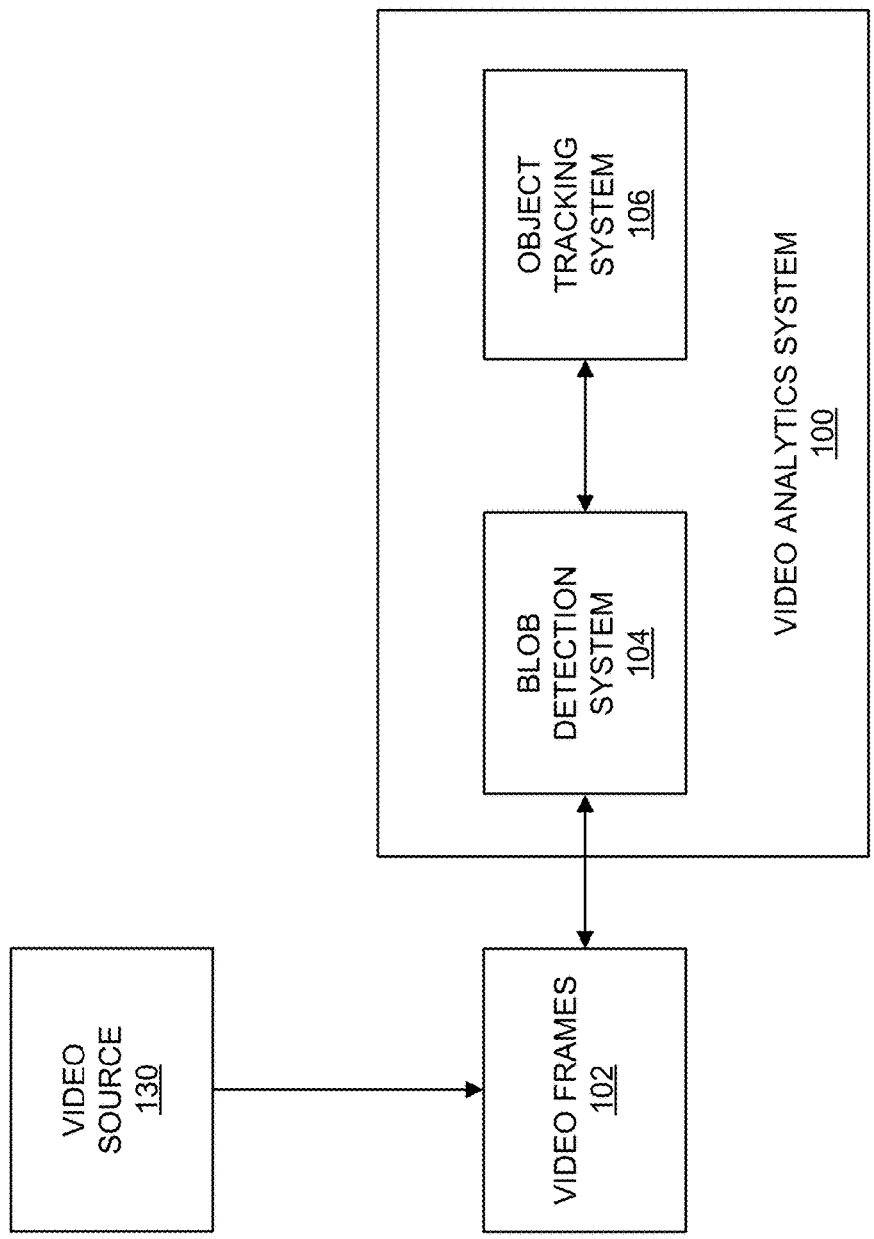
FIG. 1 is a block diagram illustrating an example of a system including a video source and a video analytics system, in accordance with some examples.

Certain aspects and embodiments of this disclosure are provided below. Some of these aspects and embodiments may be applied independently and some of them may be applied in combination as would be apparent to those of skill in the art. In the following description, for the purposes of explanation, specific details are set forth in order to provide a thorough understanding of embodiments of the invention. However, it will be apparent that various embodiments may be practiced without these specific details. The figures and description are not intended to be restrictive.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

Furthermore, embodiments may be implemented by hardware, software, firmware, middleware, microcode, hardware description languages, or any combination thereof. When implemented in software, firmware, middleware or microcode, the program code or code segments to perform the necessary tasks (e.g., a computer-program product) may be stored in a computer-readable or machine-readable medium. A processor(s) may perform the necessary tasks.

A video analytics system can obtain a sequence of video frames from a video source and can process the video sequence to perform a variety of tasks. One example of a video source source can include an Internet protocol camera (IP camera) or other video capture device. An IP camera is a type of digital video camera that can be used for surveillance, home security, or other suitable application. Unlike analog closed circuit television (CCTV) cameras, an IP camera can send and receive data via a computer network and the Internet. In some instances, one or more IP cameras can be located in a scene or an environment, and can remain static while capturing video sequences of the scene or environment.

An IP camera can be used to send and receive data via a computer network and the Internet. In some cases, IP camera systems can be used for two-way communications. For example, data (e.g., audio, video, metadata, or the like) can be transmitted by an IP camera using one or more network cables or using a wireless network, allowing users to communicate with what they are seeing. In one illustrative example, a gas station clerk can assist a customer with how to use a pay pump using video data provided from an IP camera (e.g., by viewing the customer's actions at the pay pump). Commands can also be transmitted for pan, tilt, zoom (PTZ) cameras via a single network or multiple networks. Furthermore, IP camera systems provide flexibility and wireless capabilities. For example, IP cameras provide for easy connection to a network, adjustable camera location, and remote accessibility to the service over Internet. IP camera systems also provide for distributed intelligence. For example, with IP cameras, video analytics can be placed in the camera itself. Encryption and authentication is also easily provided with IP cameras. For instance, IP cameras offer secure data transmission through already defined encryption and authentication methods for IP based applications. Even further, labor cost efficiency is increased with IP cameras. For example, video analytics can produce alarms for certain events, which reduces the labor cost in monitoring all cameras (based on the alarms) in a system.

Video analytics provides a variety of tasks ranging from immediate detection of events of interest, to analysis of pre-recorded video for the purpose of extracting events in a long period of time, as well as many other tasks. Various research studies and real-life experiences indicate that in a surveillance system, for example, a human operator typically cannot remain alert and attentive for more than 20 minutes, even when monitoring the pictures from one camera. When there are two or more cameras to monitor or as time goes beyond a certain period of time (e.g., 20 minutes), the operator's ability to monitor the video and effectively respond to events is significantly compromised. Video analytics can automatically analyze the video sequences from from the cameras and send alarms for events of interest. This way, the human operator can monitor one or more scenes in a passive mode. Furthermore, video analytics can analyze a huge volume of recorded video and can extract specific video segments containing an event of interest.

Video analytics also provides various other features. For example, video analytics can operate as an Intelligent Video Motion Detector by detecting moving objects and by tracking moving objects. In some cases, the video analytics can generate and display a bounding box around a valid object. Video analytics can also act as an intrusion detector, a video counter (e.g., by counting people, objects, vehicles, or the like), a camera tamper detector, an object left detector, an object/asset removal detector, an asset protector, a loitering detector, and/or as a slip and fall detector. Video analytics can further be used to perform various types of recognition functions, such as face detection and recognition, license plate recognition, object recognition (e.g., bags, logos, body marks, or the like), or other recognition functions. In some cases, video analytics can be trained to recognize certain objects. Another function that can be performed by video analytics includes providing demographics for customer metrics (e.g., customer counts, gender, age, amount of time spent, and other suitable metrics). Video analytics can also perform video search (e.g., extracting basic activity for a given region) and video summary (e.g., extraction of the key movements). In some instances, event detection can be performed by video analytics, including detection of fire, smoke, fighting, crowd formation, or any other suitable even the video analytics is programmed to or learns to detect. A detector can trigger the detection of an event of interest and can send an alert or alarm to a central control room to alert a user of the event of interest.

As described in more detail herein, a blob detection component of a video analytics system can generate and/or detect foreground blobs that represent at least a portion of a foreground object in a scene. The detected blobs can be used to perform various operations, such such as object tracking (also called blob tracking) or other operations described herein. Blob detection can be performed using background subtraction techniques, which may encounter issues when dealing with sleeping objects. A sleeping object is an object moving through a scene that becomes stationary or static. For instance, a blob (and the object represented by the blob) can be detected and further tracked based on background subtraction as long as the object is in motion. At some point, a moving object in a scene can stop moving, and can eventually become a sleeping object. The background subtraction model will transition the pixels of the sleeping object from foreground pixels to background pixels, causing the object and its blob to fade into the background and no longer be detected and tracked. As described in more detail below, systems and methods for detecting and tracking sleeping objects are provided for allowing objects to continue to be detected and tracked even when the objects are absorbed into the background.

FIG. 1 is a block diagram illustrating an example of a video analytics system 100. The video analytics system 100 receives video frames 102 from a video source 130. The video frames 102 can also be referred to herein as a video picture or a picture. The video frames 102 can be part of one or more video sequences. The video source 130 can include a video capture device (e.g., a video camera, a camera phone, a video phone, or other suitable capture device), a video storage device, a video archive containing stored video, a video server or content provider providing video data, a video feed interface receiving video from a video server or content provider, a computer graphics system for generating computer graphics video data, a combination of such sources, or other source of video content. In one example, the video source 130 can include an IP camera or multiple IP cameras. In an illustrative example, multiple IP cameras can be located throughout an environment, and can provide the video frames 102 to the video analytics system 100. For instance, the IP cameras can be placed at various fields of view within the environment so that surveillance can be performed based on the captured video frames 102 of the environment.

In some embodiments, the video analytics system 100 and the video source 130 can be part of the same computing device. In some embodiments, the video analytics system 100 and the video source 130 can be part of separate computing devices. In some examples, the computing device (or devices) can include one or more wireless transceivers for wireless communications. The computing device (or devices) can include an electronic device, such as a camera (e.g., an IP camera or other video camera, a camera phone, a video phone, or other suitable capture device), a mobile or stationary telephone handset (e.g., smartphone, cellular telephone, or the like), a desktop computer, a laptop or notebook computer, a tablet computer, a set-top box, a television, a display device, a digital media player, a video gaming console, a video streaming device, or any other suitable electronic device.

The video analytics system 100 includes a blob detection system 104 and an object tracking system 106. Object detection and tracking allows the video analytics system 100 to provide various end-to-end features, such as the video analytics features described above. For example, intelligent motion detection, intrusion detection, and other features can directly use the results from object detection and tracking to generate end-to-end events. Other features, such as people, vehicle, or other object counting and classification can be greatly simplified based on the results of object detection and tracking.

The blob detection system 104 can detect one or more blobs in video frames (e.g., video frames 102) of a video sequence, and the object tracking system 106 can track the one or more blobs across the frames of the video sequence. As used herein, a blob refers to foreground pixels of at least a portion of an object (e.g., a portion of an object or an entire object) in a video frame. For example, a blob can include a contiguous group of pixels making up at least a portion portion of a foreground object in a video frame. In another example, a blob can refer to a contiguous group of pixels making up at least a portion of a background object in a frame of image data. A blob can also be referred to as an object, a portion of an object, a blotch of pixels, a pixel patch, a cluster of pixels, a blot of pixels, a spot of pixels, a mass of pixels, or any other term referring to a group of pixels of an object or portion thereof. In some examples, a bounding bounding region can be associated with a blob. In some examples, a tracker can also be represented by a tracker bounding region. A bounding region of a blob or a tracker can include a a bounding box, a bounding circle, a bounding ellipse, or any other suitably-shaped region representing a tracker or blob. While examples are described herein using bounding boxes for illustrative purposes, the techniques and systems described herein can also apply using other suitably shaped bounding regions. A bounding box associated with a tracker and/or a blob can have a rectangular shape, a square shape, or other suitable shape. In the tracking layer, in case there is no need to know how the blob is formulated within a bounding box, the term blob and bounding box may be used interchangeably.

As described in more detail below, blob detection can be performed to segment moving foreground objects from the global static background in a video sequence. In some cases, there are two major steps in blob detection, including background subtraction and blob analysis. For example, blob detection can contain a background subtraction engine that detects foreground pixels and one or more foreground pixel processing engines that process and group the foreground pixels into foreground blobs for tracking purposes. In some cases, background subtraction can be performed to provide a foreground/background mask (referred to herein as a foreground mask) of a current input frame (the current frame being processed), while the blob analysis takes the foreground mask and produces foreground blobs. The foreground blobs can be represented as bounding boxes (e.g., having a rectangular, square, or other suitable shape) or other bounding region. In some examples, the blob detection system 104 and object tracking system 106 take as input a current frame, and output the metadata of each current frame. The metadata contains a list of bounding boxes (e.g., bounding boxes of the blob trackers, bounding boxes of the detected foreground blobs, or the bounding boxes of the blob trackers and the detected foreground blobs), each with a bounding box identifier (ID). In some cases, the metadata is on a per frame basis, recording the results of the blob detection and tracking systems. Such metadata can be further interrupted, depending on the particular system configuration.

As described in more detail below, blobs can be tracked using blob trackers. A blob tracker can be associated with a tracker bounding box and can be assigned a tracker identifier (ID). In some examples, a bounding box for a blob tracker in a current frame can be the bounding box of a previous blob in a previous frame for which the blob tracker was associated. For instance, when the blob tracker is updated in the previous frame (after being associated with the previous blob in the previous frame), updated information for the blob tracker can include the tracking information for the previous frame and also prediction of a location of the blob tracker in the next frame (which is the current frame in this example). The prediction of the location of the blob tracker in the current frame can be based on the location of the blob in the previous frame. A history or motion model can be maintained for a blob tracker, including a history of various states, a history of the velocity, and a history of location, of continuous frames, for the blob tracker, as described in more detail below. ( In some examples, a motion model for a blob tracker can determine and maintain two locations of the blob tracker for each frame. For example, a first location for a blob tracker for a current frame can include a predicted location in the current frame. The first location is referred to herein as the predicted location. The predicted location of the blob tracker in the current frame includes a location in a previous frame of a blob with which the blob tracker was associated. Hence, the location of the blob associated with the blob tracker in the previous frame can be used as the predicted location of the blob tracker in the current frame. A second location for the blob tracker for the current frame can include a location in the current frame of a blob with which the tracker is associated in the current frame. The second location is referred to herein as the actual location. Accordingly, the location in the current frame of a blob associated with the blob tracker is used as the actual location of the blob tracker in the current frame. The actual location of the blob tracker in the current frame can be used as the predicted location of the blob tracker in a next frame. The location of the blobs can include the locations of the bounding boxes of the blobs.

The velocity of a blob tracker can include the displacement of a blob tracker between consecutive frames. For example, the displacement can be determined between the centers (or centroids) of two bounding boxes for the blob tracker in two consecutive frames. In one illustrative example, the velocity of a blob tracker can be defined as $V_t=C_t-C_{t-1}$, where $C_t-C_{t-1}=(C_{tx}-C_{t-1x}, C_{ty}-C_{t-1y})$. The term $C_t(C_{tx}, C_{ty})$ denotes the center position of a bounding box of the tracker in a current frame, with $C_{tx}$ being the x-coordinate of the bounding box, and $C_{ty}$ being the y-coordinate of the bounding box. The term $C_{t-1}(C_{t-1x}, C_{t-1y})$ denotes denotes the center position (x and y) of a bounding box of the tracker in a previous frame. In some implementations, it is also possible to use four parameters to estimate x, y, width, height at the same time. In some cases, because the timing for video frame data is constant or at least not dramatically different overtime (according to the frame rate, such as 30 frames per second, 60 frames per second, 120 frames per second, or other suitable frame rate), a time variable may not be needed in the velocity calculation. In some cases, a time constant can be used (according to the instant frame rate) and/or a timestamp can be used.

Using the blob detection system 104 and the object tracking system 106, the video analytics system 100 can perform blob generation and detection for each frame or picture of a video sequence. For example, the blob detection system 104 can perform background subtraction for a frame, and can then detect foreground pixels in the frame. Foreground blobs are generated from the foreground pixels using morphology operations and spatial analysis. Further, blob trackers from previous frames need to be associated with the foreground blobs in a current frame, and also need to be updated. Both the data association of trackers with blobs and tracker updates can rely on a cost function calculation. For example, when blobs are detected from a current input video frame, the blob trackers from the previous frame can be associated with the detected blobs according to a cost calculation. Trackers are then updated according to the data association, including updating the state and location of the trackers so that tracking of objects in the current frame can be fulfilled. Further details related to the blob detection system 104 and the object tracking system 106 are described with respect to FIGS. 3-4.

Figure 2:
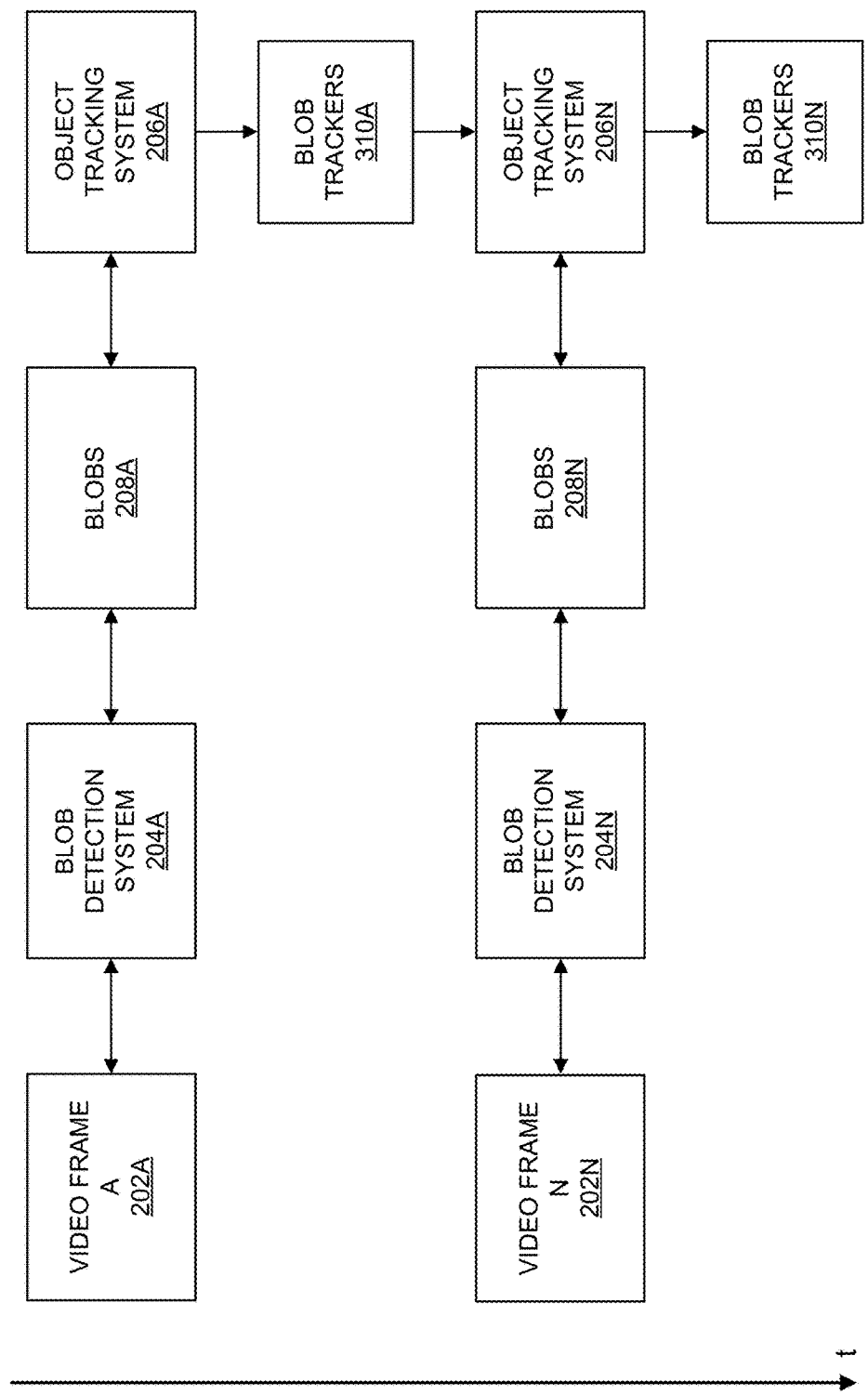
FIG. 2 is an example of a video analytics system processing video frames, in accordance with some examples.

FIG. 2 is an example of the video analytics system (e.g., video analytics system 100) processing video frames across time t. As shown in FIG. 2, a video frame A 202A is received by by a blob detection system 204A. The blob detection system 204A generates foreground blobs 208A for the current frame A 202A. After blob detection is performed, the foreground blobs 208A can be used for temporal tracking by the object tracking system 206A. Costs (e.g., a cost including a distance, a weighted distance, or other cost) between blob trackers and blobs can be calculated by the object tracking system 206A. The object tracking system 206A can perform data association to associate or match the blob trackers (e.g., blob trackers generated or updated based on a previous frame or newly generated blob trackers) and blobs 208A using the calculated costs (e.g., using a cost matrix or other suitable association technique). The blob trackers can be updated, including in terms of positions of the trackers, according to the data association to generate updated blob trackers 310A. For example, a blob tracker's state and location for the video frame A 202A can be calculated and updated. The blob tracker's location in a next video frame N 202N can also be predicted from the current video frame A 202A. For example, the predicted location of a blob tracker for the next video frame N 202N can include the location of the blob tracker (and its associated blob) in the current video frame A 202A. Tracking of blobs of the current frame A 202A can be performed once the updated blob trackers 310A are generated.

When a next video frame N 202N is received, the blob detection system 204N generates foreground blobs 208N for the frame N 202N. The object tracking system 206N can then perform temporal tracking of the blobs 208N. For example, the object tracking system 206N obtains the blob trackers 310A that were updated based on the prior video frame A 202A. The object tracking system 206N can then calculate a cost and can associate the blob trackers 310A and the blobs 208N using the newly calculated cost. The blob trackers 310A can be updated according to the data association to generate updated blob trackers 310N.

Figure 3:
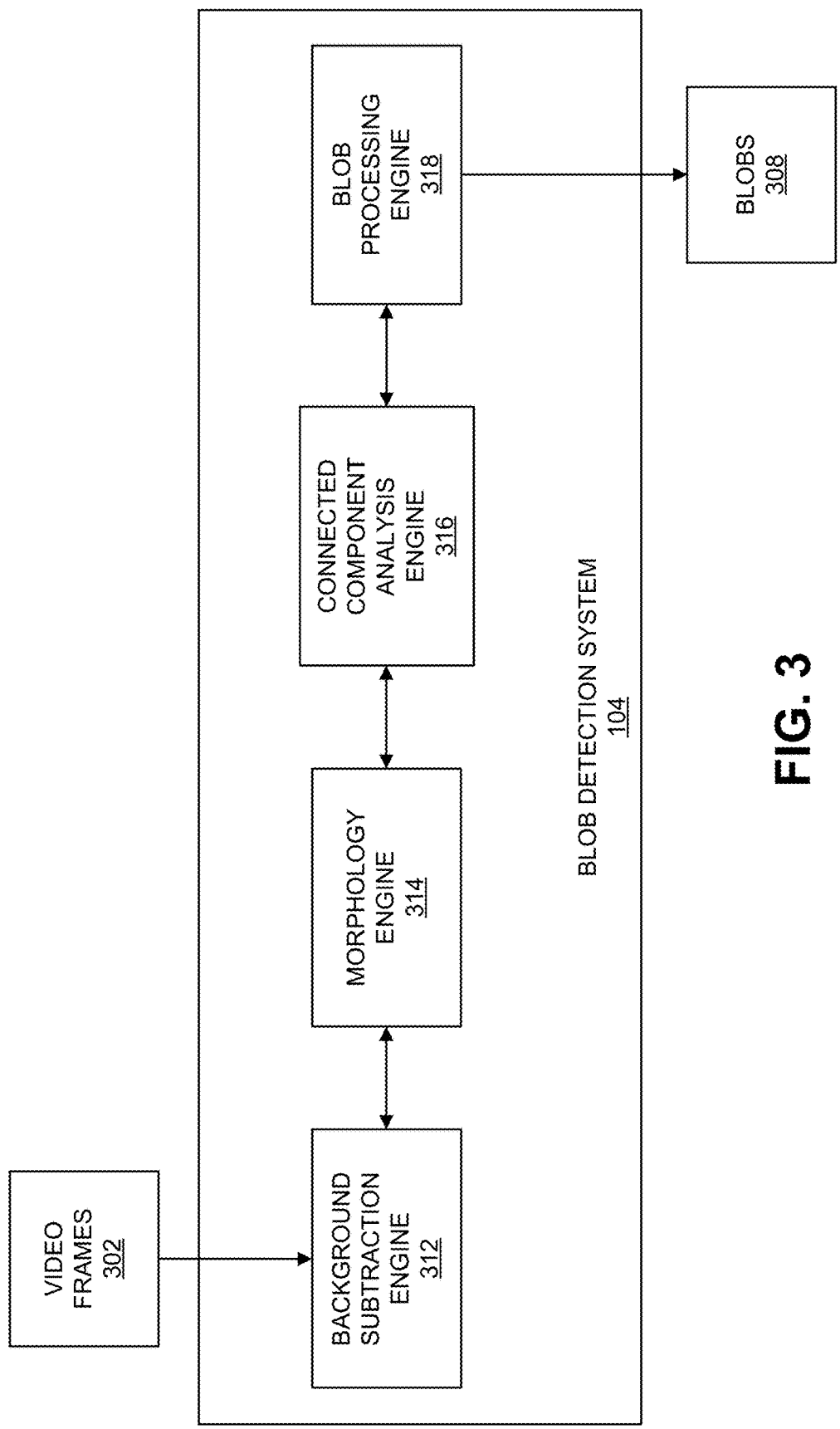
FIG. 3 is a block diagram illustrating an example of a blob detection system, in accordance with some examples.

FIG. 3 is a block diagram illustrating an example of a blob detection system 104. Blob detection is used to segment moving objects from the global background in a scene. The blob detection system 104 includes a background subtraction engine 312 that receives video frames 302. The background subtraction engine 312 can perform background subtraction to detect foreground pixels in one or more of the video frames 302. For example, the background subtraction can be used to segment moving objects from the global background in a video sequence and to generate a foreground-background binary mask (referred to herein as a foreground mask). In some examples, the background subtraction can perform a subtraction between a current frame or picture and a background model including the background part of a scene (e.g., the static or mostly static part of the scene). Based on the results of background subtraction, the morphology engine 314 and connected component analysis engine 316 can perform foreground pixel processing to group the foreground pixels into foreground blobs for tracking purpose. For example, after background subtraction, morphology operations can be applied to remove noisy pixels as well as to smooth the foreground mask. Connected component analysis can then be applied to generate the blobs. Blob processing can then be performed, which may include further filtering out some blobs and merging together some blobs to provide bounding boxes as input for tracking.

The background subtraction engine 312 can model the background of a scene (e.g., captured in the video sequence) using any suitable background subtraction technique (also referred to as background extraction). One example of a background subtraction method used by by the background subtraction engine 312 includes modeling the background of the scene as a statistical model based on the relatively static pixels in previous frames which are not considered to belong to any moving region. For example, the background subtraction engine 312 can use a Gaussian distribution model for each pixel location, with parameters of mean and variance to model each pixel location in frames of a video sequence. All the values of previous pixels at a particular pixel location are used to calculate the mean and variance of the target Gaussian model for the pixel location. When a pixel at a given location in a new video frame is processed, its value will be evaluated by the current Gaussian distribution of this pixel location. A classification of the pixel to either a foreground pixel or a background pixel is done by comparing the difference between the pixel value and the mean of the designated Gaussian model. In one illustrative example, if the distance of the pixel value and the Gaussian Mean is less than 3 times of the variance, the pixel is classified as a background pixel. Otherwise, in this illustrative example, the pixel is classified as a foreground pixel. At the same time, the Gaussian Gaussian model for a pixel location will be updated by taking into consideration the current pixel value.

The background subtraction engine 312 can also perform background subtraction using a mixture of Gaussians (also referred to as a Gaussian mixture model (GMM)). A GMM models each pixel as a mixture of Gaussians and uses an online learning algorithm to update the model. Each Gaussian model is represented with mean, standard deviation (or covariance matrix if the pixel has multiple channels), and weight. Weight represents the probability that the Gaussian occurs in the past history.

$$P(X_t) = \sum_{i=1}^{K} \omega_{i,t} N(X_t | \mu_{i,t}, \Sigma_{i,t})$$  Equation (1)

An equation of the GMM model is shown in equation (1), wherein there are K Gaussian models. Each Guassian model has a distribution with a mean of $\mu$ and variance of $\Sigma$, and has a weight $\omega$. Here, i is the index to the Gaussian model and t is the time instance. As shown by the the equation, the parameters of the GMM change over time after one frame (at time t) is processed. In GMM or any other learning based background subtraction, the current pixel impacts the whole model of the pixel location based on a learning rate, which could be constant or typically at least the same for each pixel location. A background subtraction method based on on GMM (or other learning based background subtraction) adapts to local changes for each pixel. Thus, once a moving object stops, for each pixel location of the object, the same pixel value keeps on contributing to its associated background model heavily, and the region associated with the object becomes background.

The background subtraction techniques mentioned above are based on the assumption that the camera is mounted still, and if anytime the camera is moved or orientation of the camera is changed, a new background model will need to be calculated. There are also background subtraction methods that can handle foreground subtraction based on a moving background, including techniques such as tracking key points, optical flow, saliency, and other motion estimation based approaches.

The background subtraction engine 312 can generate a foreground mask with foreground pixels based on the result of background subtraction. For example, the foreground mask can include a binary image containing the pixels making up the foreground objects (e.g., moving objects) in a scene and the pixels of the background. In some examples, the background of the foreground mask (background pixels) can be a solid color, such as a solid white background, a solid black background, or other solid color. In such examples, the foreground pixels of the foreground mask can be a different color than that used for the background pixels, such as a solid black color, a solid white color, or other solid color. In one illustrative example, the background pixels can be black (e.g., pixel color value 0 in 8-bit grayscale or other suitable value) and the foreground pixels can be white (e.g., pixel color value 255 in 8-bit grayscale or other suitable value). In another illustrative example, the background pixels can be white and the foreground pixels can be black.

Using the foreground mask generated from background subtraction, a morphology engine 314 can perform morphology functions to filter the foreground pixels. The morphology functions can include erosion and dilation functions. In one example, an erosion function can be applied, followed by a series of one or more dilation functions. An erosion function can be applied to remove pixels on object boundaries. For example, the morphology engine 314 can apply an erosion function (e.g., FilterErode3×3) to a 3×3 filter window of a center pixel, which is currently being processed. The 3×3 window can be applied to each foreground pixel (as the center pixel) in the foreground mask. One of ordinary skill in the art will appreciate that other window sizes can be used other than a 3×3 window. The erosion function can include an erosion erosion operation that sets a current foreground pixel in the foreground mask (acting as the center pixel) to a background pixel if one or more of its neighboring pixels within the 3×3 window are background pixels. Such an erosion operation can be referred to as a strong erosion operation or a single-neighbor erosion operation. Here, the neighboring pixels of the current center pixel include the eight pixels in the 3×3 window, with the ninth pixel being the current center pixel.

A dilation operation can be used to enhance the boundary of a foreground object. For example, the morphology engine 314 can apply a dilation function (e.g., FilterDilate3×3) to a 3×3 filter window of a center pixel. The 3×3 dilation window can be applied to each background background pixel (as the center pixel) in the foreground mask. One of ordinary skill in the art will appreciate that other window sizes can be used other than a 3×3 window. The dilation function can include a dilation operation that sets a current background pixel in the foreground mask (acting as the center pixel) as a foreground pixel if one or more of its neighboring pixels in the 3×3 window are foreground pixels. The neighboring pixels of the current center pixel include the eight pixels in the 3×3 window, with the ninth pixel being the current center pixel. In In some examples, multiple dilation functions can be applied after an erosion function is applied. In one illustrative example, three function calls of dilation of 3×3 window size can be applied to the foreground mask before it is sent to the connected component analysis engine 316. In some examples, an erosion function can be applied first to remove noise pixels, and a series of dilation functions can then be applied to refine the foreground pixels. In one illustrative example, one erosion function with 3×3 window size is called first, and three function calls of dilation of 3×3 window size are applied to the foreground mask before it is sent to the connected component analysis engine 316. Details regarding content-adaptive morphology operations are described below.

After the morphology operations are performed, the connected component analysis engine 316 can apply connected component analysis to connect neighboring foreground pixels to formulate connected components and blobs. In some implementation of connected component analysis, a set of bounding boxes are returned in a way that each bounding box contains one component of connected pixels. One example of the connected component analysis performed by the connected component analysis engine 316 is implemented as follows:

--- for each pixel of the foreground mask {
-if it is a foreground pixel and has not been processed, the following steps apply:
    -Apply FloodFill function to connect this pixel to other foreground and generate a connected component
    -Insert the connected component in a list of connected components.
    -Mark the pixels in the connected component as being processed }

---

The Floodfill (seed fill) function is an algorithm that determines the area connected to a seed node in a multi-dimensional array (e.g., a 2-D image in this case). This Floodfill function first obtains the color or intensity value at the seed position (e.g., a foreground pixel) of the source foreground mask, and then finds all the neighbor pixels that have the same (or similar) value based on 4 or 8 connectivity. For example, in a 4 connectivity case, a current pixel's neighbors are defined as those with a coordination being (x+d, y) or (x, y+d), wherein d is equal to 1 or −1 and (x, y) is the current pixel. One of ordinary skill in the art will appreciate that other amounts of connectivity can be used. Some objects are separated into different connected components and some objects are grouped into the same connected components (e.g., neighbor pixels with the same or similar values). Additional processing may be applied to further process the connected components for grouping. Finally, the blobs 308 are generated that include neighboring foreground pixels according to the connected components. In one example, a blob can be made up of one connected component. In another example, a blob can include multiple connected components (e.g., when two or more blobs are merged together).

The blob processing engine 318 can perform additional processing to further process the blobs generated by the connected component analysis engine 316. In some examples, the blob processing engine 318 can generate the bounding boxes to represent the detected blobs and blob trackers. In some cases, the blob bounding boxes can be output from the blob detection system 104. In some examples, there may be a filtering process for the connected components (bounding boxes). For instance, the blob processing engine 318 can perform content-based filtering of certain blobs. In some cases, a machine learning method can determine that a current blob contains noise (e.g., foliage in a scene). Using the machine learning information, the blob processing engine 318 can determine the current blob is a noisy blob and can remove it from the resulting blobs that are provided to the object tracking system 106. In some cases, the blob processing engine 318 can filter out one or more small blobs that are below a certain size threshold (e.g., an area of a bounding box surrounding a blob is below an area threshold). In some examples, there may be a merging process to merge some connected components (represented as bounding boxes) into bigger bounding boxes. For instance, the blob processing engine 318 can merge close blobs into one big blob to remove the risk of having too many small blobs that could belong to one object. In some cases, two or more bounding boxes may be merged together based on certain rules even when the foreground pixels of the two bounding boxes are totally disconnected. In some embodiments, the blob detection system 104 does not include the blob processing engine 318, or does not use the blob processing engine 318 in some instances. For example, the blobs generated by the connected component analysis engine 316, without further processing, can be input to the object tracking system 106 to perform blob and/or object tracking.

In some implementations, density based blob area trimming may be performed by the blob processing engine 318. For example, when all blobs have been formulated after post-filtering and before the blobs are input into the tracking layer, the density based blob area trimming can be applied. A similar process is applied vertically and horizontally. For example, example, the density based blob area trimming can first be performed vertically and then horizontally, or vice versa. The purpose of density based blob area trimming is to filter out the columns (in the vertical process) and/or the rows (in the horizontal process) of a bounding box if the columns or rows only contain a small number of foreground pixels.

The vertical process includes calculating the number of foreground pixels of each column of a bounding box, and denoting the number of foreground pixels as the column density. Then, from the left-most column, columns are processed one by one. The column density of each current column (the column currently being processed) is compared with the maximum column density (the column density of all columns). If the column density of the current column is smaller than a threshold (e.g., a percentage of the maximum column density, such as 10%, 20%, 30%, 50%, or other suitable percentage), the column is removed from the bounding box and the next column is processed. However, once a current column has a column density that is not smaller than the threshold, such a process terminates and the remaining columns are not processed anymore. A similar process can then be applied from the right-most column. One of ordinary skill will appreciate that the vertical process can process the columns beginning with a different column than the left-most column, such as the right-most column or other suitable column in the bounding box.

The horizontal density based blob area trimming process is similar to the vertical process, except the rows of a bounding box are processed instead of columns. For example, the number of foreground pixels of each row of a bounding box is calculated, and is denoted as row density. From the top-most row, the rows are then processed one by one. For each current row (the row currently being processed), the row density is compared with the maximum row density (the row density of all the rows). If the row density of the current row is smaller than a threshold (e.g., a percentage of the maximum row density, such as 10%, 20%, 30%, 50%, or other suitable percentage), the row is removed from the bounding box and the next row is processed. However, once a current row has a row density that is not smaller than the threshold, such a process terminates and the remaining rows are not processed anymore. A similar process can then be applied from the bottom-most row. One of ordinary skill will appreciate that the horizontal process can process the rows beginning with a different row than the top-most row, such as the bottom-most row or other suitable row in the bounding box.

One purpose of the density based blob area trimming is for shadow removal. For example, the density based blob area trimming can be applied when one person is detected together with his or her long and thin shadow in one blob (bounding box). Such a shadow area can be removed after applying density based blob area trimming, since the column density in the shadow area is relatively small. Unlike morphology, which changes the thickness of a blob (besides filtering some isolated foreground pixels from formulating blobs) but roughly preserves the shape of a bounding box, such a density based blob area trimming method can dramatically change the shape of a bounding box.

Figure 4:
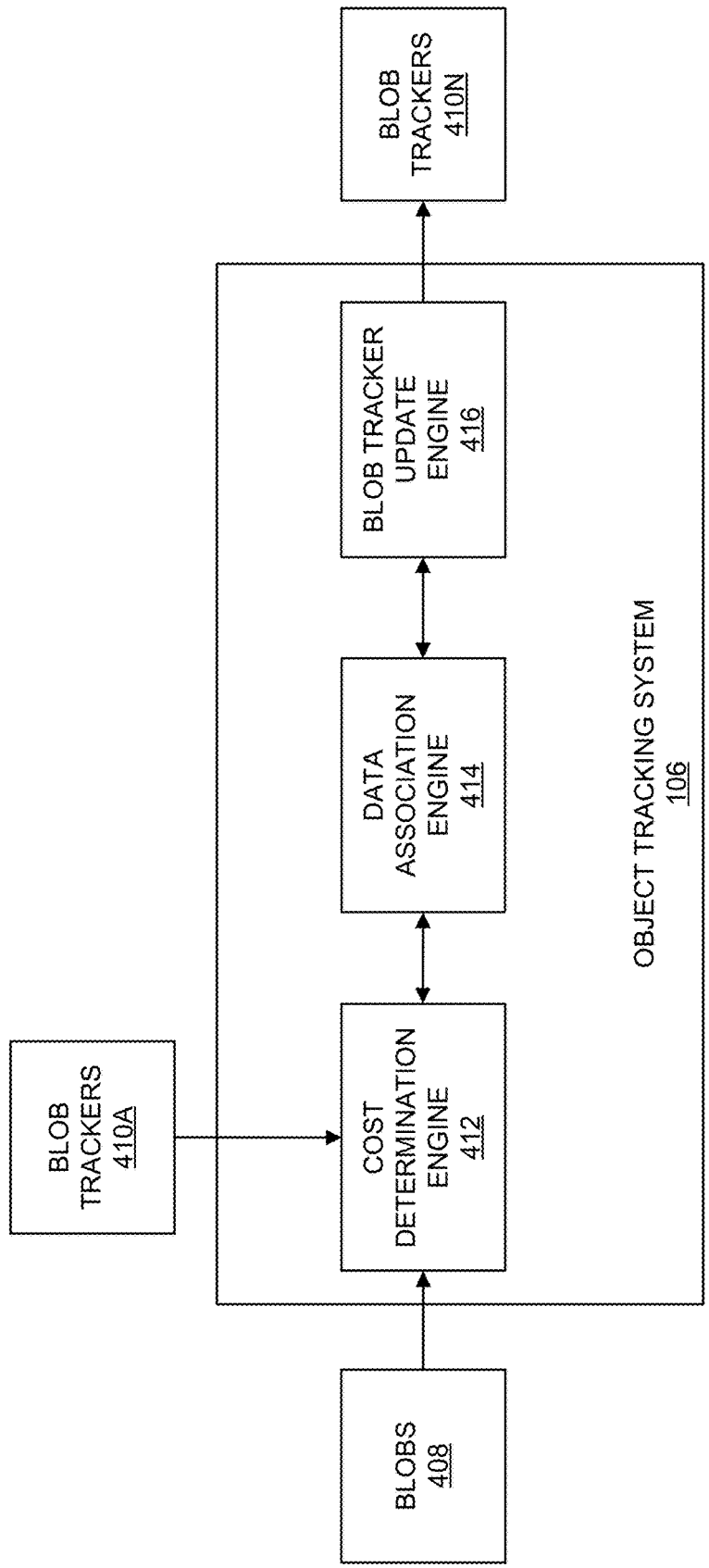
FIG. 4 is a block diagram illustrating an example of an object tracking system, in accordance with some examples.

Once the blobs are detected and processed, object tracking (also referred to as blob tracking) can be performed to track the detected blobs. FIG. 4 is a block diagram illustrating an example of an object tracking system 106. The input to the blob/object tracking is a list of the blobs 408 (e.g., the bounding boxes of the blobs) generated by the blob detection system 104. In some cases, a tracker is assigned with a unique ID, and a history of bounding boxes is kept. Object tracking in a video sequence can be used for many applications, including surveillance applications, among many others. For example, the ability to detect and track multiple objects in the same scene is of great interest in many security applications. When blobs (making up at least portions of objects) are detected from an input video frame, blob trackers from the previous video frame need to be associated to the blobs in the input video frame according to a cost calculation. The blob trackers can be updated based on the associated foreground blobs. In some instances, the steps in object tracking can be conducted in a series manner.

A cost determination engine 412 of the object tracking system 106 can obtain the blobs 408 of a current video frame from the blob detection system 104. The cost determination engine 412 can also obtain the blob trackers 410A updated from the previous video frame (e.g., video frame A 202A). A cost function can then be used to calculate costs between the blob trackers 410A and the blobs 408. Any suitable cost function can be used to calculate the costs. In some examples, the cost determination engine 412 can measure the cost between a blob tracker and a blob by calculating the Euclidean distance between the centroid of the tracker (e.g., the bounding box for the tracker) and the centroid of the bounding box of the foreground blob. In one illustrative example using a 2-D video sequence, this type of cost function is calculated as below:

$$\text{Cos } t_{tb} = \sqrt{(t_x - b_x)^2 + (t_y - b_y)^2} \qquad \text{Equation (2)}$$

The terms $(t_x, t_y)$ and $(b_x, b_y)$ are the center locations of the blob tracker and blob bounding boxes, respectively. As noted herein, in some examples, the bounding box of the blob tracker can be the bounding box of a blob associated with the blob tracker in a previous frame. In some examples, other cost function approaches can be performed that use a minimum distance in an x-direction or y-direction to calculate the cost. Such techniques can be good for certain controlled scenarios, such as well-aligned lane conveying. In some examples, a cost function can be based on a distance of a blob tracker and a blob, where instead of using the center position of the bounding boxes of blob and tracker to calculate distance, the boundaries of the bounding boxes are considered so that a negative distance is introduced when two bounding boxes are overlapped geometrically. In addition, the value of such a distance is further adjusted according to the size ratio of the two associated bounding boxes. For example, a cost can be weighted based on a ratio between the area of the blob tracker bounding box and the area of the blob bounding box (e.g., by multiplying the determined distance by the ratio).

In some embodiments, a cost is determined for each tracker-blob pair between each tracker and each blob. For example, if there are three trackers, including tracker A, tracker B, and tracker C, and three blobs, including blob A, blob B, and blob C, a separate cost between tracker A and each of the blobs A, B, and C can be determined, as well as separate costs between trackers B and C and each of the blobs A, B, and C. In some examples, the costs can be arranged arranged in a cost matrix, which can be used for data association. For example, the cost matrix can be a 2-dimensional matrix, with one dimension being the blob trackers 410A and the second dimension being the blobs 408. Every tracker-blob pair or combination between the trackers 410A and the blobs 408 includes a cost that is included in the cost matrix. Best matches between between the trackers 410A and blobs 408 can be determined by identifying the lowest cost tracker-blob pairs in the matrix. For example, the lowest cost between tracker A and the blobs A, B, and C is used to determine the blob with which to associate the tracker A.

Data association between trackers 410A and blobs 408, as well as updating of the trackers 410A, may be based on the determined costs. The data association engine 414 matches or assigns a tracker (or tracker bounding box) with a corresponding blob (or blob bounding box) and vice versa. For example, as described previously, the lowest cost tracker-blob pairs may be used by the data association engine 414 to associate the blob trackers 410A with the blobs 408. Another technique for associating blob trackers with blobs includes the Hungarian method, which is a combinatorial optimization algorithm that solves such an assignment problem in polynomial time and that anticipated later primal-dual methods. For example, the Hungarian method can optimize a global cost across all blob trackers 410A with the blobs 408 in order to minimize the global cost. The blob tracker-blob combinations in the cost matrix that minimize the global cost can be determined and used as the association.

In addition to the Hungarian method, other robust methods can be used to perform data association between blobs and blob trackers. For example, the association problem can be solved with additional constraints to make the solution more robust to noise while matching as many trackers and blobs as possible. Regardless of the association technique that is used, the data association engine 414 can rely on the distance between the blobs and trackers.

Once the association between the blob trackers 410A and blobs 408 has been completed, the blob tracker update engine 416 can use the information of the associated blobs, as well as the trackers' temporal statuses, to update the status (or states) of the trackers 410A for the current frame. Upon updating the trackers 410A, the blob tracker update engine 416 can perform object tracking using the updated trackers 410N, and can also provide the updated trackers 410N for use in processing a next frame.

The status or state of a blob tracker can include the tracker's identified location (or actual location) in a current frame and its predicted location in the next frame. The location of the foreground blobs are identified by the blob detection system 104. However, as described in more detail below, the location of a blob tracker in a current frame may need to be predicted based on information from a previous frame (e.g., using a location of a blob associated with the blob tracker in the previous frame). After the data association is performed for the current frame, frame, the tracker location in the current frame can be identified as the location of its associated blob(s) in the current frame. The tracker's location can be further used to update the tracker's motion model and predict its location in the next frame. Further, in some cases, there may be trackers that are temporarily lost (e.g., when a blob the tracker was tracking is no longer detected), in which case the locations of such trackers also need to be predicted (e.g., by a Kalman filter). Such trackers are temporarily not shown to the system. Prediction of the bounding box location helps not only to maintain certain level of tracking for lost and/or merged bounding boxes, but also to give more accurate estimation of the initial position of the trackers so that the association of the bounding boxes and trackers can be made more precise.

As noted above, the location of a blob tracker in a current frame may be predicted based on information from a previous frame. One method for performing a tracker location update is using a Kalman filter. The Kalman filter is a framework that includes two steps. The first step is to predict a tracker's state, and the second step is to use measurements to correct or update the state. In this case, the tracker from the last frame predicts (using the blob tracker update engine 416) its location in the current frame, and when the current frame is received, the tracker first uses the measurement of the blob(s) to correct its location states and then predicts its location in the next frame. For example, a blob tracker can employ a Kalman filter to measure its trajectory as well as predict its future location(s). The Kalman filter relies on the measurement of the associated blob(s) to correct the motion model for the blob tracker and to predict the location of the object tracker in the next frame. In some examples, if a blob tracker is associated with a blob in a current frame, the location of the blob is directly used to correct the blob tracker's motion model in the Kalman filter. In some examples, if a blob tracker is not associated with any blob in a current frame, the blob tracker's location in the current frame is identified as its predicted location from the previous frame, meaning that the motion model for the blob tracker is not corrected and the prediction propagates with the blob tracker's last model (from the previous frame).

Other than the location of a tracker, the state or status of a tracker can also, or alternatively, include a tracker's temporal status. The temporal status can include whether the tracker is a new tracker that was not present before the current frame, whether the tracker has been alive for certain frames, or other suitable temporal status. Other states can include, additionally or alternatively, whether the tracker is considered as lost when it does not associate with any foreground blob in the current frame, whether the tracker is considered as a dead tracker if it fails to associate with any blobs for a certain number of consecutive frames (e.g., two or more), or other suitable tracker states.

There may be other status information needed for updating the tracker, which may require a state machine for object tracking. Given the information of the associated blob(s) and the tracker's own status history table, the status also needs to be updated. The state machine collects all the necessary information and updates the status accordingly. Various statuses can be updated. For example, other than a tracker's life status (e.g., new, lost, dead, or other suitable life status), the tracker's association confidence and relationship with other trackers can also be updated. Taking one example of the tracker relationship, when two objects (e.g., persons, vehicles, or other objects of interest) intersect, the two trackers associated with the two objects will be merged together for certain frames, and the merge or occlusion status needs to be recorded for high level video analytics.

Regardless of the tracking method being used, a new tracker starts to be associated with a blob in one frame and, moving forward, the new tracker may be connected with possibly moving blobs across multiple frames. When a tracker has been continuously associated with blobs and a duration (denoted as a threshold duration TD1) has passed, the tracker may be promoted to be a normal tracker. A normal tracker (with normal status) and its associated blob are output as an identified tracker-blob pair to the video analytics system. For example, a tracker-blob pair is output at the system level as an event (e.g., presented as a tracked object on a display, output as an alert, and/or other suitable event) when the tracker is promoted to be a normal tracker. In some implementations, a normal tracker (e.g., including certain status data of the normal tracker, the motion model for the normal tracker, or other information related to the normal tracker) can be output as part of object metadata. The metadata, including the normal tracker, can be output from the video analytics system (e.g., an IP camera running the video analytics system) to a server or other system storage. The metadata can then be analyzed for event detection (e.g., by rule interpreter). A tracker that is not promoted as a normal tracker can be removed (or killed), after which the tracker can be considered as dead.

The threshold duration TD1 is a duration for which a new blob tracker must be continuously associated with one or more blobs before it is converted to a normal tracker (transitioned to a normal state). The threshold duration can be a number of frames (e.g., at least N frames) or an amount of time. In one illustrative example, the threshold duration can be 30 frames, in which case a blob tracker can be in a new state for 30 frames before being converted to a normal tracker. The threshold duration TD1 can be set to any other suitable number of frames or amount of time. In some cases, if a blob tracker has been continuously associated with with blobs for the threshold duration (duration≥TD1) without becoming hidden or lost, the blob blob tracker is converted to a normal tracker by being transitioned from a new status to a normal status. In some cases, a tracker can be transitioned to lost when the tracker fails to associate with with any foreground blobs in a given frame. In some cases, the tracker can be transitioned to dead when the tracker fails to associate with any foreground blobs for a certain duration (e.g., a certain number or frames or a duration of time). A hidden tracker may refer to a tracker that was was previously normal (thus independent), but later merged into another tracker.

As described above, blob detection can be performed for one or more video frames to generate or identify blobs representing one or more objects for the one or more video frames. The background subtraction component of the blob detection encounters issues when dealing with sleeping objects. A sleeping object is an object that is moving through a scene and that eventually becomes stationary or static. For example, a car can enter a scene by driving into a parking lot and then parking in a parking spot. Once the car parks, it can become a sleeping object. A blob and the object represented by the blob can be detected and tracked based on background subtraction, as long as the object is in motion. However, once the object pauses or stops and becomes a sleeping object, the background subtraction model will transition the pixels of the object from foreground pixels to background pixels due to the nature of background subtraction adapting to local changes quickly. For example, a background subtraction process based on GMM or other statistical learning model adapts to the local changes for each pixel. Once a moving object stops or pauses, for each pixel location making up the object, the same pixel value (due to the pixel value for that location not changing) continues contributing to the associated background model, causing the region associated with the object to become background. Once the pixels making up the object are detected as background by the background subtraction process, the object and its blob fade into the background and can no longer be detected and tracked. A sleeping object thus will not be detected and tracking of the object will be lost for a simple background subtraction based solution.

Figure 5:
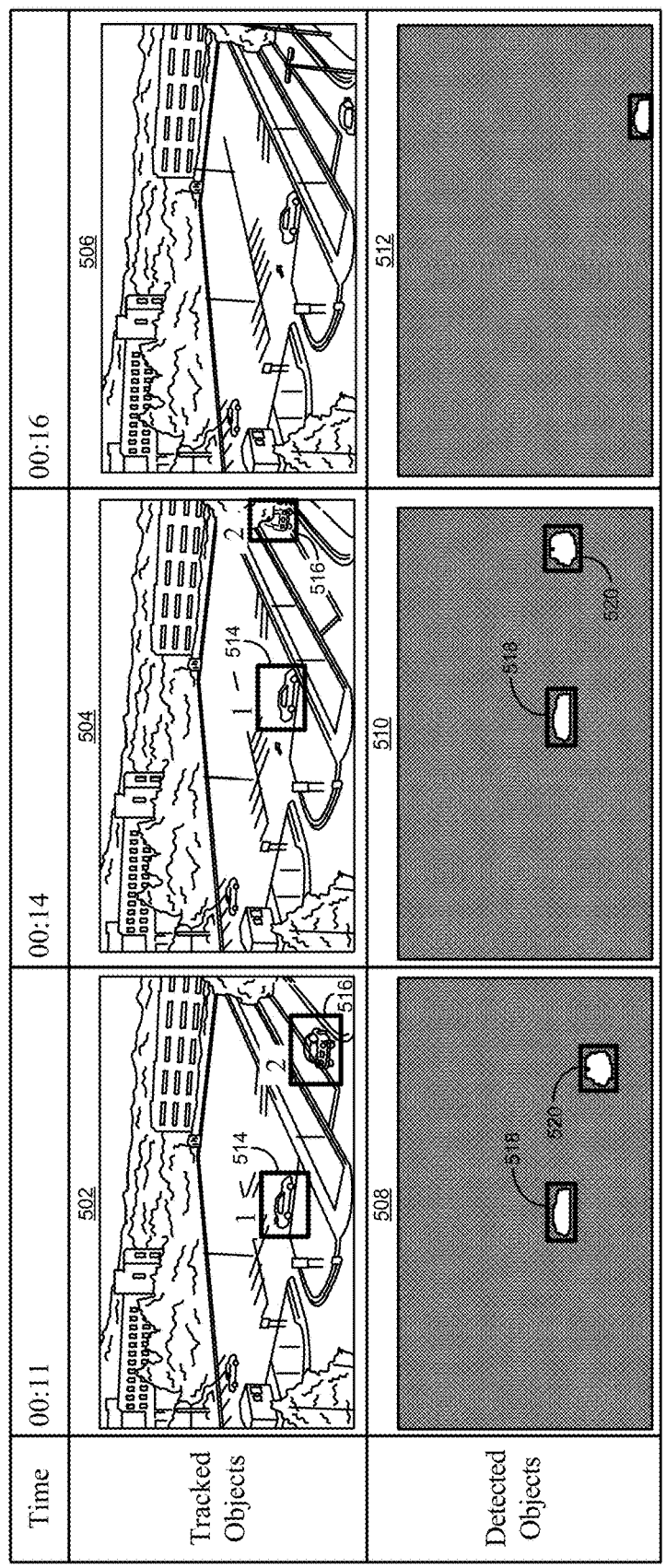
FIG. 5 is an illustration of video frames of an environment in which objects are detected, in accordance with some examples.

FIG. 5 is an illustration of video frames 502, 504, and 506 of an environment for which a sleeping object is detected and tracked using a simple background subtraction based solution. The frames 502, 504, 506 are shown with tracking results for different time instances of 11 seconds, 14 seconds, and 16 seconds, respectively. The background pictures 508, 510, and 512 (e.g., after blob analysis) are also shown with the object detection results of each time instance.

In the example shown in FIG. 5, a first moving car being tracked by a tracker bounding box 514 and a second moving car being tracked by a tracker bounding box 516 are detected in frame 502 at time instance 00:11. The two cars are detected as the blobs surrounded by blob bounding box 518 and blob bounding box 520, respectively, as shown in the background picture 508. The first car (tracked by tracker bounding box 514) continues moving until approximately frame 504 at time instance 00:14. The object tracking system can correctly detect and track the first car until that time (00:14), as illustrated by the blob bounding box 518 in the background picture 510 and by the tracker bounding box 514 in the frame 504. However, since the first car stopped moving from time instance 00:14 forward, the background subtraction model starts to learn the background models of the pixel locations related to the first car such that the foreground pixels soon become background pixels due to the nature of background subtraction, as noted above. The second car continues moving as each of the frames 502, 504, 506 are captured, and thus is detected and tracked for all three frames as illustrated by the blob bounding box 520 in the background pictures 508, 510, 512 and by the tracker bounding box 516 in the frames 502, 504, 506.

Some solutions for the sleeping tracker problem are based on modification of the background subtraction process. Another less accurate solution is to exclude foreground pixels from the update process. However, such a solution will disable the adaptability of such pixel locations and lead to false positives (e.g., when the object starts to move again). Similarly, simply adjusting the parameters of background subtraction so that the foreground objects fade slowly into the background will not solve the problem.

A first solution for the issue of sleeping objects is based on changing the background models by enabling multiple models and adapting the model update for foreground regions. For example, in the first type of solution, multiple models (e.g., similar to GMM) are firstly used. In addition, to update the model of a current pixel location of a foreground object, instead of using the current pixel value of the current pixel location, a different pixel is derived to replace the current pixel value. Such a different pixel value is chosen so that it is a value of a background pixel and so that the model parameters of the different pixel value are the most similar to the model of the foreground pixels. Using such a solution, a stopped object can turn to a sleeping object more slowly.

A second solution for sleeping objects is to adjust the parameters of the background subtraction model based on whether the current pixel is foreground or background (without changing the input pixel value). In the second type of solution, parameters of the background subtraction are changed. Multiple models for each pixel location are not necessarily required. This type of solution, however, requires the tracking system to provide as feedback the blob level information of the foreground objects and to apply a much slower learning speed (by adjusting e.g., the learning rate) for the foreground objects.

The prior solutions for sleeping object detection have various issues. One issue is that these solutions lead to much higher complexity in background subtraction. For example, the first first solution described above replaces the input to the background model with a different pixel value, and searches for the different pixel value from one or more nearby background regions. This leads to a large computational complexity increase (in worst case scenario) since GMM and other learning-based background subtraction techniques are often expected to be done by a Digital Signal Processor (DSP) or a Graphics Processing Unit (GPU), in which case parallelism is enabled and the worst case scenario is very important. Further, even in simple solutions (such as the second solution described above) that only require re-calculation of the learning rate, the process is done for each pixel, leading to a rather complex process, especially for non-software only solutions. Even further, background modeling happens for each pixel, so any conditional calculation is very expensive to implement.

Another issue is that the prior solutions lead to potentially high latency and/or data transfer rates. For example, the second solution requires the background subtraction modeling process (e.g., GMM) to take the object tracking results as input. Because of this, the latency in the object tracking side will be carried over and thus will be reflected by background subtraction. In video surveillance and other applications of video analytics, background subtraction is one of the first steps, and thus the latency of the background subtraction modeling process (e.g., GMM), as well as its dependency on other parts of video analytics (e.g., the tracking layer), should be minimized. Furthermore, background subtraction (e.g., GMM) requires high memory bandwidth to transfer the data from heterogeneous computing devices, and any additional information from other video analytics modules (e.g., tracking) to background subtraction will be multiplied by the number of pixels in background subtraction, which significantly impacts the data transfer rate.

As noted above, the prior solutions for sleeping object detection delay a stopped object from turning to a sleeping object. However, such an object can still disappear (in which case the object is not detected) after a certain period of time even when such solutions are applied, resulting in the problem not being completely resolved.

Methods and systems are described herein for detecting sleeping objects. The methods and systems provide a low-complexity, yet robust solution to detect such sleeping objects, without modifying the background subtraction model and without introducing pixel level complexity. For example, using the methods and systems described herein, sleeping objects may may be detected at the blob level (after blob detection). Once a sleeping object is detected, even though the object is faded into the background, there can be special methods in the tracking layer to continuously maintain and thus track the sleeping object in the video analytics system.

As described in more detail below, a sleeping object detection system can perform a sleeping object detection process. In some examples, a sleeping object can be detected, in part, by comparing bounding boxes of a blob tracker that is tracking an object across multiple frames. For example, it can be determined whether the bounding boxes of the tracker are becoming smaller across the frames, indicating that the object being tracked is being absorbed (or vanishing) into the background based on the background subtraction process. Detection of the sleeping object can be further based on a comparison of color characteristics (e.g., in an appearance model maintained for the tracker) of pixels included in bounding boxes of the blob tracker in a number of the frames. For example, the sleeping object detection system can maintain and periodically update an appearance model together with a target sleeping bounding box of the tracker. Once there is a sign that that the object is being absorbed into the background, the target sleeping bounding box (instead of the current bounding box) can be used to update or re-calculate the appearance model using pixels of the current frame within the target sleeping bounding box. The updated appearance model can be compared with an appearance model maintained for the tracker. If the comparison determines the texture is unchanged, the object can be considered a sleeping object. Such a comparison of color characteristics can ensure that the object the tracker is tracking (the sleeping object) remains in the scene.

Even after sleeping objects and sleeping trackers have been detected, many issues are involved in trying to maintain such sleeping trackers. For example, it may be difficult to deal with interactions between the sleeping object and other objects. Examples of interactions between sleeping objects and other objects can include one or more sleeping objects interacting with one or more normal trackers, a sleeping object that interacts with other sleeping objects, and other possible interactions. In one illustrative example, a sleeping object may be close to another another normal object in a scene, which can introduce issues during tracking in a video analytics system that handles multi-to-multi tracking (tracking of multiple objects with multiple trackers). When interacting with one or more normal objects, a sleeping object may be incorrectly mapped to a moving object and may get lost due to the tracking system not being able to track the object with a tracker. In another illustrative example, when one or more normal trackers interact with a a current sleeping object, it is difficult to tell whether the sleeping object itself starts to move or other objects are moving. In other examples, there may situations where two or more sleeping objects are in a scene. The sleeping objects may overlap with each other, causing issues with tracking. After the interaction with one or more normal objects or sleeping objects, the video analytics system needs to know whether the sleeping object should still be considered as a sleeping object. For example, in some cases, a sleeping object may go through interfaces with other objects. However, after such interfaces, it is necessary to know whether such an object is still a sleeping object.

Other issues are also introduced when trying to maintain and track sleeping objects and trackers. For example, in some cases, a sleeping object may also start to move again, in which case the object will have to be tracked well with the same tracker label. There currently is no mechanism to start tracking such an object as a normal object. As another example, a sleeping object may be a person that is stationary. As the person is stationary, a part of the person's body may move, such as the user's arm or head. In this case, even if the appearance model associated with the person's tracker slightly changes, it may be desirable to still maintain it as a sleeping object. As another example, even when a sleeping object does has no interactions with any other object, the appearance model of the sleeping object might be changed due to certain conditions (e.g., a lighting condition change). In such a case, it may be desirable to maintain the object as a sleeping object.

Methods and systems are described herein for tracking, maintaining, and updating sleeping objects and sleeping object trackers after they are detected. Such methods and systems can continue to track and maintain sleeping objects even when the objects interact with other objects. The sleeping objects and their trackers can also be updated and maintained when the objects start to move after being stationary for some time, when only portions of the object begin to move, and/or when external conditions cause changes in the color characteristics of the objects.

Figure 6:
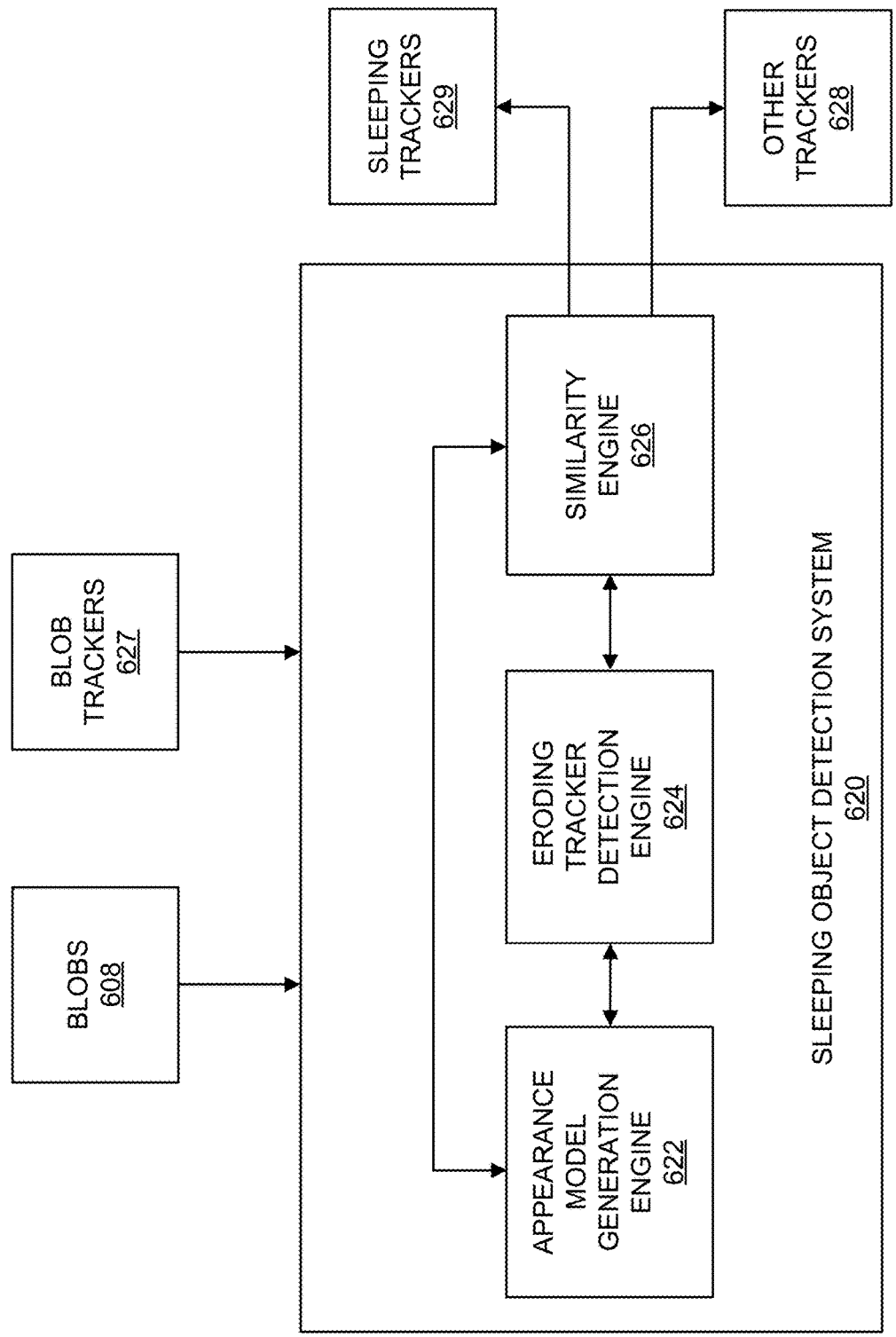
FIG. 6 is a block diagram illustrating an example of a sleeping object detection system, in accordance with some examples.

The sleeping object detection process can be performed by a sleeping object detection system. FIG. 6 shows an example of a sleeping object detection system 620. A detailed example of the sleeping object detection process is described below with respect to FIG. 7A and FIG. 7B. The sleeping object detection system 620 includes an appearance model generation engine 622, an eroding tracker determination engine 624, and a bounding box comparison engine 626. The sleeping object detection process can be performed on a frame-by-frame basis. The input to the sleeping object detection system 620 includes the blobs 608 and the blob trackers 627. For example, the blobs 608 can include the blobs detected for one or more frames of a video sequence. The blob trackers 627 can include the blob trackers for the one or more frames of the video sequence. A blob tracker for a current frame can be the tracker before or after data association has been performed (e.g., before or after a Kalman filter update based on locations of blobs in a current frame). The output of the sleeping object detection system 620 includes the sleeping trackers 629. The sleeping object detection system 620 can be part of the tracking system (e.g., tracking system 106), or can be a separate component from the tracking system. For example, the sleeping object detection system 620 can be separate from the object tracking system, in which case the sleeping trackers 629 can be output to the object tracking system so that the object tracking system can continue to track the sleeping objects. In other examples, the sleeping object detection system 620 can be part of (or integrated with) the object tracking system. For instance, the sleeping object detection system 620 may perform sleeping object detection after data association is performed by the data association engine 414. The sleeping trackers 629 determined for a current frame can also be provided for use by the tracking system to perform data association for a next frame (e.g., to associate the sleeping trackers to blobs in the next frame).

The appearance model generation engine 622 can determine appearance models for bounding boxes of the blob trackers 627. An appearance model of a bounding box can include one or more color characteristics of pixels included in the bounding box. For example, the one or more color characteristics can include a color feature space of pixels in the bounding box, a color mass center of pixels in the bounding box, any other suitable color characteristic, or a combination thereof. Color characteristics of appearance models are described in more detail below. The appearance model of a bounding box can be determined based on the pixels of a given frame that are included in the bounding box of the blob tracker. For example, the one or more color characteristics of a tracker bounding box can be calculated using the values of pixels within the bounding box.

The eroding tracker detection engine 624 can perform an eroding tracker detection process to detect whether bounding boxes of a tracker are shrinking over a number of frames (or eroding). The eroding tracker detection process can include a size inclusion test and a significant size decrease test. For example, the eroding tracker detection engine 624 can perform a size inclusion test by comparing a current bounding box of a tracker (in a current frame) with a previous bounding box of the tracker (in a frame obtained earlier in time than the current frame) to determine if the current bounding box is within the previous bounding box. In some examples, the current bounding box is determined to be within the previous bounding box when a size of the current bounding box is smaller than a size of the previous bounding box. In some examples, the current bounding box is determined to be within the previous bounding box when a size of the current bounding box is smaller than a size of the previous bounding box and when the boundaries of the current bounding box are entirely within the boundaries of the previous bounding box.

In some examples, the location in the current frame of the current bounding box of the blob tracker can be determined so that the the eroding tracker detection engine 624 can determine if the current bounding box is within the previous bounding box. In some implementations, the location of the current bounding box in the current frame can be determined using the location of the blob that the tracker is associated with in the current frame. In some implementations, the location of the current bounding box in the current frame can be determined using a predicted location of the blob tracker, which is based on one or more previous locations of the tracker in one or more previous frames. For instance, as described above, the predicted location of a blob tracker in a current frame can include a location in a previous frame of a blob with which the blob tracker was associated.

In some examples, the previous bounding box can include a bounding box from any frame obtained before the current frame. In some examples, the previous bounding box can include a target sleeping bounding box (also referred to herein as a target bounding box or previous bounding box). A target bounding box of a tracker is a bounding box for a frame that meets an appearance model duration. For example, the appearance model duration can be a threshold set to a certain number of frames (e.g., 15 frames, 30 frames, 60 frames, or other suitable number of frames). The appearance model duration can be implemented using a counter or other mechanism. In one illustrative example, the appearance model duration can be set to 30 frames, in which case a target bounding box can be set for a particular tracker every 30 frames.

When the size inclusion test is successful for a tracker (the current bounding box of the tracker is determined to be within the previous bounding box), the eroding tracker detection engine 624 can perform the significant size decrease test to determine whether there has been a significant size decrease of the tracker's bounding boxes across frames. For example, the eroding tracker detection engine 624 can compare a size of the current bounding box of the tracker (in a current frame) with a size of a previous bounding box of the tracker (in a previous frame) to determine if the current bounding box is significantly smaller than the previous bounding box. As noted above, the previous bounding box can include a bounding box from any any frame obtained before the current frame, or can include a target bounding box. The significant size decrease of a current bounding box can be based on a threshold amount as compared to the size of the previous bounding box. In some examples, the threshold amount can can include a percentage size of the previous bounding box (e.g., 30%, 40%, 50%, or other suitable percentage). In one illustrative example, the current bounding box can be determined to be significantly smaller than the previous bounding box when the size of the current bounding box is smaller than the size of the previous bounding box by 50% or more (e.g., the current bounding box is at least half the size of the previous bounding box). The tracker can be determined to be a vanishing or eroding tracker when a significant size decrease is determined to have occurred to a bounding box of the tracker. In some cases, a state of the tracker can be set to to vanishing or eroding.

In some examples, in addition to comparing the size of the current bounding box of the tracker with the size of the previous bounding box of the tracker, the eroding tracker detection engine 624 can determine if there has been a threshold number of bounding boxes or frames (e.g., at least three, four, five, or other suitable number of bounding boxes) involved in the eroding tracker detection process. In such examples, the tracker is considered a vanishing or eroding tracker when a bounding box is determined to have undergone a significant size decrease and when the threshold number of bounding boxes has been analyzed in the eroding tracker detection process.

The similarity engine 626 can compare appearance models of bounding boxes of a tracker to determine if color characteristics of the bounding boxes are similar enough to consider the tracker as a sleeping tracker. In some examples, the appearance model for the tracker can be updated and compared to a previous appearance model of the tracker once there is a clear sign that that the object is being absorbed into the background (based on the eroding tracker detection process). Such a comparison of color characteristics can ensure that the texture of the object the tracker is tracking (the potential sleeping object) remains unchanged, which can indicate that the object remains in the scene at the location it became stationary. In one illustrative example, the appearance model generation engine 622 can determine an initial appearance model of a target bounding box of the tracker using pixels of an initial frame. The initial frame is the frame at which the target bounding box was designated as the target bounding box (after the appearance model duration). The appearance model generation engine 622 can further determine a current appearance model of the target bounding box using pixels of the current frame. The similarity engine 626 can compare the current appearance model to the initial appearance model and can determine if the current and initial appearance models are within a threshold difference of one another to determine if the texture is unchanged. In such an example, the target sleeping bounding box (instead of the current bounding box) is used to re-calculate the appearance model of the current frame within the target sleeping bounding box, and the re-calculated appearance model is compared with the maintained initial appearance model.

The threshold difference can be set to a percentage of a dimension of the target bounding box (e.g., a percentage of the diagonal length of the bounding box). The percentage can include any suitable percentage, such as 5%, 10%, 15%, 20%, or other suitable percentage. In some examples, if the current and initial appearance models are within the threshold difference, the tracker is considered a sleeping tracker and is transitioned to a sleeping state or status. For instance, if the comparison determines that the texture is unchanged (based on the threshold difference), the object tracked by the tracker may be detected as a sleeping object. In some examples, if the current and initial appearance models are within the threshold difference, the tracker can be maintained in the vanishing state (instead of being transitioned to the sleeping state). In such examples, if the tracker is later detected as lost, the sleeping object detection system 620 can check if the tracker has a vanishing status. If the tracker has a vanishing status, the sleeping object detection system 620 can perform the similarity detection sub-process (described below) again, and if the similarity detection sub-process is successful, the tracker will be transitioned to a sleeping state or status. Further details of the sleeping object detection process are described below with respect to FIG. 7A and FIG. 7B.

Figure 7A:
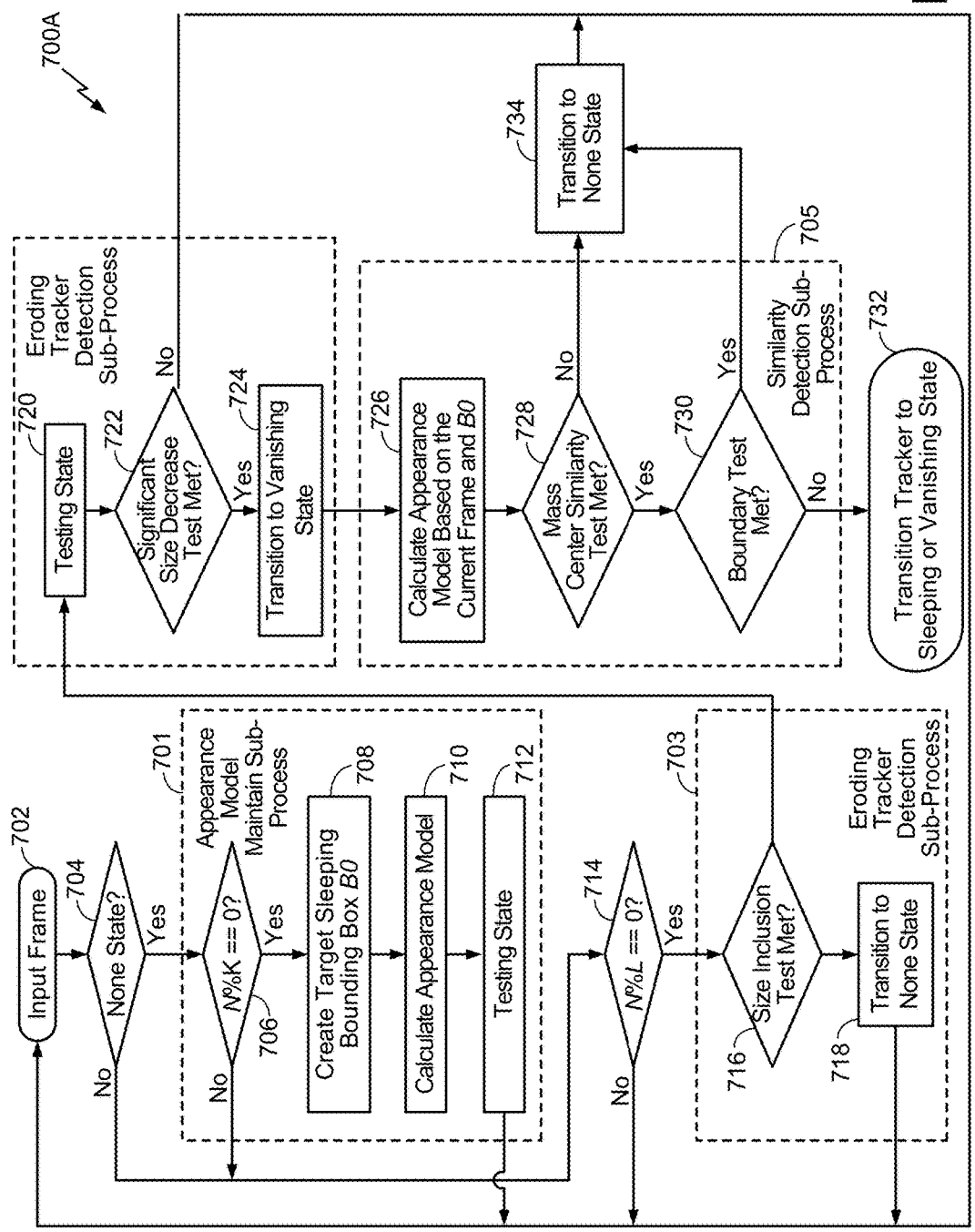
FIG. 7A is a flowchart illustrating an example of a process of detecting sleeping objects and trackers, in accordance with some examples.

FIG. 7A is a flowchart illustrating an example of a sleeping object detection process 700A for detecting sleeping objects and trackers in a scene. In some cases, the sleeping object detection system 620 can perform the process 700A. The process 700A can be performed for each frame of a sequence of video frames capturing images of the scene, or for a subset of all frames of the video sequence (e.g., every other frame, every three frames, every ten frames, or other subset). Further, the process 700A can be performed either serially or in parallel for each tracker of each input frame. In one illustrative example, the sequence of video frames can be captured by a video or image capture device (e.g., an IP camera, or other video or image capture device). In some examples, the video frames can be input to the process 700A as the video frames are captured. In some examples, the video frames can be stored in a storage device after being captured, and can be input to the process 700A from the storage device at some point after the frames are captured.

The process 700A includes several sub-processes, including an appearance model maintain sub-process 701, an eroding tracker detection sub-process 703, and a similarity detection sub-process 705. As described in more detail below, the appearance model maintain sub-process 701 can be performed to designate a bounding box of a tracker as a target sleeping bounding box and to calculate an appearance model for the target sleeping bounding box. The eroding tracker detection sub-process 703 can be performed to detect if bounding boxes associated with a certain tracked object and associated tracker are becoming smaller and smaller. The eroding tracker detection sub-process 703 can also be referred to as a vanishing blob detection sub-process. The similarity detection sub-process 705 can be performed to compare appearance models of bounding boxes associated with a certain tracked object and tracker, and, in some cases, to determine if the tracker is near or intersecting a boundary of a current video frame or picture.

The different sub-processes of the process 700A are performed based on current states of one or more blob trackers associated with the frames of the video sequence and based on defined periods. States of blob trackers can include a "none" state, a "testing" state, a "vanishing" state, a "lost" state, a "sleeping" state, or other suitable state. The appearance model maintain sub-process 701 is performed for blob trackers having a "none" state. Trackers that do not have a "testing," "vanishing," or "sleeping" state will have a "none" state. For trackers having a "testing" state, the eroding tracker detection sub-process 703 is performed. For trackers having a "vanishing" state, the similarity detection sub-process is performed 705. In some cases, a tracker may have both a "lost" state and a "vanishing" state. A tracker can be determined to be lost at a current frame when the tracker has no object to track in the current frame. For example, a tracker can be determined to be lost when a bounding box that the tracker was associated with in a previous frame is no longer in a current frame. In another example, a tracker can be determined to be lost when an object being tracked by the tracker leaves the scene, in which case the tracker may be found to not be associated with a bounding box, and thus may be transitioned to a "lost" state.

Different periods can also be defined for determining when to perform the various sub-processes for a particular tracker. For example, the condition to invoke the appearance model sub-process 701 for a tracker with a "none" state can be a periodical pattern (e.g., N % K is equal to 0 as shown in FIG. 7A). As another example, the condition to invoke the eroding tracker detection sub-process 703 for a tracker with a "testing" state can also be a periodical pattern (e.g., N % L is equal to 0 as shown in FIG. 7A).

Figure 8:
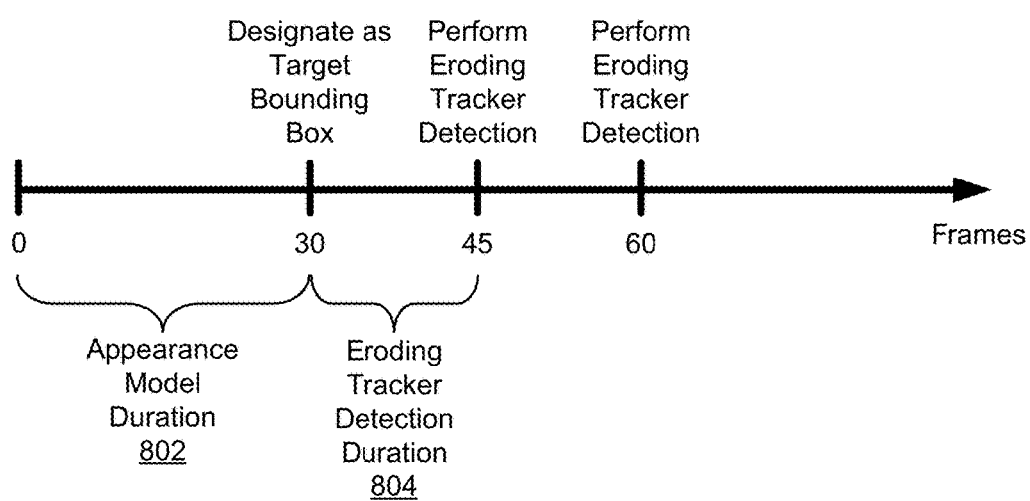
FIG. 8 is a diagram illustrating an example timeline associated with detection of sleeping objects and trackers, in accordance with some examples.

FIG. 8 shows a timeline with one illustrative example of such periods. For example, the periods can include an appearance model duration 802 and an eroding tracker detection duration 804. Determination of whether the appearance model duration 802 is met is represented in FIG. 7A as N % K=0 at step 706. The term K represents the appearance model duration 802. Determination of whether the eroding tracker detection duration 804 is met is represented in FIG. 7A as N % L=0 at step 714. The term L represents the eroding tracker detection duration 804. The term N can represent a counter for the current tracker (the tracker currently being processed). In one illustrative example, the initial number of the counter N can be made random, and the counter N can be increased by a value of 1 for every frame. Once the counter N reaches the relevant period (e.g., the appearance model duration 802 or the eroding tracker detection duration 804), the corresponding sub-process is invoked. In another illustrative example, the counter N can have an initial value of 0, and can be incremented by a value of 1 for each input frame that is input to the process 700A. In yet another illustrative example, the counter N can have an initial value equal to the relevant period (e.g., the appearance model duration 802 or the eroding tracker detection duration 804), and can be decremented by a value of 1 for each input frame that is input to the process 700A.

As described in more detail below with respect to FIG. 7A, the appearance model duration 802 defines when the appearance model maintain sub-process 701 is performed for a tracker having a "none" state, and thus when a bounding box is designated as a target sleeping bounding box and when an appearance model is calculated for the target sleeping bounding box. The eroding tracker detection duration 804 defines when the eroding tracker detection sub-process 703 is performed for a tracker having a "testing" state. The appearance model duration 802 and the eroding tracker detection duration 804 can include the same period (e.g., amount of frames or time period), or can include different periods. For example, as illustrated in FIG. 8, the appearance model duration 802 can be set to a period of 30 frames, while the eroding tracker detection duration 804 can be set to a period of 15 frames.

Returning to FIG. 7A, a current input frame is received at step 702. The current input frame can be one frame from the sequence of video frames, and can be referred to herein as the current frame. At step 704, the process 700A includes determining whether the states of one or more blob trackers for the current frame have a "none" state. The states of the trackers associated with the current frame can be checked serially or in parallel. For trackers associated with the current frame that have the "none" state, the appearance model duration (denoted as N % K) is checked to determine whether to perform the appearance model maintain sub-process 701. For example, if the appearance model duration has been met for a current tracker (N % K=0), step 708 of the appearance model maintain sub-process 701 is performed. Once a tracker is is in the "none" state, the initial bounding box after the appearance model duration is met is kept as a target sleeping bounding box. For example, at step 708, a target sleeping bounding box B0 is created for the current tracker by designating the initial bounding box of the current tracker as the target sleeping bounding box B0. The current frame at which at which the target bounding box is designated as the target bounding box is referred to herein as the initial frame. The initial bounding box is the first bounding box of the current tracker after the appearance model duration is met at 706 (the bounding box of the initial frame). The target sleeping bounding box B0 is also referred to herein as a target bounding box B0. The target bounding box B0 can be used as a reference for comparison with other bounding boxes of the current tracker that track the same object as the target bounding box B0 in subsequent frames. The remaining steps of process 700A are discussed with reference to the bounding boxes of the current tracker in the initial frame and in one or more subsequent frames obtained after the initial frame. However, one of ordinary skill will appreciate that the steps can also be performed for other trackers of the current frame.

Once a target sleeping bounding box is created, an appearance model of the target sleeping bounding box is created for the initial frame (the frame at which the target bounding box was designated as the target bounding box) using pixels of the initial frame. For example, at at step 710, the process 700A includes calculating an appearance model for the target bounding box B0 of the current tracker. In some cases, step 710 can be performed by the appearance model generation engine 622. The appearance model calculated for the target sleeping bounding bounding box B0 using pixels of the initial frame is denoted as the initial appearance model. The The appearance model can be updated by calculating appearance models for bounding boxes of the tracker in one or more subsequent frames obtained after the initial frame. In some implementations, an appearance model may be calculated for each bounding box of the tracker at each frame. In some implementations, for the purpose of detecting the sleeping objects, lower frequency updating of the appearance model can be sufficient because, once the object starts to fade into the background, it may take seconds to complete the process 700A, and a delay of several frames in the initial stage (of the fading) may not cause huge bounding box differences in terms of both location and size.

An appearance model of a bounding box includes one or more color characteristics of the pixels included in the bounding box. For example, the one or more color characteristics can include a color feature space of pixels included in the bounding box, a color mass center of pixels included in the bounding box, or a combination thereof. In some examples, the color feature space can be the quantized color spaces, using the luminance (Y) and hue (H) components of an HSV color space. In some examples, the features of the feature space may be from the Y, U and V components of a YUV color space (e.g., the YUV 4:2:0 space, YUV 4:4:4 space, YUV 4:2:2 space, or other suitable YUV color space). In some examples, the color mass center of the appearance model of each bounding box can be calculated by counting the mass center of the feature space applied to the pixels within the bounding box. For instance, a color probability model can first be determined by calculating the probability of the feature value in each pixel location, and then the mass center of all pixels within the whole bounding box can be calculated according to the per-pixel probability model.

In some cases, when calculating the color probability model, the color space of the bounding box may need to be quantized so that the probability model is limited to contain only up to a fixed number of entries (e.g., 1024 for Y and H component or 2048 for YUV). In some cases, when calculating the color mass center, the pixel locations may also need to be quantized. For example, when contributing to the calculation of the mass center, the X and Y coordinate may be quantized (e.g., by a right shift of 2 (divided by 4), or other suitable amount) such that the bounding box is divided into small grids. Even though each pixel within a grid may have a different probability, each pixel's coordinates are considered the same when calculating the mass center. Using such quantized pixel locations can allow the process 700A to be more robust to distortions (e.g., a small phase shift of the pixels of input images).

Detailed implementations are now described as illustrative examples. An illustrative example of an implementation of the YUV color probability model includes (Note that this process establishes an appearance model which is illustrated by the array of HIST):

1. Initialize the color histogram HIST to all zeros.
2. For each pixel P in the bounding box, get its Y, U, V components, each components are 8 bits.
3. Quantize the YUV components as Y=Y>>3, U=U>>5, V=V>>5; [with >> being a right bit shift operator]
4. The HIST index is given by idx=(Y<<6)+(U<<3)+V; [with <<being a left bit shift operator]
5. Then increase the HIST(idx) by 1.
6. Finally, HIST is normalized by the bounding box size.

An illustrative example of an implementation of the mass center calculation includes:

1. Initialize the mass center (CX, CY) as (0, 0). Set the sum of probability P_SUM=0.
2. Given the color histogram HIST, for each pixel P in the bounding box, get its Y, U, V components and do the following:
3. Quantize the YUV components as Y=Y>>3, U=U>>5, V=V>>5;
4. The HIST index is given by idx=(Y<<6)+(U<<3)+V;
5. P_SUM=P_SUM+HIST(idx)
6. Get the pixel coordinates X and Y.
7. Update the mass center as CX=CX+(X>>2)*HIST(idx), CY=CY+(Y>>2)*HIST(idx).
8. Finally, normalize the (CX, CY) by the P_SUM.

In the frame the appearance model is just calculated for, the mass center can be calculated (similarly as in step 6 and step 7) in order to know the initial mass center of the appearance model. In some cases, the appearance model of each bounding box is designed in a way that all pixels of a bounding box are maintained. In other cases, the appearance model of each bounding box is designed in a way that it is always of a constant size regardless of the bounding box size. In such cases, the possibility of uncontrollable memory increase is avoided, which may occur when multiple large bounding boxes exist.

In some cases, once the target sleeping bounding box B0 is set for the current tracker at step 708, the current tracker is transitioned to the "testing" state at step 712. In some cases, the current tracker is transitioned to the "testing" state (at step 712) once the appearance model is calculated at step 710 for the target sleeping bounding box B0. At a later point in time, if the state of the current tracker is transitioned to the "none" state (e.g., after the size inclusion test at step 716, after the significant size decrease test at 722, after the mass center similarity test at step 728, or at some other point during the process 700A), the target sleeping bounding box for the current tracker will be changed to another bounding box of the current tracker for a different initial frame. While the current tracker is in the "testing" state, a bounding box history of the tracker is maintained that includes each bounding box of the tracker in one or more subsequent frames after the initial frame. In some cases, the bounding boxes within the history for the tracker present a shrinking behavior of the tracker when the tracker is tracking an object in motion that becomes stationary in the scene (a potential sleeping tracker). The bounding box history of a tracker is kept and is updated as subsequent input frames (after the initial frame) and associated bounding boxes of the tracker are processed. By keeping and updating the history of bounding boxes for the tracker, it is ensured that once the detection of a vanishing tracker is confirmed (during the eroding tracker detection sub-process 703 below), the original bounding box at the time instance (or frame) the object became vanishing is available.

The eroding tracker detection sub-process 703 is applied once the tracker is in the "testing" state and the eroding tracker detection duration has been met (e.g., once for every L frames, such as every 15 frames, every 30 frames, or the like). For example, at step 714, the eroding tracker detection duration is checked for the current tracker in one or more subsequent frames (determined based on the eroding tracker detection duration) after the initial frame at which the target bounding box was designated, and if the eroding tracker detection duration has been met (N % L==0), the eroding tracker detection sub-process 703 is performed. In some examples, the frequency of eroding tracker testing (the eroding tracker detection duration) can be made higher than the frequency of the appearance model maintain sub-process 701 (the appearance model duration), as shown in FIG. 8. In some examples, the eroding tracker detection duration and the appearance model duration include the same period (e.g., same number of frames or same time period).

The eroding tracker detection sub-process 703 includes comparing a tracker's bounding box of a newly received input frame (now the current frame) to the bounding boxes of the same tracker but in previous frames (e.g., the target sleeping bounding box). For example, the eroding tracker detection sub-process 703 can include a size inclusion test (performed at step 716) and a significant size decrease test (performed at step 722).

Once the eroding tracker detection duration is determined to have been met at step 714 (e.g., a threshold number of frames has been received), the size inclusion test is performed at step 716 on a current bounding box of the current tracker for the current frame. For a vanishing tracker (and potentially a sleeping tracker), the region of the bounding box in the current frame should be within the bounding box of a previous frame (e.g., the target sleeping bounding box). The size inclusion test can be applied to determine whether the current bounding box of the current frame is included in a previously tested bounding box of the same tracker. For example, the previously tested bounding box can include the target bounding box B0 of the current tracker.

In one illustrative example, the size inclusion test compares the current bounding box of the current tracker with the target sleeping bounding box B0 of the current tracker. In some examples, the size inclusion test can be based on sizes of the current and target bounding boxes. In such examples, the current bounding box is determined to be within the target bounding box B0 when a size of the current bounding box is smaller than a size of the target bounding box B0. In some examples, the size inclusion test can be based on sizes of the current and target bounding boxes as well as the location of the current bounding box relative to the target bounding box. In such examples, the current bounding box is determined to be within the target bounding box B0 when the size of the current bounding box is smaller than the size of the target bounding box B0 and when the boundaries of the current bounding box are entirely within the boundaries of the target bounding box B0. The location of the current bounding box can be the current tracker's identified location in the current frame (based on a blob location the tracker is associated with in the current frame) or the current tracker's predicted location from a previous frame (a location in the previous frame of a blob with which the blob tracker was associated).

If the current bounding box is determined to be included in the target sleeping bounding box B0 or other previous bounding box (a "yes" decision is made at step 716), the inclusion test is successful and the state of the tracker can be maintained or transitioned to a "testing" state at step 720. However, if the current bounding box is determined to not be included in the target sleeping bounding box B0 or other previous bounding box (a "no" decision is made at step 716), the inclusion test fails and the state of the tracker can be transitioned to the "none" state at step 718. For example, if the size inclusion condition is not met, the eroding tracker detection sub-process 703 terminates by transitioning the tracker to the "none" state at step 718.

The significant size decrease test is applied at step 722 when the current tracker is maintained or transitioned to the "testing" state at step 720 (after the size inclusion test is successful). The significant size decrease test can be performed to determine whether there has been a significant size decrease of the current tracker's bounding boxes since the initial frame at which the target bounding box B0 was designated. For example, a size of the current bounding box of the current tracker can be compared to a size of a previous bounding box of the tracker (in a previous frame) to determine if the current bounding box is significantly smaller than the previous bounding box. In some cases, the previous bounding box can be the target bounding box B0 of the current tracker. In some cases, the previous bounding box can include a bounding box (of the current tracker) from any frame obtained between the initial frame and the current frame.

The significant size decrease test can be based on a threshold amount of size reduction in the current bounding box as compared to the size of the target bounding box B0 (or other previous bounding box). For example, the threshold amount can include a percentage size (e.g., 30%, 40%, 50%, or other suitable percentage) of the target bounding box B0. In one illustrative example, the current bounding box can be determined to be significantly smaller than the target bounding box B0 (a significant size decrease has occurred) when the size of the current bounding box is at least 50% smaller than the size of the target bounding box B0. In such an example, if the current bounding box is at least half the size of the target bounding box B0, the current bounding box is determined to have undergone a significant size decrease as compared to the target bounding box B0.

In some examples, in addition to comparing the size of the current bounding box of the tracker with the size of the previous bounding box of the tracker, the significant size decrease test can further determine if there has been a threshold number of bounding boxes or frames (e.g., at least three, four, five, or other suitable number of bounding boxes) involved in the eroding tracker detection sub-process 703 for the current tracker (e.g., since the current target bounding box B0 for the current tracker was created). In one illustrative example, the significant size decrease test is met when the current bounding box has undergone a significant size decrease and if there have been at least three (or other suitable number) bounding boxes involved in the eroding tracker detection sub-process 703 for the current tracker.

The current tracker can be determined to be a vanishing or eroding tracker when the significant size decrease test is met by the current bounding box (e.g., the current bounding box is determined to have undergone a significant size decrease and, in some cases, when the threshold number of bounding boxes has been analyzed in the eroding tracker detection sub-process 703). For example, the state of the current tracker can be transitioned from a "testing" status to a "vanishing" or "eroding" status at step 724 when the significant size decrease test is satisfied (a "yes" decision) at step 722.

If the significant size decrease test is not met at step 722 (a "no" decision), the state of the current tracker can be maintained in the "testing" state. Input frames are then received until the next eroding tracker detection duration is met at step 714 (e.g., a threshold number of frames has been received). A new current bounding box of a new current frame can then be analyzed using the size inclusion test and, if the size inclusion test is met, using the significant size decrease test.

The similarity detection sub-process 705 is performed for trackers having a "vanishing" status. The similarity detection sub-process 705 can be performed, in part, to verify that the object or blob being tracked by the current tracker (the potential sleeping object) remains in the same location in the scene as it was located when the target sleeping bounding box B0 was created. In some cases, the similarity detection sub-process 705 can also determine if the current tracker is within a certain distance of a boundary of the frame or picture, or if the current tracker is intersecting the boundary.

The similarity detection sub-process 705 calculates, at step 726, an appearance model using the pixels of the current frame based on the target sleeping bounding box B0. The appearance model calculated for the target bounding box B0 using the pixels of the current frame is referred to as the current appearance model. For example, the current appearance model is calculated using the pixels in the current frame that the target bounding box B0 would contain if included in the current frame. At step 728, a mass center similarity test is performed. The mass center similarity test includes comparing a similarity between the current appearance model and the initial appearance model. As previously described, the initial appearance model is the appearance model calculated at step 710 for the target bounding box B0 using pixels of the initial frame for which the target bounding box B0 was designated.

In one illustrative example of the mass center similarity test, the probability color histogram model for the initial appearance model is denoted as M, and the corresponding mass center for the initial appearance model is denoted as C0. The probability color histogram model M can be used to calculate the mass center C of the current appearance model. For example, the mass center C can be calculated using the example mass center calculation described above. The The histogram (denoted as HIST above, illustrating the appearance model) can be calculated in a previous frame using the example appearance model calculation above. Values of C and C0 are then compared to determine how close together the values are. If C0 and C are very close to each other, according to a similarity threshold, the corresponding tracker is detected as a sleeping object tracker. In some examples, the mass center similarity test can be denoted as |C0−C|<α, (wherein |.| is, e.g., the L-2 norm) for some α>0 (wherein α is the similarity threshold). In one illustrative example, the similarity threshold α may be set to be a percentage (e.g., 5%, 10%, 15%, or other suitable percentage) of the diagonal length of the target sleeping bounding box B0. For example, if the difference between the mass center C of the current bounding box and the mass center C0 of the initial bounding box is within the threshold percentage of the diagonal length of the target sleeping bounding box B0, the similarity between the mass centers C and C0 meets the mass center similarity test.

If the similarity between the mass centers C and C0 is not sufficient (a "no" decision at step 728), the current tracker is transitioned to a "none" state at step 734. For a future iteration of the process 700A for the current tracker, step 704 will result in a "yes" decision and the appearance model maintain sub-process 701 can be performed to create a new target sleeping bounding box for the current tracker.

In some implementations, if the similarity between the mass centers C and C0 is sufficient (a "yes" decision at step 728), the current tracker is detected to be a sleeping object tracker (at step 732) that is tracking a sleeping object. For example, the current tracker can be transitioned to a "sleeping" state at step 732. In such implementations, the sleeping tracker can then be output to a tracking system (e.g., object tracking system 106) so that the tracking system can continue tracking the sleeping object. For example, the tracker can be shown as tracking the sleeping object with a bounding box that is in the same location as the target sleeping bounding box, or in a location of a bounding box of a frame received after the initial frame for which the target bounding box was designated.

In some implementations, after the similarity detection sub-process 705 is performed, the current tracker can be kept as a vanishing tracker until the current tracker is detected to be lost. As noted previously, a tracker can be determined to be lost for a current frame when the tracker has no object to track in the current frame (e.g., when a bounding box that the tracker was associated with in a previous frame is no longer in the current frame, when an object being tracked by the tracker leaves the scene, or the like). In such implementations, if the similarity between the mass centers C and C0 is sufficient (a "yes" decision at step 728), the current tracker is maintained in the vanishing state at step 732 (instead of being transitioned to the sleeping state). If the tracker is later detected as being lost, the sleeping object detection system 620 can check if the tracker has a vanishing status. If the tracker has a vanishing status, the sleeping object detection system 620 can perform the similarity detection sub-process 705 again for the current tracker. If the similarity detection sub-process 705 determines the similarity between the the mass centers C and C0 is sufficient (and, in some cases, determines the tracker is not too close to a boundary, as described below), the tracker will be transitioned to a sleeping state.

Figure 7B:
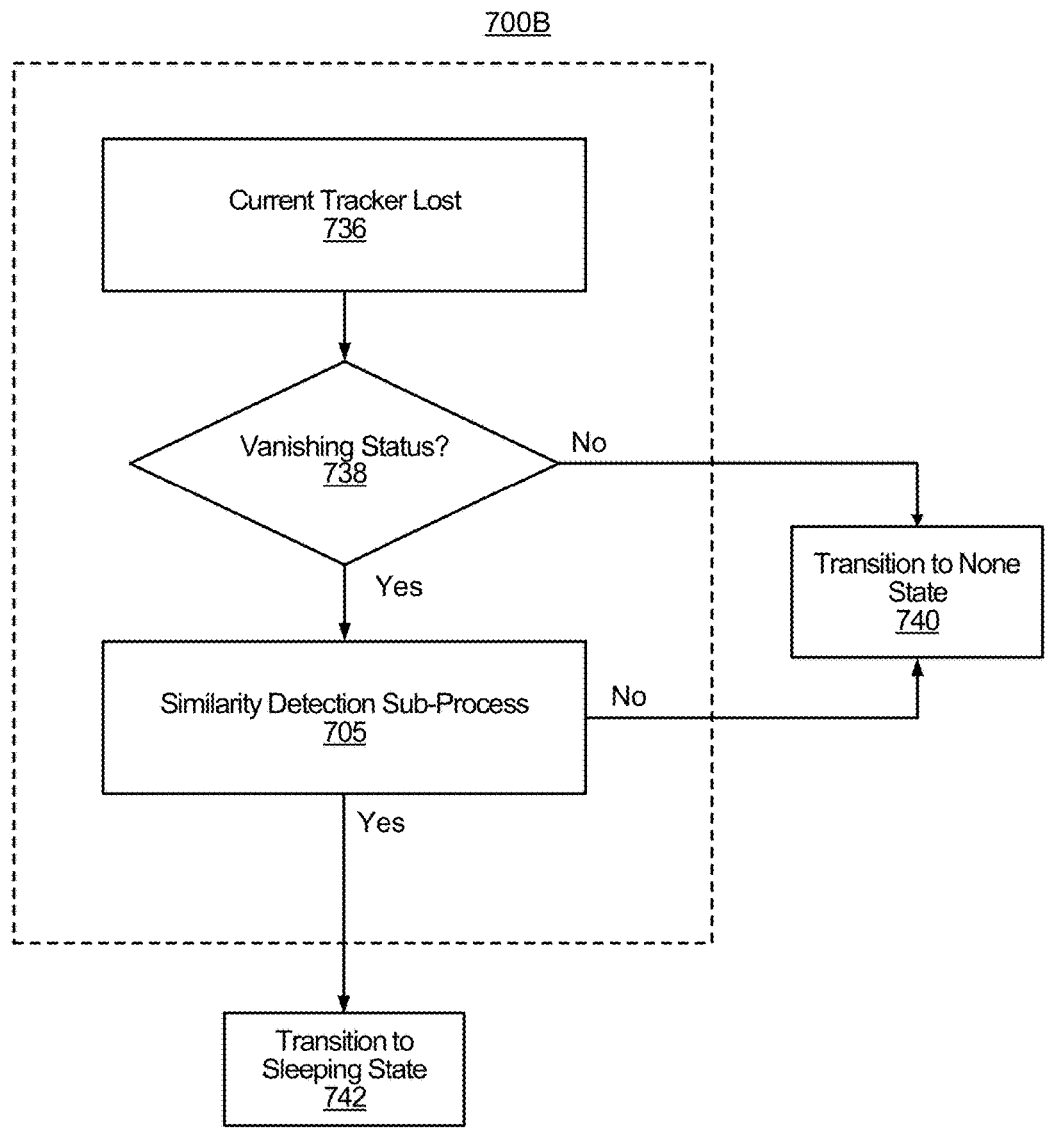
FIG. 7B is a flowchart illustrating another example of a process of detecting sleeping objects and trackers, in accordance with some examples.

The process 700B shown in FIG. 7B can be performed to determine whether to transition the current tracker to the sleeping state. At step 736, the current tracker is determined to be lost in a subsequent frame obtained after the current frame for which the frame was determined to be vanishing. For example, it can be determined that the current tracker is not associated with any bounding box in the current frame, in which case the tracker is determined to be lost. When the tracker is determined to be lost, the process 700B can determine whether the current tracker has a vanishing status at step 738. If the current tracker is determined to have a vanishing status (a "yes" decision at step 738), the similarity detection sub-process 705 can be performed again for the current tracker. For example, the appearance model can be updated (a new current appearance model) using the pixels of the subsequent frame based on the target sleeping bounding box B0, and a new mass center similarity test can be performed using the updated appearance model. The similarity detection sub-process 705 can then determine whether the similarity between updated mass center C and the initial appearance model mass center C0 is sufficient (and, in some cases, to determine the tracker is not too close to a boundary, as described below). If step 728 determines the mass centers C and C0 are similar enough, the tracker will be transitioned to a sleeping state at step 742. At step 738, if the current tracker is determined not to have a vanishing status, current tracker is transitioned to the none state at step 740. If the similarity detection sub-process 705 is not satisfied (e.g., the mass centers C and C0 are not similar enough or the tracker is too close to a boundary), the current tracker is transitioned to the none state at step 740.

As referenced above, in some implementations, the similarity detection sub-process 705 can also perform a boundary test at step 730. In some implementations, the boundary test may not be performed. The boundary test can be performed since behaviour similar to that of a sleeping object might be performed by an object that is close to leaving a scene, has partially left the scene, or that recently left the scene. For example, in each of these cases, the bounding boxes of the tracker tracking the object will become smaller, and the mass center similarity test will likely be satisfied. In such cases, the boundary test can detect if a moving object is close to a picture boundary or leaving the picture (intersecting the picture boundary). A picture boundary can include the boundary of a frame capturing the scene, a portion of the scene that is displayed, or other suitable boundary. In one illustrative example, if the distance of the tracker to a boundary of the picture (e.g., a left boundary, a top boundary, a right boundary, a bottom boundary, a left-top boundary, a right-bottom boundary, or other suitable boundary) is less than a threshold distance (e.g., within 20% of the width and/or height of the target sleeping bounding box B0) or has already been partially outside of the picture boundary, the tracker is considered to have just left the scene instead of being still. If the object is detected as being close to the picture boundary (within the threshold distance) or intersecting the picture boundary, the tracker is not identified as a sleeping object tracker. For example, the tracker can be transitioned to the "none" state at step 734. If the object is detected as not being close to the boundary or not intersecting the boundary, the tracker can be transitioned to the sleeping state or maintained in the vanishing state, as described above.

As illustrated in FIG. 7A, once a tracker has gone through the "vanishing" status, it is either maintained in the vanishing status, detected as a sleeping object tracker with a sleeping status, or its status is set to "none", in which case the process 700A analyzes future frames for possible sleeping objects. In some cases, as an alternative, when a tracker having a "vanishing" state is not detected as a sleeping object tracker (e.g., the mass center similarity test fails at step 728), the appearance model together with the target sleeping bounding box of the current tracker can be updated and the current tracker can be transitioned to the "testing" state. In such cases, the frequency of the appearance model update can be increased when the tracker is already in the "vanishing" state, allowing more chances to capture at least part of an object turning into a sleeping object. For example, as noted previously, the eroding tracker detection duration can be shorter than the appearance model duration in some implementations.

Using the above-described techniques, an object can be detected and tracked as a sleeping object, even when the object is absorbed into the background by the background subtraction process. As previously noted, issues remain even after a sleeping object has been detected, including issues with maintaining and tracking such sleeping objects. For example, issues can arise if a sleeping object interacts with other objects, if the sleeping object begins moving after being stationary for some period of time, if changes in scene conditions occur (e.g., changing lighting conditions), or in various other situation. Sleeping object systems and methods are described herein to accurately track and maintain sleeping objects as such situations occur.

Figure 9:
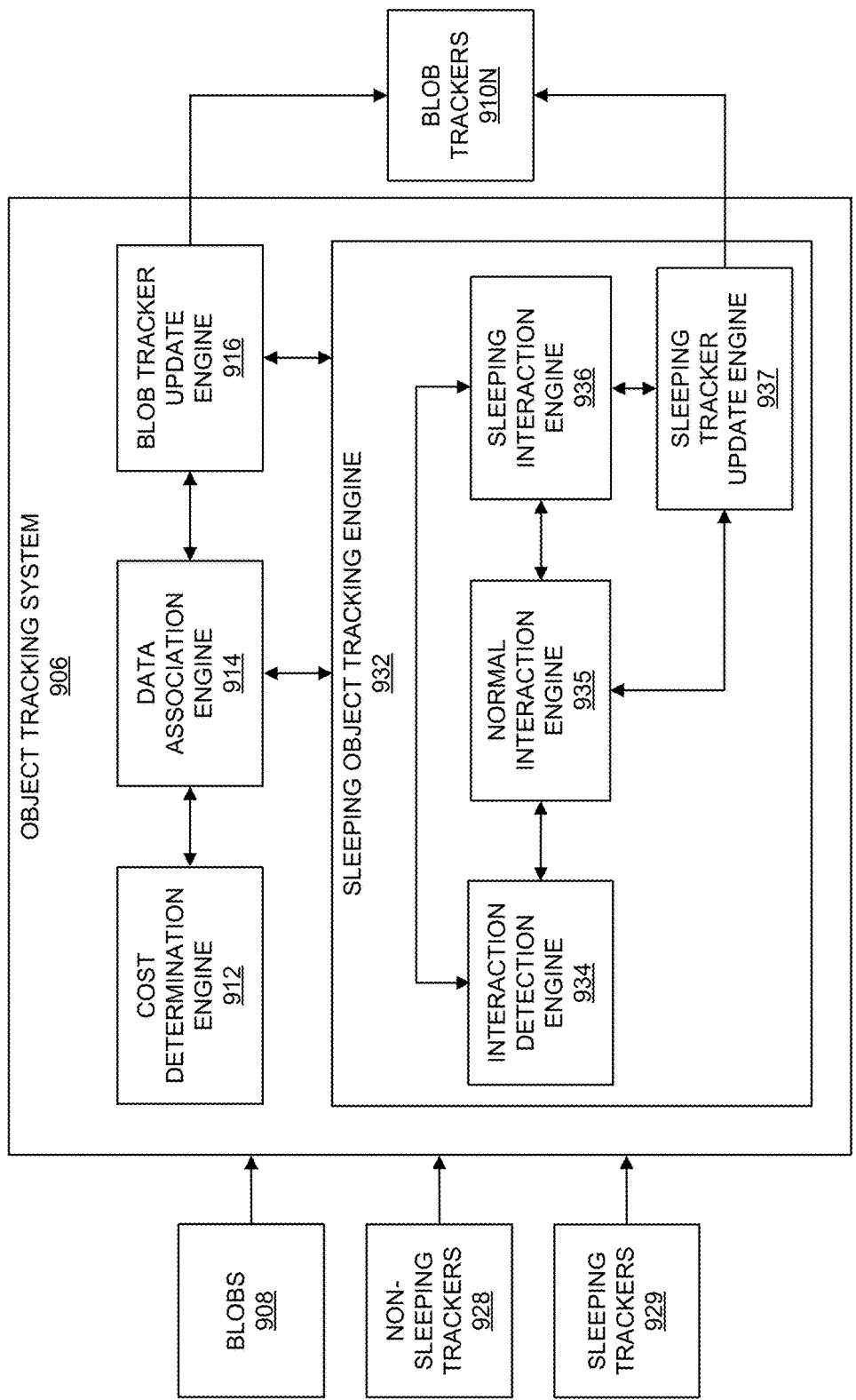
FIG. 9 is a block diagram illustrating an example of an object tracking system, in accordance with some examples.

A sleeping object tracking process can be performed by an object tracking system. FIG. 9 shows an example of an object tracking system 906. The object tracking system 906 can comprise the sleeping object detection system (e.g., the sleeping object detection system 620), or can be a separate component of the video analytics system than the sleeping object detection system. A detailed example of the sleeping object tracking process is described below with respect to FIG. 10-FIG. 17. The object tracking system 906 can perform object tracking on a frame-by-frame basis. The frame currently being processed by the object tracking system 906 is is referred to as a current frame. The input to the system 906 includes a list of the blobs 908 (e.g., the bounding boxes of the blobs) detected for one or more video frames by a blob detection system. The input also includes the sleeping object trackers 929 detected by the sleeping object detection system and the non-sleeping object trackers 928 for the one or more video frames. The The non-sleeping object trackers 928 include all trackers that are not sleeping object trackers (e.g., normal trackers, new trackers, merge trackers, split trackers, lost trackers, or other types of trackers), and can also be referred to as normal object trackers. The output of the sleeping object object tracking system 906 includes a list of updated blob trackers 910N. As described above with respect to the object detection system 104, the object tracking system 906 can perform object tracking using the updated trackers 910N, and can also provide the updated trackers 910N for use in processing a next frame.

In some implementations, the object tracking system 904 can consider the non-sleeping trackers 928 (which may be new, merge, split, lost, or other types of trackers other than sleeping trackers) and the sleeping trackers 929 as two separate layers in the system, in which case the object tracking system 904 deals with the conventional tracking of the non-sleeping trackers 928 without considering the sleeping objects trackers 929. For example, during the multi-to-multi association process between the non-sleeping trackers 928 and the blobs 908, the state machine maintenance process, and any other processes, the sleeping object trackers are considered as if they were not existing. In other implementations, the object tracking system 904 can consider the sleeping trackers 929 and the non-sleeping trackers 928 together.

The object tracking system 906 includes a cost determination engine 912, a data association engine 914, and a blob tracker update engine 916, similar to the object tracking system 106 described above with respect to FIG. 4. As described above, the cost determination engine 912 can obtain the blobs 908 detected for a current video frame (by a blob detection system) and the non-sleeping trackers 928 updated from a previous video frame. In some cases, when the non-sleeping trackers 928 and sleeping trackers 929 are considered together by the tracking system 906, the sleeping trackers 929 detected for the current frame and/or for previous frames can be input to the cost determination engine 912. In cases in which the non-sleeping trackers 928 and the sleeping trackers 929 are considered as two separate layers, the sleeping object trackers 929 can be input directly to the sleeping object tracking engine 932 (described below). The cost determination engine 912 can perform a cost function to calculate costs between the blobs 908 and the trackers 928 (and, in some cases, the trackers 929). Any suitable cost function can be used to calculate the costs, including those described above or any other suitable cost function.

Data association between the blobs 908 and the non-sleeping trackers 929 (and in some cases, the sleeping trackers 928), as well as updating of the trackers 928 and 929, for the current frame can be based on the determined costs. For example, when blobs (making up at least portions of objects) are detected for a current frame, blob trackers from a previous video frame need to be associated with the blobs in the current frame according to the cost calculation performed by the cost determination engine 912. The data association engine 914 can match or assign a tracker (or tracker bounding box) with a corresponding blob (or blob bounding box), and vice versa. Any suitable data association technique can be used, as described above. For example, as described previously, the lowest cost tracker-blob pairs may be used by the data association engine 914 to associate the trackers 928 and 929 with the blobs 908. As another example, the Hungarian method can be used to optimize a global cost across all blob trackers 928 and 929 with the blobs 908 in order to minimize the global cost. The blob tracker-blob combinations are put in a cost matrix, and the blob tracker-blob combinations in the cost matrix that minimize the global cost can be determined and used as the associated or matched tracker-blob pairs. As noted above, in some cases, sleeping object detection can be performed for a tracker for a current frame before or after data association (e.g., Kalman filter) is performed for the current frame. The sleeping trackers 929 may not be associated with any detected blob by data association since the blobs that are tracked by the sleeping trackers are at least partially absorbed into the background since they represent sleeping objects. The sleeping trackers 929 can be provided to the sleeping object tracking engine 932 for tracking and updating.

Once the association between the blobs 908 and the non-sleeping blob trackers 928 (and in some cases, the sleeping trackers 929) has been completed, the blob tracker update engine 916 can use the information of the associated blobs, as well as the trackers' temporal statuses, to update the status (or states) of the trackers 928 (and the sleeping trackers 929 in some cases) for the current frame. The blob tracker update engine 916 can perform similar operations as the blob tracker update engine 416 described with respect to FIG. 4. Upon updating the non-sleeping trackers 928 and possibly the sleeping trackers 929, the blob tracker update engine 916 can perform object tracking using the updated trackers 910N, and can also provide the updated trackers 910N for use in processing a next frame.

The object tracking system 906 also includes a sleeping object tracking engine 932. The sleeping object tracking engine 932 can maintain and track sleeping objects based on interactions and changing conditions related to the sleeping object trackers 929 associated with the sleeping objects. The sleeping object tracking engine 932 includes an interaction detection engine 934, a normal interaction engine 935, a sleeping interaction engine 936, and a sleeping tracker update engine 937. The interaction detection engine 934 can detect or identify interactions between sleeping object trackers and other trackers, such as interactions between a sleeping object tracker and one or more of the other sleeping object trackers 929 or interactions between a sleeping object tracker and one or more of the non-sleeping object trackers 928.

The normal interaction engine 935 can analyze the interactions of sleeping trackers with non-sleeping trackers. For example, each individual sleeping object tracker's interaction with one or more normal trackers can be considered. Based on such interactions, the sleeping tracker update engine 937 may convert one or more of the sleeping object trackers to a normal tracker, identify if and when there is an interaction with normal trackers, confirm such interactions are occurring or that there has been a duration that no such interaction has occurred, in which case the appearance model of one or more of the sleeping object trackers may be re-checked to determine if the sleeping objects still have a sleeping status, and/or perform other operations.

The sleeping interaction engine 936 can analyze the interactions of sleeping trackers with other sleeping trackers. For example, each sleeping object tracker's interaction with other sleeping object trackers can be considered. Based on such interactions, the sleeping tracker update engine 937 may determine an appearance model of one or more of the sleeping trackers needs to be updated, combine multiple sleeping object trackers into one, remove a sleeping object tracker once multiple sleeping trackers have been generated from the sleeping object tracker, and/or perform other operations.

The sleeping tracker update engine 937 can update the sleeping trackers based on the analysis from the normal interaction engine 935 and the sleeping interaction engine 936. For example, after all the interactions have been examined, an appearance model update process can be invoked for each tracker. For example, the appearance model update process can be performed for a current sleeping tracker to determine whether the appearance model maintained for the current sleeping tracker needs to be updated to accommodate recent changes that have an impact on the sleeping object tracker. Based on the model update process, it can be determined whether the current sleeping tracker is still considered to be a sleeping tracker that is tracking a sleeping object. The updated sleeping trackers can then be output for inclusion the in the list of blob trackers 910N.

As noted above, the normal interaction engine 935 can analyze the interactions of sleeping trackers with non-sleeping trackers, which can be referred to as normal tracker interactions. Further details regarding normal tracker interactions are described below with respect to FIG. 11-FIG. 12. In some examples, an interaction of a non-sleeping object tracker with a sleeping object tracker can be determined using the bounding box information of the current frame (e.g., the locations of the bounding boxes of a normal tracker and a sleeping tracker that are interacting) and using temporal information related to the normal object tracker. For example, once a tracker is created (e.g., a new tracker that is not yet considered as being stable enough for output), the normal interaction engine 934 can maintain or store an indication of whether the non-sleeping tracker interacts with any sleeping object tracker. As described below with respect to FIG. 10, there are two types of new trackers that interact with a sleeping tracker, the first type referred to as "born and dead" trackers and the second type referred to as "grown up and left" trackers. A "born and dead" can include a tracker created within the sleeping tracker bounding box that never turns to normal (its life cycle is terminated before it is output at the system level) and whose whole motion trajectory is associated with a sleeping object tracker. A "grown up and left" tracker can include a tracker created within the sleeping tracker bounding box that turns to normal and eventually leaves the region of the sleeping tracker's bounding box. In some examples, as described in more detail below, an interaction between the first type of trackers and a sleeping object tracker may lead to an update of the target sleeping bounding box and the appearance model of the sleeping object tracker. In some examples, as described in more detail below, an interaction between the second type of trackers and a sleeping object tracker may lead to conversion of the sleeping object tracker to a normal tracker, since the object may start moving again when such an interaction occurs.

When creating a current new tracker, it can be determined through the interaction between the bounding box of the current new tracker and the bounding box of a sleeping tracker whether the current new tracker should be associated with the sleeping tracker. For example, when an intersection between the bounding box of the new tracker and the bounding box of the sleeping tracker is not empty (there is overlap between the bounding boxes), such a sleeping object tracker is considered as being associated with the new tracker (e.g., by the interaction detection engine 934). In some examples, a sleeping tracker is associated with a non-sleeping tracker (e.g., a normal tracker) if, when the non-sleeping tracker is created, it interacts with the sleeping tracker. If such a non-sleeping tracker never gets a chance to be output (is not converted to normal status) and gets killed, it is considered "born and dead", and is otherwise considered "grown up and left" since the tracker likely will go outside the bounding box of the sleeping object tracker.

In some implementations, when multiple sleeping object trackers are associated with a new tracker, a most relevant sleeping object tracker can be chosen as being associated with the new tracker. For example, the sleeping object tracker that overlaps the most with the new tracker can be selected as the most relevant sleeping object tracker. In another example, the bounding box of a sleeping tracker can be extended or enlarged (e.g., by M pixels or a certain percentage of its width and/or height at each boundary, such as by 10%, 15%, 25%, or other suitable percentage), and the intersection between the extended sleeping tracker bounding box and the bounding box of the new tracker can be calculated. The size ratio between the intersection region (bounding box) and the sleeping object bounding box can then be calculated. The sleeping object tracker that has the largest ratio can be chosen to be the most relevant sleeping tracker. In such cases, even when the non-sleeping tracker was born or generated within a region belonging to two or more sleeping object trackers, it is associated uniquely with the most relevant sleeping object. In other implementations, a new tracker may be associated with two or more sleeping object trackers, in which case the new tracker can be associated with any sleeping object tracker for which there is a bounding box intersection (that is not empty) between the bounding box of the new tracker and the sleeping object tracker bounding boxes.

Figure 10:
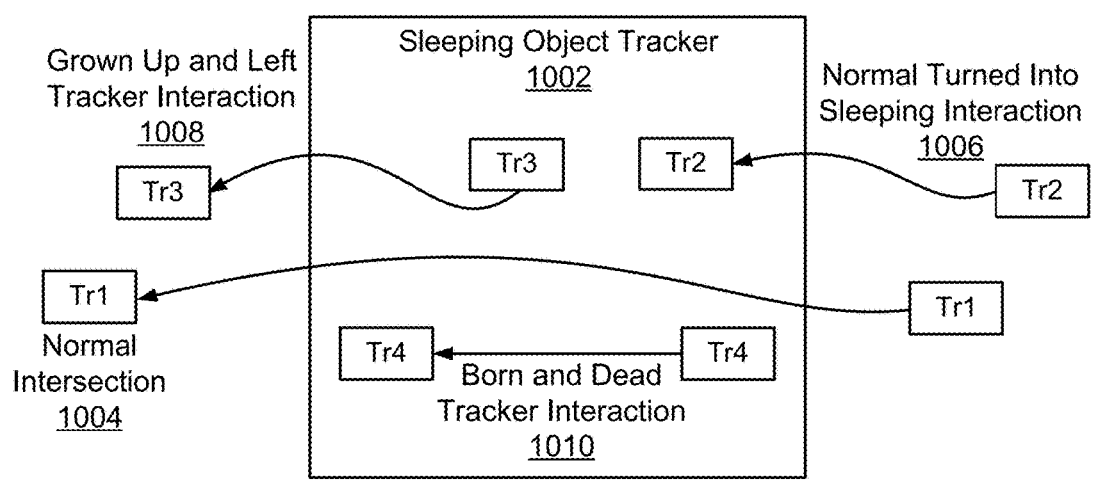
FIG. 10 is a diagram illustrating examples of a sleeping object tracker interactions with normal trackers, in accordance with some examples.

FIG. 10 is a diagram illustrating motion trajectories of various non-sleeping trackers and their interactions with a sleeping object tracker 1002. While FIG. 10 is shown using normal trackers as examples, similar interactions can occur between the sleeping object tracker 1002 and trackers having a new status, a hidden status, a lost status, or other suitable status. As shown in FIG. 10, there are at least four different types of tracker interactions for a given already established sleeping object tracker (SOT). Each type of interaction can happen alone, or in combination with other interactions.

A first type of normal tracker interaction includes a "normal" intersection or interaction, which includes a non-sleeping tracker bounding box that initially has no interaction with the current SOT 1002 (e.g., in a first frame), at some point goes spatially through the SOT 1002 by overlapping or intersecting with the SOT 1002 bounding box (e.g., in at least a second frame), and later spatially goes outside of the SOT (e.g., in a third frame). An example normal intersection 1004 is shown in FIG. 10, where the bounding box of tracker Tr1 starts outside of the bounding box of the SOT 1002 in at least a first frame. The bounding box of the tracker Tr1 then intersects with the SOT 1002 bounding box for one or more frames obtained after the first frame. Some number of frames later, the tracker Tr1 bounding box has passed through and no longer intersects with the bounding box of the SOT 1002.

A second type of normal tracker interaction includes a "normal turned into sleeping" interaction, which includes a non-sleeping tracker that initially has no interaction with the current SOT 1002 (e.g., in a first frame), and that goes spatially into the SOT 1002 by overlapping or intersecting with the SOT 1002 bounding box (e.g., in at least a second frame), and later becomes a sleeping object tracker itself. An example normal turned into sleeping interaction 1006 is shown in FIG. 10, in which case the bounding box of tracker Tr2 starts outside of the bounding box of the SOT 1002 in at least a first frame, and then intersects with the SOT 1002 bounding box for one or more frames obtained after the first frame. The tracker Tr2 is then detected as a sleeping tracker while intersecting with the SOT 1002.

A third type of normal tracker interaction includes a "grown up and left" tracker interaction. Such an interaction includes a tracker that was created (as a new tracker) within a region covered by the bounding box of the SOT 1002, and some number of frames later is transitioned to a normal tracker and then spatially goes outside of the SOT 1002 bounding box region by no longer intersecting with the SOT 1002 bounding box. An example grown up and left tracker interaction 1008 is shown in FIG. 10, where the tracker Tr3 is generated within the region of the bounding box of the SOT 1002 for a first frame. The tracker Tr3 is then transitioned to normal for a second frame obtained any time after the first frame. For example, the tracker Tr3 may be transitioned from new to normal after being associated with one or more blobs for the threshold duration TD1. After becoming normal, some number of frames later, the tracker Tr3 travels outside of the bounding box of the SOT 1002 and no longer intersects with the bounding box of the SOT 1002.

A fourth type of normal tracker interaction includes a "born and dead" tracker interaction. A born and dead tracker interaction includes a tracker that was created (as a new tracker) within a region covered by the bounding box of the SOT 1002, and that is transitioned to a dead state while still within the region of the SOT 1002 bounding box. As previously described, a tracker that is not promoted as a normal tracker can be removed (or killed), after which the tracker can be considered as dead. For example, a tracker can be transitioned to a dead state if the tracker fails to associate with any blobs for a certain number of consecutive frames (e.g., 2 or more). An example born and dead tracker interaction 1010 is shown in FIG. 10, in which case the tracker Tr4 is generated within the region of the bounding box of the SOT 1002 for a first frame. The tracker Tr4 is then transitioned to a dead state for a second frame obtained any time after the first frame.

Any of the above-described interactions between a current sleeping tracker and one or more non-sleeping trackers can lead the sleeping tracker update engine 937 to change a characteristic of the current sleeping object tracker. For example, in the case of a "normal intersection" (e.g., normal intersection 1004 in FIG. 10), the sleeping tracker update engine 937 can update the appearance model of the sleeping object tracker, and can compare the updated appearance model with an appearance model of the target sleeping bounding box of the sleeping tracker to determine whether the appearance model has been changed after the interaction finishes, which can be used to determine whether the sleeping tracker is still a sleeping tracker.

In some examples, when a "normal turned into sleeping" interaction occurs (e.g., normal turned into sleeping interaction 1006 in FIG. 10), the sleeping tracker update engine 937 can establish a new sleeping object tracker. The existing sleeping object tracker can be maintained while the new sleeping object tracker is established. In some cases, the appearance model of the existing sleeping object tracker may be updated when such an interaction occurs (e.g., if the new sleeping object tracker is relatively small, the appearance model of the existing sleeping object tracker can always be updated, or can be updated in other situations).

In some examples, when a "grown up and left" tracker interaction occurs, it may be possible that the sleeping object tracker starts to move again, which may have to be confirmed (e.g., using the awake check process described below). In some examples, when a "born and dead" tracker interaction occurs, it may be possible that the sleeping object tracker has some noise or that the sleeping object has changed, in which case the appearance model of the sleeping object tracker can be updated. In some cases, the target sleeping bounding box of the sleeping tracker can also be updated when a "born and dead" tracker interaction occurs. In one illustrative example, when a "born and dead" tracker interaction occurs, the sleeping object tracker involved in the interaction may need to be updated so as to accommodate the small changes due to born and dead tracker being present in the bounding box of the sleeping tracker and affected the appearance model.

Figure 11:
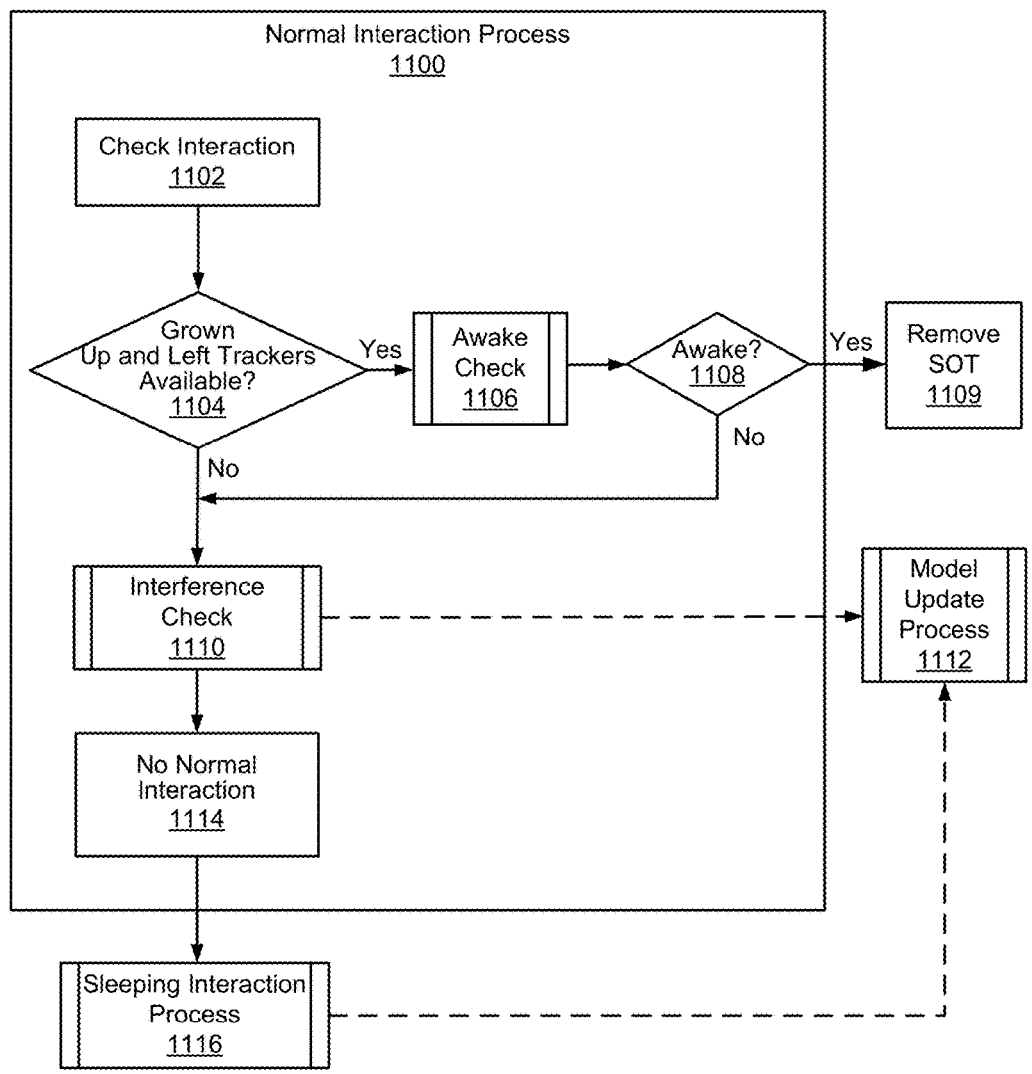
FIG. 11 is a flowchart illustrating an example of a normal interaction process for interactions between a sleeping object tracker and normal trackers, in accordance with some examples.

FIG. 11 is a flowchart illustrating an example of a normal interaction process 1100. The normal interaction process 1100 can be performed by the normal interaction engine 935, and can be performed for each sleeping object tracker. A sleeping object tracker currently being processed by the normal interaction engine 935 is referred to as a current sleeping object tracker. The normal interaction process 1100 works with two other major processes to update the sleeping object trackers, including the sleeping interaction process 1116 and the model update process 1112. The sleeping interaction process 1116 and the model update process 1112 are described in more detail below with respect to FIG. 13 and FIG. 17, respectively.

At step 1102, the process 1100 checks if any grown up and left trackers associated with the current sleeping object tracker are available. In the event any grown up and left trackers are determined to be available at step 1102, an "awake check" process is invoked for each grown up and left tracker. For example, for a current sleeping object tracker, if a non-sleeping tracker associated with the current sleeping object tracker has grown to have a bounding box with a size large enough to be comparable with a size of the sleeping tracker bounding box, the sleeping tracker itself may be removed, and the associated tracker may be assigned with a label equal to that of the current sleeping tracker. Such a process can allow a smooth transition to be made when the sleeping tracker starts to move again. In one illustrative example, if the bounding box of an associated normal tracker is larger than an awake size threshold percentage T of the size of the current sleeping object tracker, the transition from the sleeping tracker to the associated normal tracker will be performed. The awake size threshold percentage T can be set to any suitable value, such as 60%, 70%, 75%, 80%, or other suitable percentage.

In some implementations, once such a tracker is determined to be transited from a sleeping tracker to a normal tracker, a different status can be maintained for the transited-to normal tracker (denoted as an "awake from sleep" tracker), such that the eroding tracker detection process described above will more easily recognize the tracker as a vanishing tracker. For example, if a tracker is marked as an awake from sleep tracker, the eroding tracker detection process may not confirm if the bounding box of the tracker has shrunk to a significantly smaller size (as compared to the target bounding box), but will still confirm that the bounding box is shrinking. For instance, referring to FIG. 7, the eroding tracker detection sub-process 703 can perform the size inclusion test for an awake from sleep tracker, but may not perform the significant size decrease test for the awake from sleep tracker.

Figure 18:
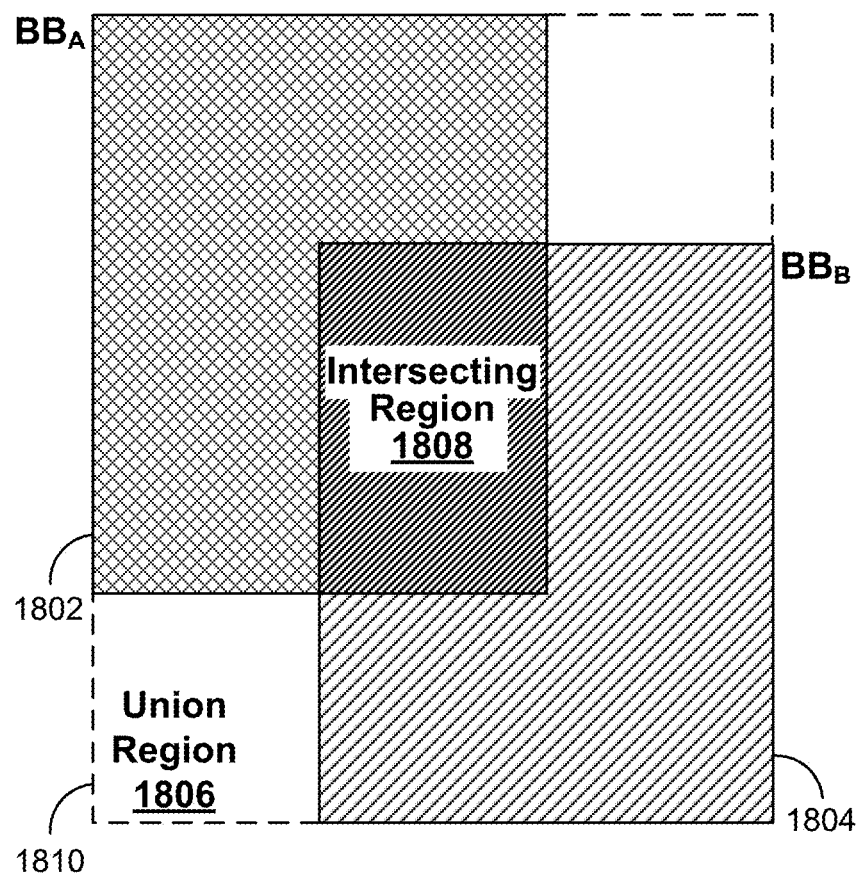
FIG. 18 is a diagram illustrating an example of an intersection and union of two bounding boxes, in accordance with some examples.

In some cases, when a tracker is determined to be transited from a sleeping tracker to a normal tracker, the appearance model is re-calculated if the associated normal tracker's bounding box overlaps largely with the bounding box of the sleeping tracker. For example, assuming the bounding box of the sleeping object tracker is denoted as BBs (sleeping) and the bounding box of the associated normal tracker is denoted as BBa (associated), the associated normal tracker's bounding box is determined to overlap largely with the bounding box of the sleeping tracker if the following condition is met: $\|BBa\|>T1\%\| BBs \cup BBa\|$ and $\|BBs \cap BBa\|>T2\%\|BBa\|$, where U is the union of two bounding boxes, and I is the intersection of two bounding boxes. FIG. 18 (described below) shows a diagram illustrating an example of an intersection I and union U of two bounding boxes. The term $\|.\|$ returns the number of pixels within a bounding box. The union threshold T1 and intersection threshold T2 can be set to different or the same amounts (e.g., T1 can be set to 0.85 and T2 can be set to 0.8, or any other suitable values).

In some cases, when the appearance model is re-calculated, as shown above, the bounding box of the current normal tracker (e.g., when it is being transited from sleeping to normal), can be set to be the union of these two bounding boxes (denoted as $\|BBS \cup BBA\|$), so that there is a higher chance to re-identify the current tracker as a sleeping tracker.

An illustrative example of the awake check process is now provided. When the awake check process is performed for a current sleeping object tracker, the inputs to the awake check process include a list of grown up and left trackers (denoted as listGLTracker) for the current sleeping object tracker. The bounding box for the current SOT is denoted as BBs. For any item gtTrc in listGLTracker, the following steps apply to perform the awake check process:

1. Denote the bounding box of gtTrc as BBA.
2. If $\| BBa \|$ is larger than T% of $\| BBs \|$, the following steps apply:
   a. Set the label (unique tracker ID) of gtTrc to be the label of the current SOT.
   b. Set the gtTrc to be normal (normal status).
   c. Set the current SOT ss "to be removed".
   d. If $\| BBa \| > T1\%\|$ BBs ∪ BBa $\|$ and $\|$ BBs ∩ BBa $\| > T2\%$, the following steps apply:
     i. Set the state of gtTrc to be "awake from sleep".
     ii. BBa is set to be BBS ∪ BBa.
     iii. Calculate the appearance model of gtTrc.
   e. Clear the list listGLTracker.
   f. The SOT is awake
   g. Terminate the whole process In some cases, the list (listGLTracker) is maintained in a way that it contains all the associated grown up and left trackers, including those grown from the current sleeping object tracker while being not ready for output (not having a normal state). In such cases, even before a a tracker gtTrc has been transited to a state (e.g., a normal state) that will output its bounding box (e.g., due to the fact that a sleeping object tracker starts to move), the transition from the sleeping object tracker to the moving tracker gtTrc is complete. In some cases, if the current sleepoing object tracker is not awake after the awake check process, the globalDuration (described below) can be reset to 0.

If, at step 1104, the normal interaction process 1100 determines that there are no more grown up and left trackers available for the current sleeping object tracker, or if there is no current interaction between the current sleeping object tracker and a non-sleeping tracker, an interference check process 1110 is invoked for the current sleeping object tracker. If the only interaction of the current sleeping object tracker is with other sleeping object trackers, the sleeping interaction process 1116 is invoked for the current sleeping object tracker.

The interference check process can be performed to determine whether to re-confirm the texture of a sleeping object by re-confirming the appearance model of its sleeping object tracker. In some cases, once a sleeping object tracker is determined to interact with any other non-sleeping trackers, a status of the sleeping object tracker can be transited to "interaction." The status of the sleeping tracker can stay as "interaction" in a current frame even if, for the current frame, there is no interaction any more with any other non-sleeping trackers. Once a sleeping tracker has the "interaction" state and the current frame has no interaction, a counter (starting from 0) applies to accumulate the number of frames that the sleeping tracker has been detected without interaction. The counter is denoted as noIntersectionDuration. If the counter becomes larger than an intersection duration threshold D, a texture re-confirm process can be invoked for the sleeping object tracker. The intersection duration threshold D can correspond to a certain amount of time (e.g., a half a second, corresponding to have the frame rate, or other suitable amount of time) or can correspond to a number of frames (e.g., 15 frames, 20 frames, 30 frames, or other suitable number of frames). When the counter is determined not to be larger than D, and when the current frame is determined to have an interaction with other trackers again, the counter is reset to 0. In some cases, the transition of a sleeping tracker to the "interaction" status can be performed not only when the sleeping tracker interacts with normal trackers, but also when the sleeping tracker interacts with other the sleeping trackers. In some cases, the transition of a sleeping tracker to the "interaction" status can be performed not only when the sleeping tracker interacts with normal trackers, but also when the sleeping tracker interacts with sleeping trackers that were converted from normal trackers that were interacting with sleeping trackers.

A texture re-confirm process (denoted as "re-conform appearance model" in FIG. 12) can be performed for a current sleeping object tracker when the sleeping object tracker encounters certain interactions with other trackers and there have not been any interaction after a certain period of time. The texture re-confirm process can obtain the appearance model of the current frame for the target sleeping bounding box of the current sleeping tracker and can compare that appearance model with the maintained appearance model (the appearance model calculated using pixels of a frame meeting the appearance model duration that are within the target sleeping bounding box, as previously described). If the texture re-confirm process fails to identify the same or similar texture, the sleeping object tracker will be removed from a list of maintained blob trackers (e.g., trackers 910N). Otherwise, If the texture re-confirm process determines that the same or similar texture exists, the sleeping object tracker will be kept in the list of maintained blob trackers.

Figure 12:
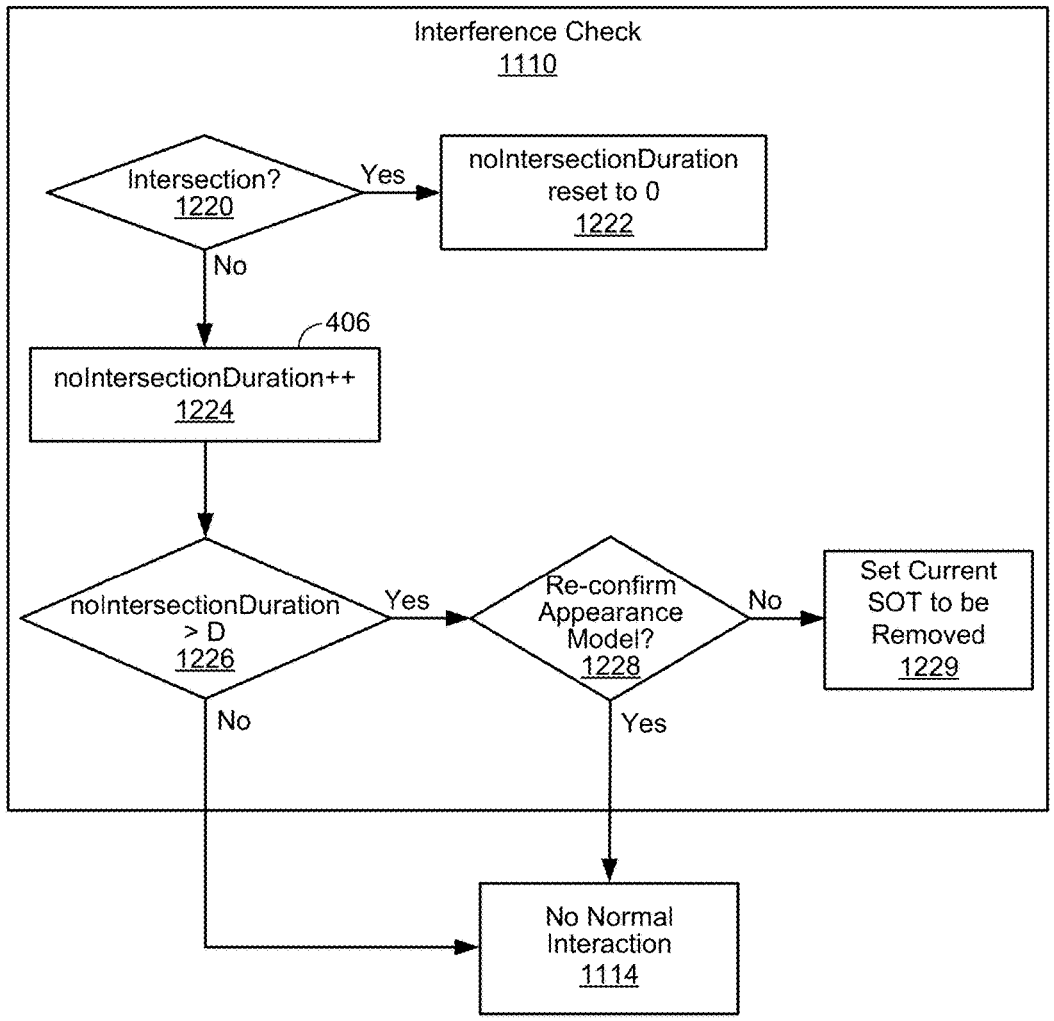
FIG. 12 is a flowchart illustrating an example of a process for performing an interference check, in accordance with some examples.

FIG. 12 is a flowchart illustrating an example of the interference check process 1110. At step 1220, the process 1110 determines whether the current sleeping object tracker is intersecting with any other trackers. When the current sleeping object tracker is determined to have an intersection with any other trackers at step 1220, the counter (noIntersectionDuration) indicating no interaction is reset to 0 at step 1222.

When there is no interaction detected for the current sleeping object tracker for the current frame at step 1220, the counter noIntersectionDuration is increases by 1 at step 1224. At step 1226, the process 1110 determines whether the counter noIntersectionDuration is larger than the intersection duration threshold D for the current frame. If, at step 1226, the counter noIntersectionDuration is determined to be larger than the intersection duration threshold D for the current frame, the process 1110 attempts to re-confirm the appearance model of the current sleeping object tracker at step 1228. The appearance model can be re-confirmed using the appearance model comparison techniques described above with respect to the mass center similarity test (performed at step 728 of the process 700A). For example, if the mass center has not changed significantly, the appearance model is re-confirmed (a "yes" decision at step 1228). If the appearance model of the sleeping tracker is re-confirmed at step 1228, the sleeping tracker is considered to have no normal interaction with any non-sleeping trackers at step 1114. When the appearance model re-confirm is not successful (a "no" decision at step 1228), the current sleeping object tracker is set as "to be removed" from the list of maintained blob trackers (e.g., trackers 910N) by the model update process.

The sleeping interaction engine 936 can analyze the interactions of sleeping object trackers with other sleeping object trackers, which can be referred to as sleeping tracker interactions. In some examples, interactions between a current sleeping object tracker and other sleeping object trackers are checked when there are no interactions between the current sleeping tracker and non-sleeping trackers. For instance, for each individual sleeping object tracker, analysis of its interaction with other sleeping object trackers is performed only when there is no interaction with non-sleeping trackers. In such examples, since interactions between a current sleeping object tracker and other sleeping object trackers are checked only when there is no interaction between the current sleeping object tracker and any non-sleeping tracker, the status changes described below for sleeping trackers and/or the explicit requests to update appearance models will happen assuming no normal tracker interactions are involved for the current sleeping object tracker. In other examples, a sleeping object tracker's interaction with other sleeping object trackers can be analyzed even when there are interactions between the sleeping object tracker and non-sleeping trackers.

When a current sleeping object tracker is inspected for its interactions with other sleeping object trackers, it may be assumed that other sleeping trackers that appear later and that overlap with the current sleeping tracker will overwrite the texture of the current sleeping tracker for the overlapped region. In such cases, the design can be simplified such that the interaction of of a current sleeping tracker only takes the later sleeping trackers overlapping with it. For example, the intersection area (an example intersection area is shown as intersecting region 1808 in FIG. 18) between the current sleeping object tracker and each intersecting sleeping object tracker is calculated and added together to evaluate the level of "sleep interaction," also referred to as intersection ratio (IR). In one illustrative example, the current sleeping object tracker can be denoted as BBSi, in which case the sleep interaction level (or intersection ratio IR) for the sleeping object tracker is determined as $\Sigma_{j>i}|BBS_i \cap BBS_j|/|BBS_i|$.

In some cases, if the sleep interaction level is high (e.g., more than a maximum intersection threshold T3 of the size of the current sleeping object tracker BBSi), all the overlapped sleeping object trackers, including the current sleeping object tracker, are used to create a new bounding box for the current sleeping tracker. For example, a union of all the relevant bounding boxes can be determined as the new bounding box for the current sleeping tracker. The union is denoted as $\cup_{j\geq i} \{BBS_j||BBS_i \cap BBS_j|>0\}$. The maximum intersection threshold T3 maybe set to any suitable value (e.g., 60%, 65%, 75%, or other suitable percentage). In such cases, it may also be required to immediately update the appearance model of the sleeping object tracker in current frame. In some cases, all the overlapped sleeping object trackers are set as "to be removed" (e.g., immediately, after processing of the current frame is complete, or at some other time by the model update process).

In some examples, if the sleep interaction level is low (e.g., less than an intersection threshold T4 of the size of the current sleeping object tracker), it may imply, for example, that a much smaller sleeping object tracker has been established within the current tracker. In this case, the appearance model of the sleeping object tracker can be updated immediately without updating the target sleeping bounding box. In some cases, the current sleeping object tracker and its relevant sleeping object trackers (that are intersecting the current sleeping object tracker) are recorded in a way that the next time the same behavior is detected and the relevant sleeping object trackers are the same, the appearance model is not updated. The intersection threshold T4 can be set to any suitable value (e.g., 15%, 20%, 25%, or any other suitable percentage). To achieve this, the sleeping interaction engine 936 or the sleeping tracker update engine 937 can maintain the list of associated sleeping object trackers associated with each sleeping object tracker, as described below.

If the sleeping interaction level for a current sleeping object tracker is between the intersection threshold T4 and the maximum intersection threshold T3, the current sleeping object tracker might have been split into two major sleeping object trackers (yet not enough to cover the whole current sleeping object tracker). In this case, the current sleeping object tracker BBSi is set as "to be removed" while all the overlapped sleeping object trackers could be kept in the list of maintained blob trackers (e.g., trackers 910N).

Figure 13:
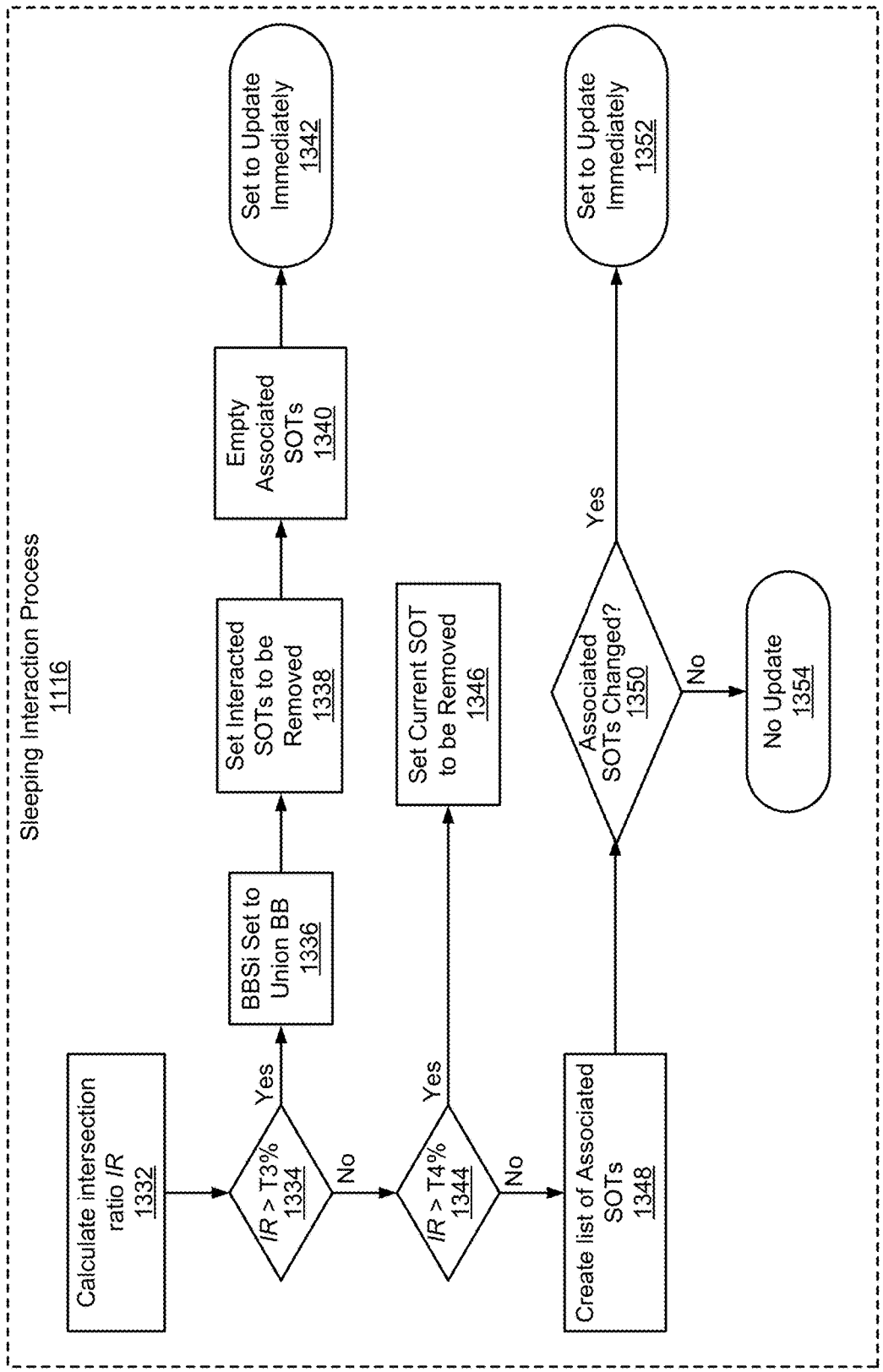
FIG. 13 is a flowchart illustrating an example of a sleeping interaction process for interactions between a sleeping object tracker and one or more other sleeping object trackers, in accordance with some examples.

FIG. 13 is a flowchart illustrating an example of a sleeping interaction process 1116. As noted above, the bounding box of a current sleeping object tracker is denoted as $BBS_i$, and all the later sleeping object trackers (that turned to be sleeping object trackers later than the current SOT) are denoted as $BBS_j$, $j>i$. At step 1332, an intersection ratio (IR) is calculated as $IR=\Sigma_{j>1}|BBS_i \cap BBS_j|/|BBS_i|$. The IR is also referred to as the sleep interaction level for the current sleeping object tracker.

At step 1334, the process 116 determines whether IR is less than or greater than T3. When IR is determined to be larger than T3 at step 1334, the bounding box of the current sleeping object tracker is set to be a union bounding box (BB) that is a union of the current sleeping object tracker bounding box and all associated sleeping object tracker bounding boxes. For example, the union bounding box (BB) can be calculated as follows: $\cup_{j\geq 1} \{BBS_j||BBS_i \cap BBS_j|>0\}$. At step 1338, the other sleeping object trackers that are interacting with (or associated with) the current sleeping object tracker are set as "to be removed." At step 1340, the associated sleeping object trackers are emptied or removed. At step 1342, the model update status for the current sleeping object tracker is set to "update immediately." The appearance model will be updated based on the union bounding box in the model update process.

At step 1344, the process 1116 determines whether IR is less than or greater than T4. When IR is determined to be smaller than T4% at step 1344, a list of associated sleeping object trackers (SOTs) is created at step 1348. In some cases, the list of associated list of associated SOTs can be created before determining the IR is below T4. For the current sleeping object tracker, for any j larger than i, if the bounding box overlaps with the $BBS_i$, the label (tracker ID) of the BBS is added into the list of associated SOTs for the current sleeping object tracker. The list of associated SOTs is denoted as listAssoSOT. At step 1350, the process 1116 determines whether the list of associated SOTs has changed. If, at step 1350, the current listAssoSOT is different from the listAssoSOT of the $BBS_i$, the model update status for the current sleeping object tracker is set to "update immediately." Otherwise, if it is determined at step 1350 that the current listAssoSOT is the same as the listAssoSOT of the $BBS_i$, the relationship between the current sleeping object tracker and the associated sleeping object trackers is not changed, in which case the appearance model of the current sleeping object tracker does not require an immediate or urgent update. In some cases, when the IR is first determined to be less than T4 for for the current sleeping object tracker, the associated SOTs are changed (due to the list of SOTs being created after step 1344) and thus the appearance model of the current sleeping object tracker will be updated immediately at step 1352 (due to step 1350 resulting in a "yes" decision).

When IR is between T4 and T3, the current SOT is marked as "to be removed." For example, at step 1344, if the process 1116 determines IR is greater than T4, the current sleeping object tracker is set as "to be removed" from the list of maintained trackers (e.g., blob trackers 910N).

Figure 14:
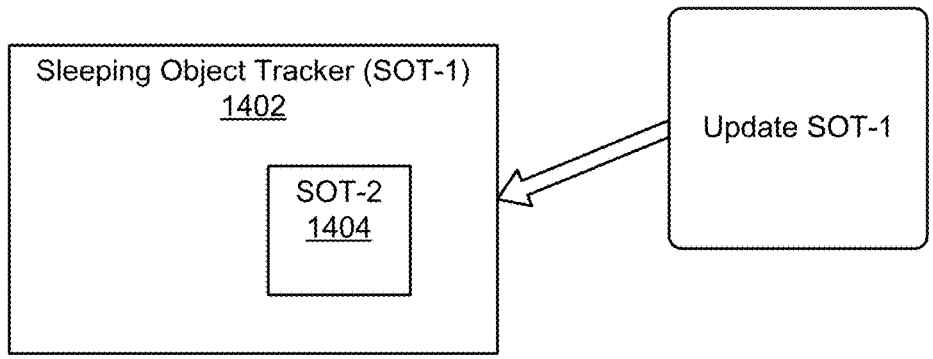
FIG. 14 is a diagram illustrating an example of a sleeping object tracker interaction with another sleeping tracker, in accordance with some examples.
Figure 15:
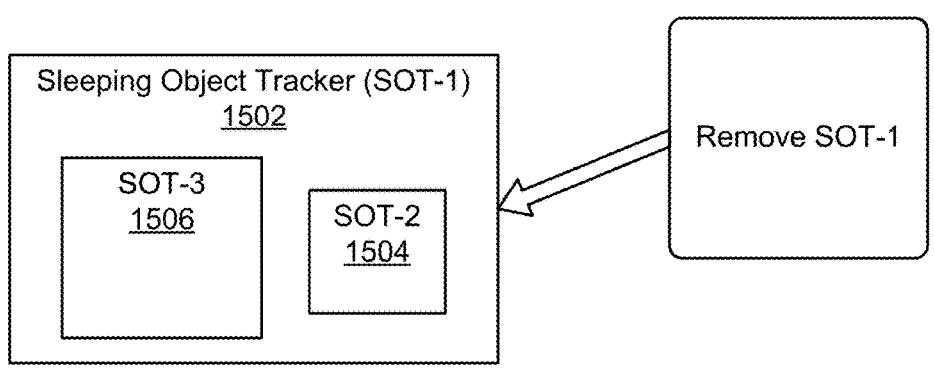
FIG. 15 is a diagram illustrating an example of a sleeping object tracker interaction with other sleeping trackers, in accordance with some examples.
Figure 16:
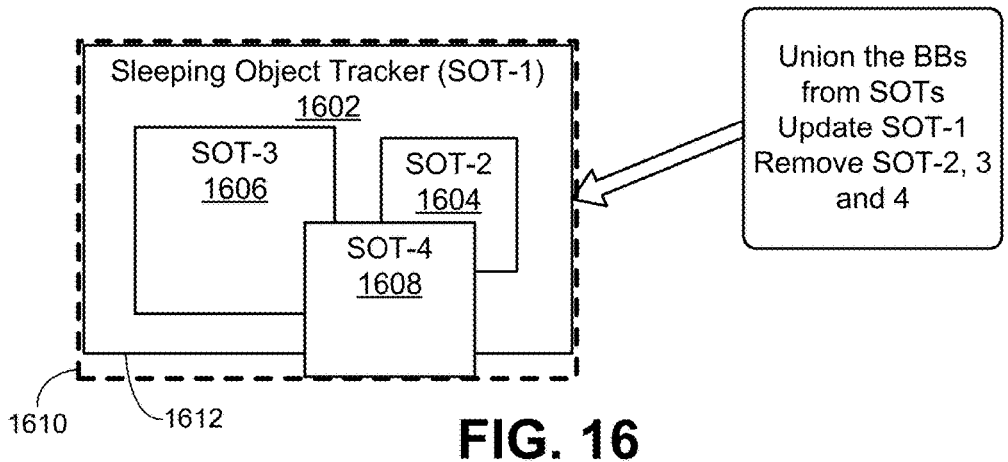
FIG. 16 is another diagram illustrating an example of a sleeping object tracker interaction with other sleeping trackers, in accordance with some examples.

FIG. 14-FIG. 16 are diagrams illustrating example interactions between a current sleeping object tracker and other sleeping object trackers. The current SOT is labeled as SOT-1, and other interacted SOTs that were established later have an ID larger than 1. FIG. 14 illustrates an example of a sleeping tracker interaction between a current sleeping object tracker 1 (SOT-1) 1402 and another sleeping object tracker (SOT-2) 1404. As shown, there is only one SOT-2 1404 interacted with the SOT-1 1402. In such an example, if the intersection ratio of the intersecting bounding box is less than the intersection threshold T4 (e.g., 15%, 20%, 25%, or other suitable percentage), the appearance model of SOT-1 1402 can be updated.

FIG. 15 illustrates another example of a sleeping tracker interaction, including an interaction between a current SOT-1 1502 and two other SOTs (SOT-2 1504 and SOT-3 1506). In such an example, if the intersection ratio between the current SOT-1 1502 and the two other SOT-2 1504 and SOT-3 1506 is larger than the intersection threshold T4, such as an overlap amount of 60%, the current SOT-1 1502 can be removed from a list of maintained trackers (e.g., trackers 910N). In some cases, the SOT-2 1504 and the SOT-3 1506 can be kept in the list of maintained trackers.

FIG. 16 illustrates another example of a sleeping tracker interaction, where three other SOTs (SOT-2 1604, SOT-3 1606, and SOT-4 1608) intersect a current SOT-1 1602. In such an example, if the intersection ratio is larger than a maximum intersection threshold T3 (e.g., 50%, 60%, 75%, or other suitable percentage), the union of the bounding boxes (shown as bounding box 1610) involved in the intersection can be generated to replace the bounding box of the sleeping object tracker (shown as bounding box 1612), and the appearance model of SOT-1 1602 can be updated. In some cases, the SOT-2 1604, SOT-3 1606, and SOT-4 1608 can be removed from the list of maintained trackers.

Any of the awake check process, the interference check process, and/or the sleeping interaction process can be followed by the model update process. The model update process can change the bounding box of the current SOT, or the appearance model of the SOT, or both, or can lead one or more sleeping object trackers to be removed. In some cases, the appearance model updates can be performed for a current frame when all the interactions (normal tracker interactions and sleeping tracker interactions) have been handled for all sleeping object trackers of the current frame. The model update process can goes through all sleeping object trackers one by one, or in parallel, except those to be removed. The model update process has two mechanisms to trigger the model update, a sleeping object tracker that has been marked as "update immediately" (checked at step 1762 in the example process 1112 described below), and a sleeping tracker that been marked as "no interaction" with a relatively long duration (denoted as "waitUpdateDuration" in FIG. 17) such as 10 seconds or other duration or amount of frames (checked at step 1768 in the example process 1112), which can accommodate for environmental changes (e.g., due to lighting condition changes or other changes). The first type of appearance model update can be denoted as an "active update" and the second type of update can be denoted as a "passive update."

In some cases, when there is an associated tracker of the current sleeping tracker that is turned to dead state, the current sleeping tracker can be in an "update once ready" status. In such such cases, at a later frame, once it is determined that the status of the current sleeping tracker is not an "interaction" status, the update status is set to be "update immediately." In some cases, a sleeping object tracker marked as "to be removed" will not be used for output in the current frame, and, at the being of next frame, it will be completely removed from memory.

In some examples, a configuration item may be set, such that a lifetime duration is given for all sleeping object trackers. If a sleeping object tracker has lasted longer than the configured time value (e.g., corresponding to 40 seconds or other suitable time value), the sleeping object tracker may be removed immediately. In some cases, once the appearance model is updated as an "active update," the counter for the lifetime duration is reset to 0. The counter can be denoted as globalDuration.

In some cases, when an associated tracker is dead and the last available bounding box is associated with a sleeping object tracker, the bounding box of the sleeping object tracker may be updated immediately. For example, it can first be determined whether the dead associated tracker diverged sufficiently from the sleeping object tracker. If yes, the bounding box of the sleeping tracker is extended by unifying the latest available bounding box of the associated tracker (the dead tracker). When there are multiple associated trackers to be considered (that are turned to a dead status) simultaneously, and more than one of the tracker bounding boxes diverged sufficiently, the associated tracker that may create the biggest unified bounding box is chosen to be the only associated tracker that updates the target sleeping bounding box.

In some implementations, to provide a cleaner output, when a sleeping object tracker has sufficient (in terms of size) associated trackers overlapped with it, the sleeping object tracker may temporally not be used for output in the current frame. When there are associated trackers turning to normal (thus need to be updated), and if the sum of the intersecting bounding boxes (between an associated tracker and that of a sleeping object tracker) is larger than T5 (e.g., T5 can be equal to 75%, 80%, 85%, or other suitable percentage) of the size of the sleeping object tracker bounding box for a current frame, the current sleeping object tracker can be temporally disabled for output in the current frame. The bounding box for the current sleeping object tracker is denoted as BBSi and its associated trackers (already turned to output) are denoted as BBAk, in which case if $\Sigma_k |BBS_i \cap BBA_k| > |BBS_i| * T5\%$, the current sleeping object tracker will not be output for the current frame.

Figure 17:
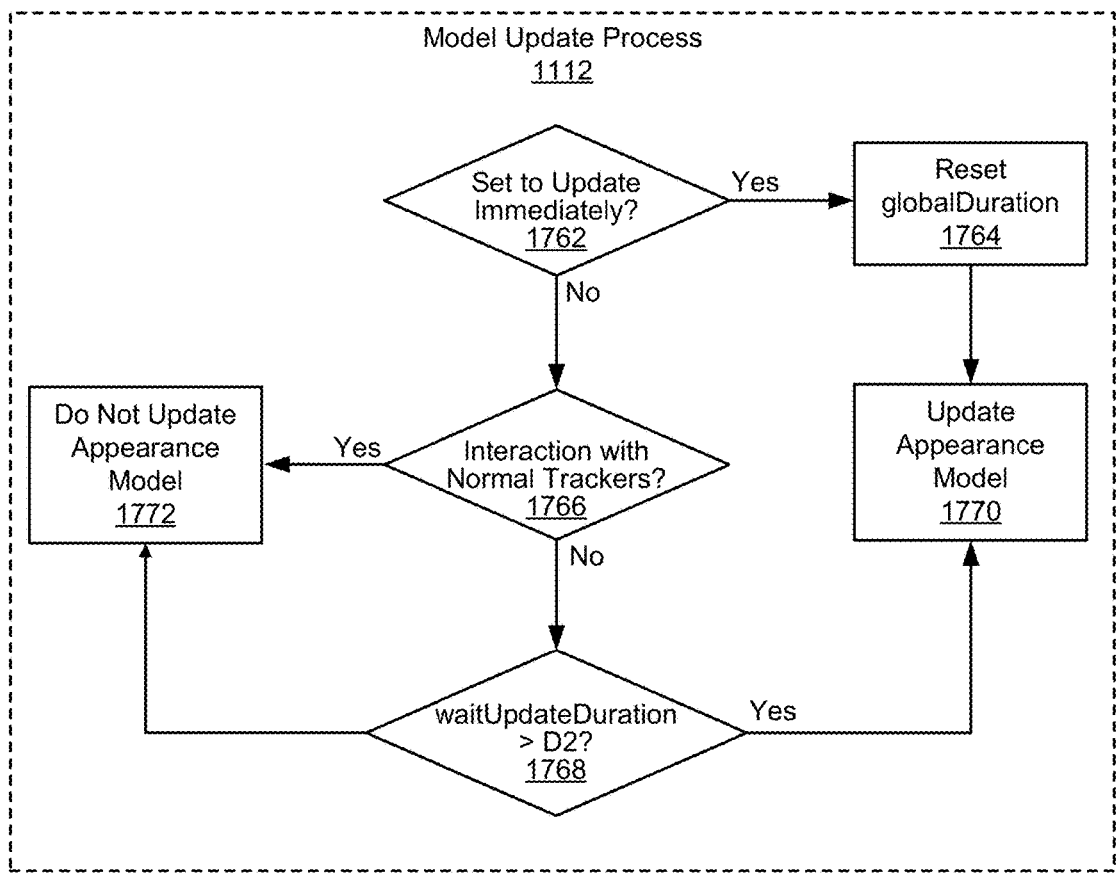
FIG. 17 is a flowchart illustrating an example of a model update process for updating an appearance model of a sleeping object tracker, in accordance with some examples.

FIG. 17 is a flowchart illustrating an example of a model update process 1112. At step 1762, the process 1112 determines whether a current sleeping object tracker is set to or marked as "update immediately." If it is determined that the current sleeping object tracker is set to "update immediately," the appearance model is updated at step 1770 (called an "active update"). If, at step 1762, the current sleeping object tracker is determined not to be set to "update immediately," the process determines at step 1766 whether there are any interactions between the current sleeping object tracker and normal trackers (or other non-sleeping trackers).

The "passive update" applies only when there is no interaction with non-sleeping trackers. For example, if there is an interaction between the current sleeping object tracker and any non-sleeping trackers, the process 1112 determines not to update the appearance model of the current sleeping object tracker at step 1772. If there is no interaction between the current sleeping object tracker and any non-sleeping trackers (the sleeping tracker is marked as "no interaction"), the process 1112 compares the waitUpdateDuration to an update duration threshold D2 (e.g., 300 frames, 10 seconds, or other suitable period) at step 1768. If the waitUpdateDuration is greater than the update duration threshold D2, the appearance model for the current sleeping object tracker is updated at step 1770. If the waitUpdateDuration is less than the update duration threshold D2, the process 1112 determines not to update the appearance model of the current sleeping object tracker at step 1772.

When the appearance model is updated due to the "update immediately" status being determined at step 1762, the globalDuration is reset to 0 at step 1764. For example, as noted above, the globalDuration is reset to 0 in the "active update" mode, such that the duration of a sleeping tracker is re-counted when the appearance model has been actively updated. This also implies that in "passive update" mode (step 1768), the global duration is not re-counted. In some cases, after (or during) the update appearance model process, the waitUpdateDuration is reset to 0 the and noIntersectionDuration is also reset to 0.

As noted above, bounding boxes can be updated due to "born and dead" trackers. For example, when a current sleeping object tracker contains one or more trackers that are "born and dead" trackers, the target sleeping bounding box (used to maintain the appearance model, as described above) of the sleeping object tracker may be updated to accommodate possible small changes caused by such trackers. For instance, in practice, such changes may be due to the fact that a person slightly moved an arm or put a bag in a different place on the person's body. When there are multiple such trackers, the born and dead tracker bounding box that may create the biggest unified bounding box is chosen to be the only associated tracker that updates the target sleeping object box.

Such a list of "born and dead" trackers can be denoted as listDeadYoungTrackers, in which case the example process described below applies to update the target sleeping bounding box. The current sleeping tracker's bounding box is denoted as BBS.

An example process of updating bounding boxes due to "born and dead" trackers is now described. For each j-th tracker in listDeadYoungTrackers, its bounding box is denoted as boxj, and the following steps apply (the parameter initSize is set to BBS and a bounding box maxTempBox is initialized to be empty):
 1. If |boxj∩BBS| is smaller than P1% of |boxj| and (|boxj|−|boxj∩BBS|) is larger than P2% of |BBS|, the following applies
    a. tempBox=boxj∪BBS
    b. tempSize=|boxj∪BBS|
    c. If tempSize is larger than initSize, initSize is set to tempSize and maxTempBox is set to tempBox In some cases, the process can clear the list of listDeadYoungTrackers. In some cases, the process can set the target sleeping bounding box BBS to be maxTempBox if tempSize is larger than the initSize. Here, P1% may be set to 50% and P2% may be set to 6.25%.

FIG. 18 shows an example of an intersection I and union U of two bounding boxes, including a bounding box $BB_A$ 1802 of the current blob in the current frame and a bounding box $BB_B$ 1804 of the candidate tracker in the current frame. The intersecting region 1808 includes the overlapped region between the bounding box $BB_A$ 1802 and the bounding box $BB_B$ 1804.

The union region 1806 includes the union of bounding box $BB_A$ 1802 and bounding box $BB_B$ 1804. The union of bounding box $BB_A$ 1802 and bounding box $BB_B$ 1804 is defined to use the far corners of the two bounding boxes to create a new bounding box 1810 (shown as the dotted line). More specifically, by representing each bounding box with (x, y, w, h), where (x, y) is the upper-left coordinate of a bounding box, w and h are the width and height of the bounding box, respectively, the union of the bounding boxes would be represented as follows:

$$\text{Union}(BB_A, BB_B) = (\min(x_1,x_2), \min(y_1,y_2), (\max(x_1+w_1-1, x_2+w_2-1) - \min(x_1,x_2)), (\max(y_1+h_1-1, y_2+h_2-1) - \min(y_1,y_2)))$$

Figure 19:
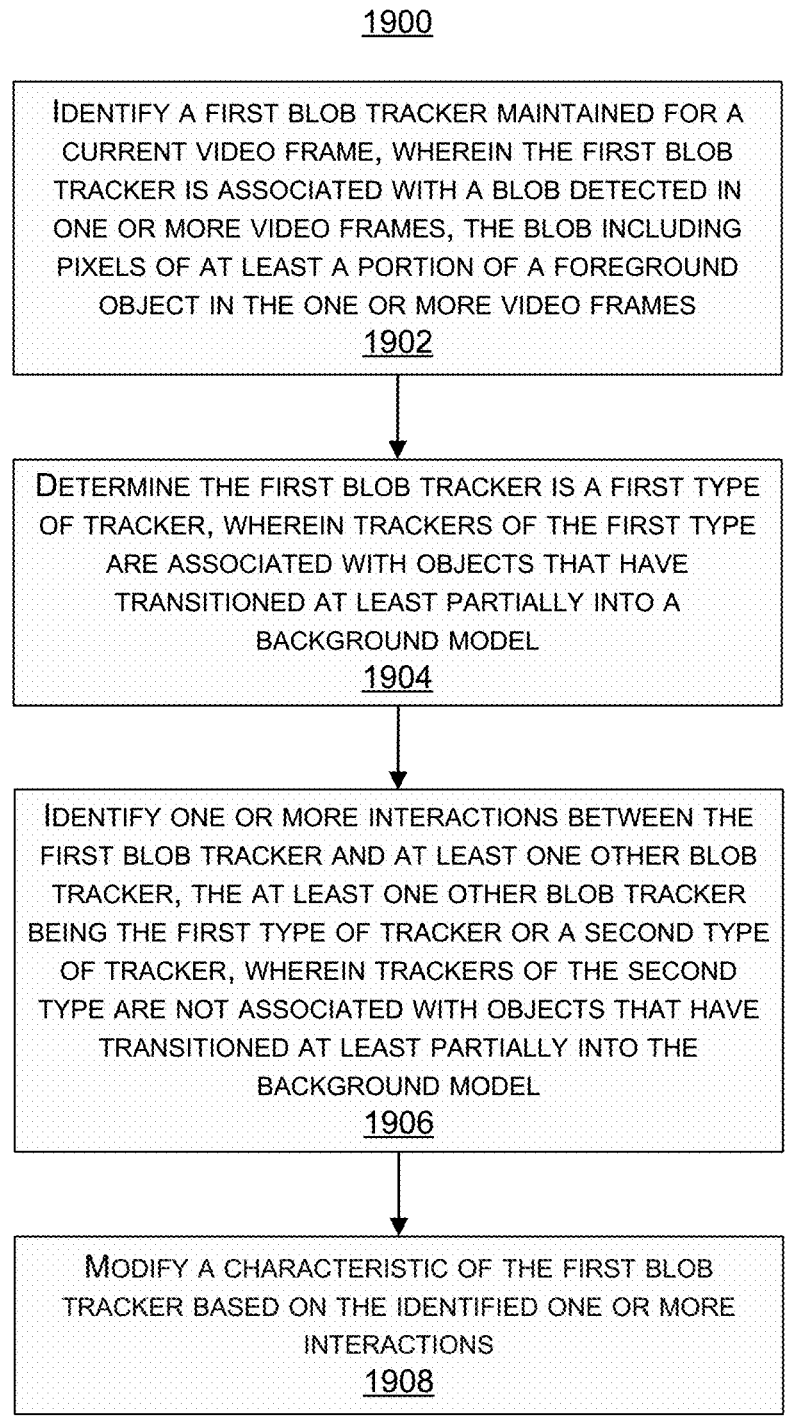
FIG. 19 is a flowchart illustrating an example of a process of maintaining blob trackers for one or more video frames, in accordance with some examples.
Figure 20A:
FIG. 20A-FIG. 20E are illustrations of video frames of an environment in which objects are detected and tracked, in accordance with some examples.
Figure 20B:
Figure 20C:
Figure 20D:
Figure 20E:

FIG. 19 illustrates an example of a process 1900 of maintaining blob trackers for video frames using the sleeping object detection and tracking techniques described herein. At block 1902, the process 1900 includes identifying a first blob tracker maintained for a current video frame. The first blob tracker is associated with a blob detected in one or more video frames. The blob includes pixels of at least a portion of a foreground object in the one or more video frames. In some implementations, the blob can be detected in the one or more video frames by the blob detection system 104. In some cases, the one or more video frames are obtained prior in time than the current video frame.

At block 1904, the process 1900 includes determining the first blob tracker is a first type of tracker. Trackers of the first type are associated with objects that have transitioned at least partially into a background model. Trackers of the first type are referred to herein as sleeping trackers. For example, the first blob tracker can be transitioned to a sleeping tracker (with a sleeping status) based on the process 700A described with respect to FIG. 7A and/or the process 700B described with respect to FIG. 7B. In some examples, the first blob tracker can be determined as being the first type of tracker based on a stored status or state of the first blob tracker. For example, the first blob tracker's status can be maintained as "sleeping."

At block 1906, the process 1900 includes identifying one or more interactions between the first blob tracker and at least one other blob tracker. The at least one other blob tracker is the first type of tracker or is a second type of tracker. Trackers of the second type are not associated with objects that have transitioned at least partially into the background model. For example, the second type of trackers can include non-sleeping trackers that have not been determined to be sleeping object trackers using the process 700A described above with respect to FIG. 7A and/or the process 700B described with respect to FIG. 7B. In some examples, the second type of tracker can include at least one or more of a new tracker generated for the current frame, a normal tracker that is output as an identified blob tracker-blob pair with an associated blob, a lost tracker that is not associated with any blob in the current frame, a hidden tracker that is associated with a blob merged with at least one other blob, or a tracker having another status. In some examples, the second blob tracker can be determined to be the first type of tracker or the second type of tracker based on a stored status or state of the second blob tracker. For example, the second blob tracker's status can be maintained as "sleeping" or as another suitable status (e.g., "new," "normal," "lost," "hidden," or other suitable status).

At block 1908, the process 1900 includes modifying a characteristic of the first blob tracker based on the identified one or more interactions. In some examples, modifying the characteristic of the first blob tracker includes transitioning the first blob tracker from the first type of tracker to the second type of tracker. In some examples, modifying the characteristic of the first blob tracker includes updating an appearance model of the first blob tracker. In some examples, modifying the characteristic of the first blob tracker includes transitioning the first blob tracker from the first type of tracker to the second type of tracker and updating an appearance model of the first blob tracker. Other characteristics of the first blob tracker can be modified as described herein.

In some examples, the one or more identified interactions include an interaction between the first blob tracker and a second blob tracker having the second type. Such interactions between sleeping blob trackers and non-sleeping blob trackers are referred to as normal tracker interactions. Different types of interactions between the first blob tracker and the second blob tracker having the second type can be identified, and different modifications to characteristics of the first blob tracker can be made based on the different identified interactions.

In one illustrative example, when the one or more identified interactions include an interaction between the first blob tracker and the second blob tracker having the second type, identifying the interaction includes determining, for a first previous video frame, the second blob tracker is not intersecting the first blob tracker. The first previous video frame is obtained earlier in time than the current video frame (e.g., the first previous video frame captures a scene at an earlier point in time than the current video frame). In such an example, identifying the interaction further includes determining, for a second video previous frame, the second blob tracker is intersecting the first blob tracker. The second previous video frame is obtained earlier in time than the current video frame and later in time than the first previous video frame (e.g., the second previous video frame captures the scene at an earlier point in time than the current video frame and at a later point in time than the first previous video frame). In such an example, identifying the interaction further includes determining, for the current video frame, the second blob tracker is not intersecting the first blob tracker. Such an identified interaction is referred to above as a "normal" intersection or interaction.

Different modifications can be made to characteristics of the first blob tracker when a "normal" interaction is identified. In one illustrative example, in response to identifying the interaction (a normal intersection) between the first blob tracker and the second blob tracker having the second type, modifying the characteristic of the first blob tracker can include updating an appearance model of the first blob tracker using information of the current video frame. The updated appearance model includes at least one or more of a color feature space or a color mass center of pixels of the current video frame included in a previous bounding region of the first blob tracker. In one illustrative example, the previous bounding region can include the target sleeping bounding region of the first blob tracker, and the updated appearance model can be updated based on pixels in the current frame that are within the target bounding region. The previous bounding region can be a bounding box (e.g., a target bounding box). Any other suitable type of bounding region can be used for the previous bounding region. For example, the the bounding region can include a bounding box, a bounding circle, a bounding ellipse, or any other suitably-shaped region representing the associated tracker.

In some examples, the process 1900 can further include comparing the updated appearance model of the first blob tracker to a previous appearance model of the first blob tracker. The previous appearance model includes at least one or more of a color feature space or a color mass center of pixels of a previous video frame included in the previous bounding region of the first blob tracker. The previous appearance model can include the appearance model calculated for the target sleeping bounding region of the first blob tracker using pixels of the previous video frame (e.g., the pixels in the previous frame that are within the target sleeping bounding region). The process 1900 can further include determining whether to transition the first blob tracker from the first type to the second type based on the comparison of the updated appearance model to the previous appearance model. For example, as previously described, the updated appearance model and the target sleeping bounding region appearance model can be compared to determine whether the appearance model has been changed after the interaction finishes, which can indicate whether a sleeping tracker is still a sleeping tracker. In some cases, the process 1900 includes transitioning the first blob tracker from the first type to the second type when the updated appearance model is not within a threshold difference from the previous appearance model. In some cases, the process 1900 includes maintaining the first blob tracker as the first type when the updated appearance model is within a threshold difference from the previous appearance model.

In another example, when the one or more identified interactions include an interaction between the first blob tracker and a second blob tracker having the second type, identifying the interaction includes determining, for a first previous video frame, the second blob tracker is not intersecting the first blob tracker. The first previous video frame is obtained earlier in time than the current video frame. In such an example, identifying the interaction further includes determining, for a second video previous frame, the second blob tracker is intersecting the first blob tracker. The second previous video frame is obtained earlier in time than the current video frame and later in time than the first previous video frame. In such an example, identifying the interaction further includes determining, for the current video frame, the second blob tracker is to be transitioned from the second type of tracker to the first type of tracker. Such an identified interaction is referred to above as a "normal turned into sleeping" interaction.

In some examples, in response to identifying the interaction (a normal turned into sleeping interaction) between the first blob tracker and the second blob tracker having the second type, modifying the characteristic of the first blob tracker includes updating an appearance model of the first blob tracker using information of the current video frame. The updated appearance model includes at least one or more of a color feature space or a color mass center of pixels of the current video frame included in a previous bounding region of the first blob tracker (e.g., a bounding box or other suitable bounding region). In one illustrative example, the previous bounding region can include the target sleeping bounding box of the first blob tracker, and the updated appearance model can be updated based on pixels in the current frame that are within the target bounding box. In some examples, in response to identifying the interaction (a normal turned into sleeping interaction) between the first blob tracker and the second blob tracker having the second type, modifying the characteristic of the first blob tracker includes transitioning the second blob tracker from the second type of tracker to the first type of tracker. For example, the second blob tracker can be transitioned from a non-sleeping tracker (e.g., new, normal, or other non-sleeping tracker) to a sleeping tracker.

In another example, when the one or more identified interactions include an interaction between the first blob tracker and a second blob tracker having the second type, identifying the interaction includes generating, for a first previous video frame, the second blob tracker within a region covered by the first blob tracker. In such an example, the second blob tracker is generated generated as a new type of tracker (a new tracker that has not yet been transitioned to a normal tracker that will be output as an identified tracker-blob pair to the video analytics system). In such an example, identifying the interaction further includes transitioning, for a second video previous frame, the second blob tracker from the new type of tracker to the second type of tracker. In this example, trackers of the second type are normal trackers, in which case trackers of the second type and associated blobs are output as identified blob tracker-blob pairs. The second previous video frame is obtained earlier in time than the current video frame and later in time than the first previous video frame. Identifying the interaction further includes determining, determining, for the current video frame, the second blob tracker is not intersecting the first blob tracker. Such an identified interaction is referred to above as a "grown up and left" tracker interaction.

In some examples, in response to identifying the interaction (a normal turned into sleeping interaction) between the first blob tracker and the second blob tracker having the second type, modifying the characteristic of the first blob tracker includes comparing a size of the second blob tracker to a size of the first blob tracker, and determining whether to remove the first blob tracker from a list of maintained blob trackers based on the size comparison between the first blob tracker and the second blob tracker. In some examples, the process 1900 can include removing the first blob tracker from the list of maintained blob trackers when the size of the second blob tracker is larger than a threshold size percentage of the size of the first blob tracker. The threshold size percentage can be the awake size threshold percentage T described above. In some cases, the process 1900 includes assigning a tracker label of the first blob tracker to the second blob tracker. For example, when the first blob tracker is removed from the list of maintained blob trackers, the tracker label of the first blob tracker can be assigned to the second blob tracker. In some examples, the process 1900 includes maintaining the first blob tracker in the list of maintained blob trackers as a tracker of the first type when the size of the second blob tracker is not larger than a threshold size percentage of the size of the first blob tracker. In one illustrative example, as described above, if a non-sleeping tracker associated with a current sleeping object tracker has grown to have a bounding region with a size large enough to be comparable with a size of the current sleeping tracker bounding region (based on the awake size threshold percentage T), the sleeping tracker itself may be removed, and, in some cases, the associated tracker may be assigned with a label equal to that of the current sleeping tracker.

In another example, when the one or more identified interactions include an interaction between the first blob tracker and a second blob tracker having the second type, identifying the interaction includes generating, for a first previous video frame, the second blob tracker within a region covered by the first blob tracker. In some cases, the second blob tracker can be generated as a new tracker. Identifying the interaction further includes determining, for the current video frame, the second blob tracker is no longer associated with any blobs. Such an identified interaction is referred to above as a "born and dead" tracker interaction.

In some examples, in response to identifying the interaction (born and dead tracker interaction) between the first blob tracker and the second blob tracker having the second type, modifying the characteristic of the first blob tracker includes updating an appearance model of the first blob tracker using information of the current video frame. The updated appearance model includes at least one or more of a color feature space or a color mass center of pixels of the current video frame included in a previous bounding region of the first blob tracker. In one illustrative example, the previous bounding region can include the target sleeping bounding box of the first blob tracker, and the updated appearance model can be updated based on pixels in the current frame that are within the target bounding box.

In some examples, the one or more identified interactions include an interaction between the first blob tracker and at least one blob tracker having the first type. Such interactions between sleeping blob trackers and other sleeping blob trackers are referred to as sleeping tracker interactions. Different types of interactions between the first blob tracker and the at least one blob tracker having the first type can be identified, and different modifications to characteristics of the first blob tracker can be made based on the different identified interactions.

In one illustrative example, when the one or more identified interactions include an interaction between the first blob tracker and at least one blob tracker having the first type, modifying the characteristic of the first blob tracker includes determining an amount of intersection between the first blob tracker and the at least one blob tracker, and updating an appearance model of the first blob tracker when the amount of intersection is less than an intersection threshold. The intersection threshold can be the intersection threshold T2 described above. The updated appearance model includes at least one or more of a color feature space or a color mass center of pixels of the current video frame included in a previous bounding region of the first blob tracker. In one illustrative example, the previous bounding region can include the target sleeping bounding box of the first blob tracker, and the updated appearance model can be updated based on pixels in the current frame that are within the target bounding box.

In another example, when the one or more identified interactions include an interaction between the first blob tracker and at least one blob tracker having the first type, modifying the characteristic of the first blob tracker includes determining an amount of intersection between the first blob tracker and the at least one blob tracker, and removing the first blob tracker from a list of maintained blob trackers when the amount of intersection is greater than an intersection threshold (e.g., the intersection threshold T2). In some examples, the process 1900 further includes maintaining the at least one blob tracker in the list of maintained blob trackers.

In some examples, the one or more identified interactions include an interaction between the first blob tracker and at least two blob trackers having the first type. In such examples, modifying the characteristic of the first blob tracker can include determining an amount of intersection between the first blob tracker and the at least two blob trackers. Modifying the characteristic of the first blob tracker further includes generating a union bounding region when the amount of intersection is greater than a maximum intersection threshold. The maximum intersection threshold can be the maximum intersection threshold T3 described above. The union bounding region includes a union of a bounding region of the first blob tracker and at least two bounding regions of the at least two blob trackers. Modifying the characteristic of the first blob tracker further includes replacing the bounding region of the first blob tracker with the union bounding region. The union bounding region can be a union bounding box, or other suitable bounding region. In some examples, the process 1900 further includes removing the at least two blob trackers from a list of maintained blob trackers.

In some examples, the process 1900 includes determining the first blob tracker has not interacted with any other blob trackers for a threshold number of video frames, and updating an appearance model of the first blob tracker when the first blob tracker has not interacted with any other blob trackers for the threshold number of video frames. The updated appearance model includes at least one or more of a color feature space or a color mass center of pixels of the current video frame included in a previous bounding region of the first blob tracker. In one illustrative example, the previous bounding region can include the target sleeping bounding box of the first blob tracker, and the updated appearance model can be updated based on pixels in the current frame that are within the target bounding box.

In some examples, determining the first blob tracker is the first type of tracker includes comparing a current bounding region of the first blob tracker for the current video frame to a previous bounding region of the first blob tracker for a previous video frame. The previous video frame is obtained earlier in time than the current video frame. The bounding regions can include bounding boxes or other suitable bounding regions. In such examples, determining the first blob tracker is the first type of tracker further includes determining the current bounding region has decreased in size as compared to a size of the previous bounding region. For example, the size inclusion test, the significant size decrease test, or both the size inclusion and the significant size decrease tests of the eroding tracker detection sub-process can be performed, as described with respect to FIG. 7A. In such examples, determining the first blob tracker is the first type of tracker further includes determining a first color characteristic of pixels of the current video frame included in the previous bounding region is within a threshold difference from a second color characteristic of pixels of the previous video frame included in the previous bounding region. For example, the mass center similarity test can be performed, as described with respect to FIG. 7A. In some examples, the boundary test can also be performed to determine that the first blob tracker is the first type of tracker.

In some examples, the process 1900 may be performed by a computing device or an apparatus. For example, the process 1900 can be performed by the video analytics system 100 and/or the object tracking system 106 shown in FIG. 1. The process 1900 may also be performed by the sleeping object detection system 620 shown in FIG. 6 and/or the object tracking system 906 shown in FIG. 9. In some cases, the computing device or apparatus may include a processor, microprocessor, microcomputer, or other component of a device that is configured to carry out the steps of process 1900. In some examples, the computing device or apparatus may include a camera configured to capture video data (e.g., a video sequence) including video frames. For example, the computing device may include a camera device (e.g., an IP camera or other type of camera device) that may include a video codec. In some examples, examples, a camera or other capture device that captures the video data is separate from the computing device, in which case the computing device receives the captured video data. The computing device may further include a network interface configured to communicate the video data. The network interface may be configured to communicate Internet Protocol (IP) based data.

Process 1900 is illustrated as logical flow diagrams, the operation of which represent a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the process 1900 may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

The systems and methods described herein enable the detection and tracking of sleeping objects, allowing continued tracking of such objects even when background sub-traction fades the objects into the background. For simple sequences which have just a couple of objects but include a sleeping object, the improvement in tracking using the current techniques is clear. The VAM report results for sequence VIRAT_S_000200_00_000100_000171 is shown below in Table 1. As shown in the table, the detection accuracy and tracking accuracy have both increased significantly using the sleeping object tracking process as compared to the anchor method that does not use sleeping object detection and tracking.

TABLE 1

| Method | Detected Object counter | Mapped Object counter | Detection accuracy | Tracking accuracy | True positive rate | False positive rate |
|---|---|---|---|---|---|---|
| Anchor Method | 1157 | 1288 | 0.16 | 0.23 | 0.996 | 0.8 |
| Sleeping Object Tracking Process | 3098 | 3174 | 0.44 | 0.57 | 1 | 0.8 |

Various examples are shown in FIG. 20A-FIG. 22F comparing video sequences for which sleeping object detection and tracking is applied to video sequences for which sleeping object detection and tracking is not applied.

Frames 2000A-2000E for which the sleeping object detection and tracking methods are performed are shown in in FIG. 20A-FIG. 20E. A car (with tracker label 1) will not be detected and tracked well without the proposed sleeping object detection and tracking methods being applied. For example, as shown in FIG. 20A-FIG. 20E, even though objects were generated from time to time within the sleeping object tracker of the car (which was absorbed into background due to it remaining static), and eventually one person came outside and walked far from the car, the presence of the sleeping object tracker does not have an impact on the tracking of the new (normal) trackers. Further, the sleeping object tracker (of the stopped car) is well tracked in every frame 2000A-2000E, indicating why the detection and tracking accuracy using the proposed methods are much higher.

Figure 21A:
FIG. 21A-FIG. 21M are illustrations of video frames of an environment in which objects are detected and tracked, in accordance with some examples.
Figure 21B:
Figure 21C:
Figure 21D:
Figure 21E:
Figure 21F:
Figure 21G:
Figure 21H:
Figure 21I:
Figure 21J:
Figure 21K:
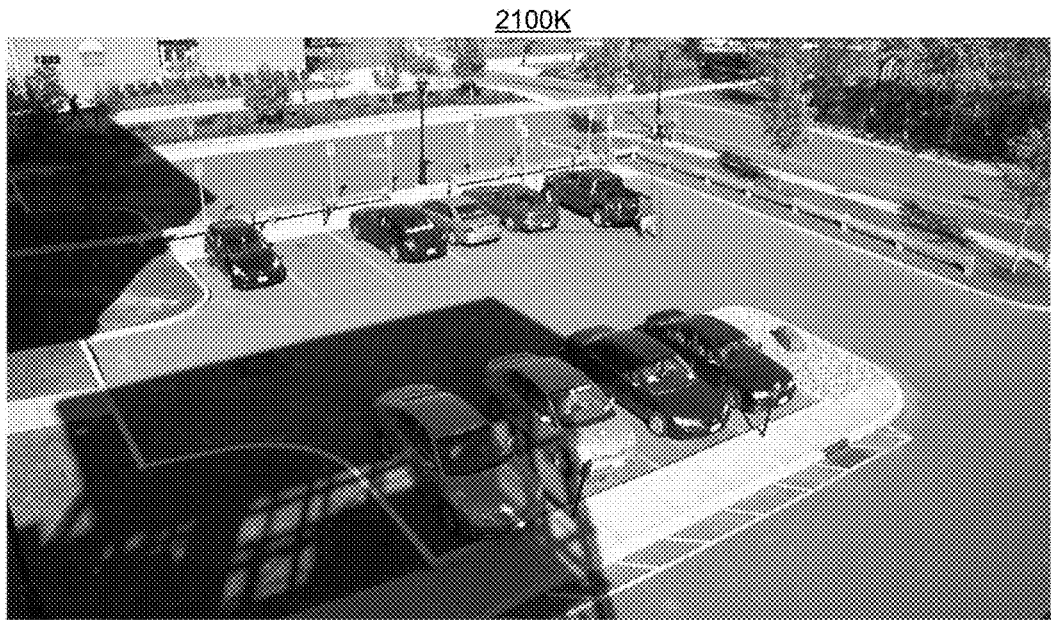
Figure 21L:
Figure 21M:

Another example for sequence VIRAT_S_040103_02_000199_000279, is shown from FIG. 21A-FIG. 21G, where the person standing on the curb (with tracker label 28) has moved slightly since it was detected as a sleeping tracker, yet will not lose the status of being a sleeping object tracker. However, when the car (with tracker label 97) drives across and intersects with the person, the person changes its pose relatively significantly, thus the sleeping tracker is turned into normal after an "awake check." However, even in this case, the person's tracker will be marked as "awake from sleep" since the normal tracker and the old sleeping object tracker overlap largely. In addition, the bounding box of the normal tracker is enlarged (as a union of two bounding boxes associated with the normal and the sleeping object tracker). Note that since the person's tracker is marked as "awake from sleep," it does not have to vanish significantly to be detected as a sleeping tracker and it is soon turned into a sleeping object tracker again. Later, as shown in FIG. 21G, the person jumped down and starts to move, in which case the sleeping object tracker is again turned into normal. A similar example is shown in FIG. 21H-21M.

Figure 22A:
FIG. 22A-22P are illustrations of video frames of an environment in which objects are detected and tracked, in accordance with some examples.
Figure 22B:
Figure 22C:
Figure 22D:
Figure 22E:
Figure 22F:

An example showing interactions of sleeping objects is provided and the tracking results are shown in FIG. 22A-

Figure 22G:
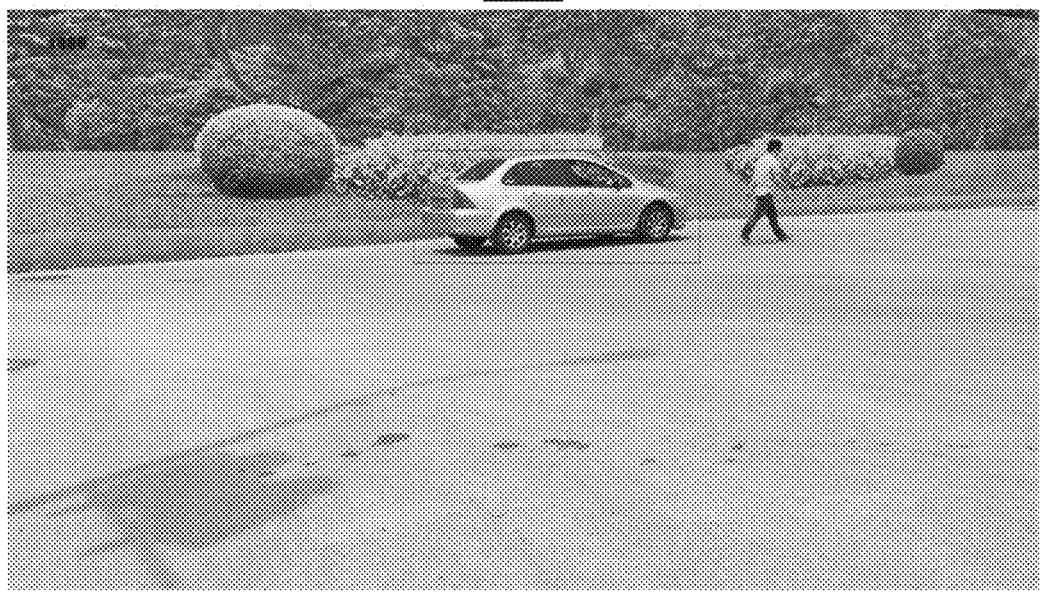
Figure 22H:
Figure 22I:
Figure 22J:
Figure 22K:
Figure 22L:
Figure 22M:
Figure 22N:
Figure 22O:
Figure 22P:
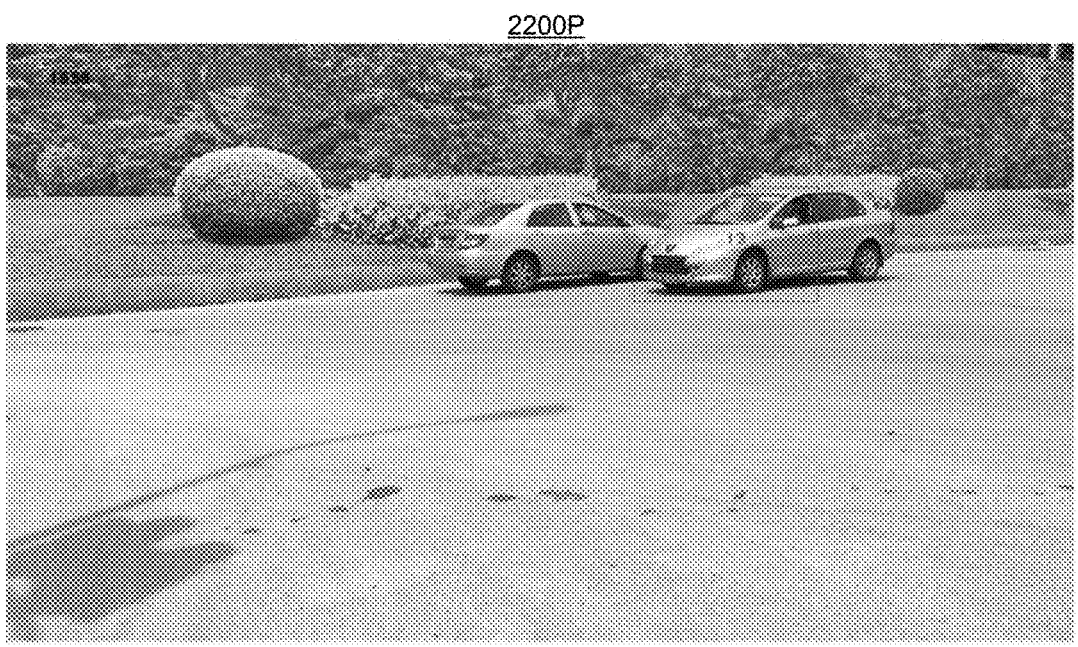
Figure 23A:
FIG. 23A-23F are illustrations of video frames of an environment in which objects are detected and tracked, in accordance with some examples.
Figure 23B:
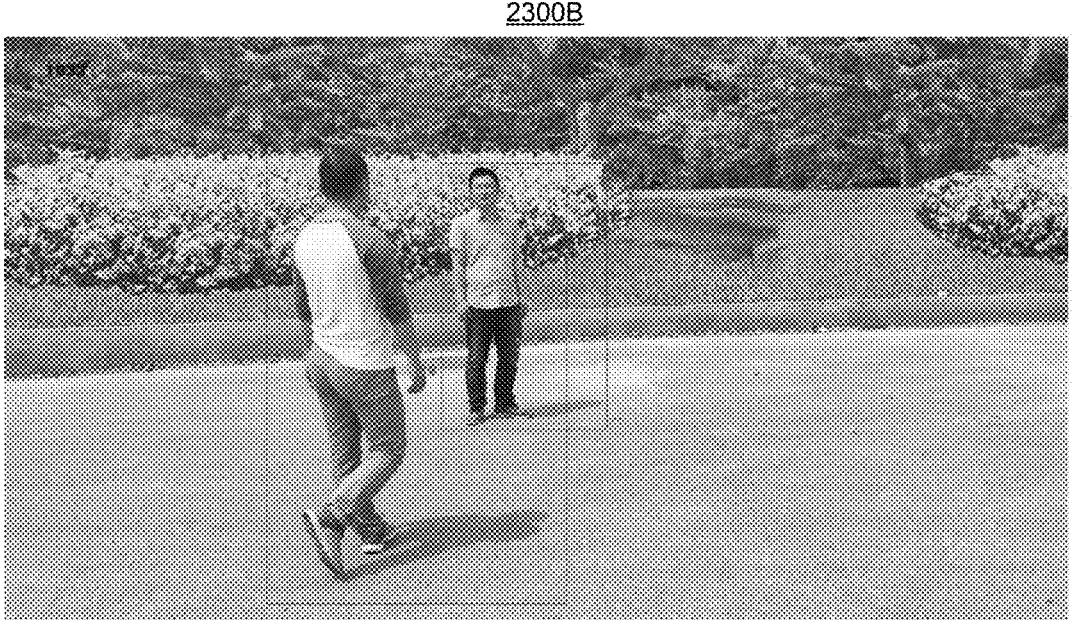
Figure 23C:
Figure 23D:
Figure 23E:
Figure 23F:

FIG. 22P. A car is firstly established as a sleeping object tracker (with tracker label 1). A person's tracker (with tracker label 9) later turned from a normal tracker to a SOT, which belongs to a region the car occupies. The person later starts to move, and since the moving normal tracker belongs to both sleeping object trackers, the more relevant sleeping object tracker (which is the person) is derived as the only one associated with the normal tracker. Due to the correct association, the person is correctly tracked by converting the sleeping object tracker (label 9) to a normal tracker while the other sleeping object tracker (label 1) is kept unchanged. The results using the anchor method are shown in FIG. 22G-FIG. 22I, where the normal tracker is incorrectly associated with other sleeping object tracker (label 1), thus there is no "awake check" that will lead to the correct checking of the normal tracker. The normal tracker takes time to turn from a newly created tracker to a tracker that is ready for output. This delays the tracking time for the person. Meanwhile, since the person is not associated with the sleeping object tracker (label 9) and it is not matching the bounding box size of sleeping object tracker (label 1), it has been assigned with a new tracker label.

Another example showing interactions of sleeping objects are provided and the tracking results using the proposed sleeping object tracking techniques are shown in FIG. 22J-FIG. 22O. Whenever there is an interaction, the appearance model reconfirm process should not be invoked. An example of application of the anchor method is shown in FIG. 22P, in which case if the interaction does consider the case that a normal tracker turns into a sleeping object tracker, the "appearance reconfirm" process considers the sleeping object tracker (label 5) to be changed and thus removes the sleeping object tracker. In the proposed method, such a case will not invoke "appearance re-confirm" process.

Another example of the proposed method is shown in FIG. 23A-FIG. 23F, where many kinds of interactions with a normal tracker do not ruin the sleeping object tracker. After the interaction, the sleeping object tracker is still well maintained.

The blob detection and tracking operations discussed herein may be implemented using compressed video or using uncompressed video frames (before or after compression). An example video encoding and decoding system includes a source device that provides encoded video data to be decoded at a later time by a destination device. In particular, the source device provides the video data to destination device via a computer-readable medium. The source device and the destination device may comprise any of a wide range of devices, including desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or the like. In some cases, the source device and the destination device may be equipped for wireless communication.

The destination device may receive the encoded video data to be decoded via the computer-readable medium. The computer-readable medium may comprise any type of medium or device capable of moving the encoded video data from source device to destination device. In one example, computer-readable medium may comprise a communication medium to enable source device to transmit encoded video data directly to destination device in real-time. The encoded video data may be modulated according to a communication standard, such as a wireless communication protocol, and transmitted to destination device. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device to destination device.

In some examples, encoded data may be output from output interface to a storage device. Similarly, encoded data may be accessed from the storage device by input interface. The storage device may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, the storage device may correspond to a file server or another intermediate storage device that may store the encoded video generated by source device. Destination device may access stored video data from the storage device via streaming or download. The file server may be any type of server capable of storing encoded video data and transmitting that encoded video data to the destination device. Example file servers include a web server (e.g., for a website), an FTP server, network attached storage (NAS) devices, or a local disk drive. Destination device may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from the storage device may be a streaming transmission, a download transmission, or a combination thereof.

The techniques of this disclosure are not necessarily limited to wireless applications or settings. The techniques may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications. In some examples, system may be configured to support one-way or two-way video transmission to support applications such as video streaming, video playback, video broadcasting, and/or video telephony.

In one example the source device includes a video source, a video encoder, and a output interface. The destination device may include an input interface, a video decoder, and a display device. The video encoder of source device may be configured to apply the techniques disclosed disclosed herein. In other examples, a source device and a destination device may include other components or arrangements. For example, the source device may receive video data from an external video source, such as an external camera. Likewise, the destination device may interface with an external display device, rather than including an integrated display device.

The example system above merely one example. Techniques for processing video data in parallel may be performed by any digital video encoding and/or decoding device. Although generally the techniques of this disclosure are performed by a video encoding device, the techniques may also be performed by a video encoder/decoder, typically referred to as a "CODEC." Moreover, the techniques of this disclosure may also be performed by a video preprocessor. Source device and destination device are merely examples of such coding devices in which source device generates coded video data for transmission to destination device. In some examples, the source and destination devices may operate in a substantially symmetrical manner such that each of the devices include video encoding and decoding components. Hence, example systems may support one-way or two-way video transmission between video devices, e.g., for video streaming, video playback, video broadcasting, or video telephony.

The video source may include a video capture device, such as a video camera, a video archive containing previously captured video, and/or a video feed interface to receive video from a video content provider. As a further alternative, the video source may generate computer graphics-based data as the source video, or a combination of live video, archived video, and computer-generated video. In some cases, if video source is a video camera, source device and destination device may form so-called camera phones or video phones. As mentioned above, however, the techniques described in this disclosure may be applicable to video coding in general, and may be applied to wireless and/or wired applications. In each case, the captured, pre-captured, or computer-generated video may be encoded by the video encoder. The encoded video information may then be output by output interface onto the computer-readable medium.

As noted, the computer-readable medium may include transient media, such as a wireless broadcast or wired network transmission, or storage media (that is, non-transitory storage media), such as a hard disk, flash drive, compact disc, digital video disc, Blu-ray disc, or other computer-readable media. In some examples, a network server (not shown) may receive encoded video data from the source device and provide the encoded video data to the destination device, e.g., via network transmission. Similarly, a computing device of a medium production facility, such as a disc stamping facility, may receive encoded video data from the source device and produce a disc containing the encoded video data. Therefore, the computer-readable medium may be understood to include one or more computer-readable media of various forms, in various examples.

In the foregoing description, aspects of the application are described with reference to specific embodiments thereof, but those skilled in the art will recognize that the invention is not limited thereto. Thus, while illustrative embodiments of the application have been described in detail herein, it is to be understood that the inventive concepts may be otherwise variously embodied and employed, and that the appended claims are intended to be construed to include such variations, except as limited by the prior art. Various features and aspects of the above-described invention may be used individually or jointly. Further, embodiments can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The various illustrative logical blocks, modules, circuits, and algorithm steps described in connection with the embodiments disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any any of the foregoing structure, any combination of the foregoing structure, or any other structure or apparatus suitable for implementation of the techniques described herein. In addition, in some some aspects, the functionality described herein may be provided within dedicated software modules or hardware modules configured for encoding and decoding, or incorporated in a combined video encoder-decoder (CODEC).

What is claimed is:

1. A method of maintaining blob trackers for video frames, the method comprising:
   identifying, using at least one processor, a first blob tracker maintained for a current video frame, wherein the first blob tracker is associated with a blob detected in one or more video frames, the blob including pixels of at least a portion of a foreground object in the one or more video frames;
   determining the first blob tracker is a first type of tracker, wherein trackers of the first type are associated with objects that have transitioned at least partially into a background model;
   identifying one or more interactions between the first blob tracker and at least one other blob tracker, the one or more interactions including at least an amount of intersection between a bounding region of the first blob tracker and a bounding region of the at least one other blob tracker, the at least one other blob tracker being the first type of tracker or a second type of tracker, wherein trackers of the second type are not associated with objects that have transitioned at least partially into the background model;
   modifying a characteristic of the first blob tracker based on the identified one or more interactions; and
   determining whether to track the blob using the first blob tracker based on modifying the characteristic of the first blob tracker.

2. The method of claim 1, wherein modifying the characteristic of the first blob tracker includes transitioning the first blob tracker from the first type of tracker to the second type of tracker.

3. The method of claim 1, wherein modifying the characteristic of the first blob tracker includes updating an appearance model of the first blob tracker.

4. The method of claim 1, wherein the one or more identified interactions include an interaction between the first blob tracker and a second blob tracker having the second type, and wherein identifying the interaction comprises:
   determining, for a first previous video frame, the second blob tracker is not intersecting the first blob tracker, wherein the first previous video frame is obtained earlier in time than the current video frame;
   determining, for a second previous video frame, the second blob tracker is intersecting the first blob tracker, wherein the second previous video frame is obtained earlier in time than the current video frame and later in time than the first previous video frame; and
   determining, for the current video frame, the second blob tracker is not intersecting the first blob tracker.

5. The method of claim 4, wherein, in response to identifying the interaction between the first blob tracker and the second blob tracker having the second type, modifying the characteristic of the first blob tracker includes:
   updating an appearance model of the first blob tracker using information of the current video frame, the updated appearance model including at least one or more of a color feature space or a color mass center of pixels of the current video frame included in a previous bounding region of the first blob tracker.

6. The method of claim 5, further comprising:
   comparing the updated appearance model of the first blob tracker to a previous appearance model of the first blob tracker, the previous appearance model including at least one or more of a color feature space or a color mass center of pixels of a previous video frame included in the previous bounding region of the first blob tracker; and
   determining whether to transition the first blob tracker from the first type to the second type based on the comparison of the updated appearance model to the previous appearance model.

7. The method of claim 6, further comprising:
   transitioning the first blob tracker from the first type to the second type when the updated appearance model is not within a threshold difference from the previous appearance model.

8. The method of claim 6, further comprising:
   maintaining the first blob tracker as the first type when the updated appearance model is within a threshold difference from the previous appearance model.

9. The method of claim 1, wherein the one or more identified interactions include an interaction between the first blob tracker and a second blob tracker having the second type, and wherein identifying the interaction comprises:
   determining, for a first previous video frame, the second blob tracker is not intersecting the first blob tracker, wherein the first previous video frame is obtained earlier in time than the current video frame;
   determining, for a second previous video frame, the second blob tracker is intersecting the first blob tracker, wherein the second previous video frame is obtained earlier in time than the current video frame and later in time than the first previous video frame; and
   determining, for the current video frame, the second blob tracker is to be transitioned from the second type of tracker to the first type of tracker.

10. The method of claim 9, wherein, in response to identifying the interaction between the first blob tracker and the second blob tracker having the second type, modifying the characteristic of the first blob tracker includes:
    updating an appearance model of the first blob tracker using information of the current video frame, the updated appearance model including at least one or more of a color feature space or a color mass center of pixels of the current video frame included in a previous bounding region of the first blob tracker.

11. The method of claim 9, further comprising:
    transitioning the second blob tracker from the second type of tracker to the first type of tracker.

12. The method of claim 1, wherein the one or more identified interactions include an interaction between the first blob tracker and a second blob tracker having the second type, and wherein identifying the interaction comprises:
    generating, for a first previous video frame, the second blob tracker within a region covered by the first blob tracker, wherein the second blob tracker is generated as a new type of tracker;
    transitioning, for a second previous video frame, the second blob tracker from the new type of tracker to the second type of tracker, wherein trackers of the second type and associated blobs are output as identified blob tracker-blob pairs, and wherein the second previous video frame is obtained earlier in time than the current video frame and later in time than the first previous video frame; and
    determining, for the current video frame, the second blob tracker is not intersecting the first blob tracker.

13. The method of claim 12, wherein, in response to identifying the interaction between the first blob tracker and the second blob tracker having the second type, modifying the characteristic of the first blob tracker includes:
comparing a size of the second blob tracker to a size of the first blob tracker; and
determining whether to remove the first blob tracker from a list of maintained blob trackers based on comparing the size of the second blob tracker to the size of the first blob tracker.

14. The method of claim 13, further comprising:
removing the first blob tracker from the list of maintained blob trackers when the size of the second blob tracker is larger than a threshold size percentage of the size of the first blob tracker.

15. The method of claim 14, further comprising:
assigning a tracker label of the first blob tracker to the second blob tracker.

16. The method of claim 13, further comprising:
maintaining the first blob tracker in the list of maintained blob trackers as a tracker of the first type when the size of the second blob tracker is not larger than a threshold size percentage of the size of the first blob tracker.

17. The method of claim 1, wherein the one or more identified interactions include an interaction between the first blob tracker and a second blob tracker having the second type, and wherein identifying the interaction comprises:
generating, for a first previous video frame, the second blob tracker within a region covered by the first blob tracker; and
determining, for the current video frame, the second blob tracker is no longer associated with any blobs.

18. The method of claim 17, wherein, in response to identifying the interaction between the first blob tracker and the second blob tracker having the second type, modifying the characteristic of the first blob tracker includes:
updating an appearance model of the first blob tracker using information of the current video frame, the updated appearance model including at least one or more of a color feature space or a color mass center of pixels of the current video frame included in a previous bounding region of the first blob tracker.

19. The method of claim 1, wherein the one or more identified interactions include an interaction between the first blob tracker and at least one blob tracker having the first type, and wherein modifying the characteristic of the first blob tracker includes:
determining an amount of intersection between the first blob tracker and the at least one blob tracker; and
updating an appearance model of the first blob tracker when the amount of intersection is less than an intersection threshold, the updated appearance model including at least one or more of a color feature space or a color mass center of pixels of the current video frame included in a previous bounding region of the first blob tracker.

20. The method of claim 1, wherein the one or more identified interactions include an interaction between the first blob tracker and at least one blob tracker having the first type, and wherein modifying the characteristic of the first blob tracker includes:
determining an amount of intersection between the first blob tracker and the at least one blob tracker; and
removing the first blob tracker from a list of maintained blob trackers when the amount of intersection is greater than an intersection threshold.

21. The method of claim 20, further comprising:
maintaining the at least one blob tracker in the list of maintained blob trackers.

22. The method of claim 1, wherein the one or more identified interactions include an interaction between the first blob tracker and at least two blob trackers having the first type, and wherein modifying the characteristic of the first blob tracker includes:
determining an amount of intersection between the first blob tracker and the at least two blob trackers;
generating a union bounding region when the amount of intersection is greater than a maximum intersection threshold, the union bounding region including a union of the bounding region of the first blob tracker and at least two bounding regions of the at least two blob trackers; and
replacing the bounding region of the first blob tracker with the union bounding region.

23. The method of claim 22, further comprising:
removing the at least two blob trackers from a list of maintained blob trackers.

24. The method of claim 1, further comprising:
determining the first blob tracker has not interacted with any other blob trackers for a threshold number of video frames; and
updating an appearance model of the first blob tracker when the first blob tracker has not interacted with any other blob trackers for the threshold number of video frames, the updated appearance model including at least one or more of a color feature space or a color mass center of pixels of the current video frame included in a previous bounding region of the first blob tracker.

25. The method of claim 1, wherein determining the first blob tracker is the first type of tracker includes:
comparing the bounding region of the first blob tracker to a previous bounding region of the first blob tracker for a previous video frame, the bounding region including a current bounding region of the first blob tracker for the current video frame, and the previous video frame being obtained earlier in time than the current video frame;
determining the current bounding region has decreased in size as compared to a size of the previous bounding region; and
determining a first color characteristic of pixels of the current video frame included in the previous bounding region is within a threshold difference from a second color characteristic of pixels of the previous video frame included in the previous bounding region.

26. The method of claim 1, wherein the second type of tracker includes at least one or more of a new tracker generated for the current frame, a tracker that is output as an identified blob tracker-blob pair with an associated blob, a tracker that is not associated with any blob in the current frame, and a tracker associated with a blob merged with at least one other blob.

27. An apparatus for maintaining blob trackers for video frames, comprising:
a memory configured to store video data associated with the video frames; and
a processor configured to:
identify a first blob tracker maintained for a current video frame, wherein the first blob tracker is associated with a blob detected in one or more video frames, the blob including pixels of at least a portion of a foreground object in the one or more video frames;

determine the first blob tracker is a first type of tracker, wherein trackers of the first type are associated with objects that have transitioned at least partially into a background model;

identify one or more interactions between the first blob tracker and at least one other blob tracker, the one or more interactions including at least an amount of intersection between a bounding region of the first blob tracker and a bounding region of the at least one other blob tracker, the at least one other blob tracker being the first type of tracker or a second type of tracker, wherein trackers of the second type are not associated with objects that have transitioned at least partially into the background model;

modify a characteristic of the first blob tracker based on the identified one or more interactions; and determine whether to track the blob using the first blob tracker based on modifying the characteristic of the first blob tracker.

28. The apparatus of claim 27, wherein modifying the characteristic of the first blob tracker includes transitioning the first blob tracker from the first type of tracker to the second type of tracker.

29. The apparatus of claim 27, wherein modifying the characteristic of the first blob tracker includes updating an appearance model of the first blob tracker.

30. The apparatus of claim 27, wherein the second type of tracker includes at least one or more of a new tracker generated for the current frame, a tracker that is output as an identified blob tracker-blob pair with an associated blob, a tracker that is not associated with any blob in the current frame, and a tracker associated with a blob merged with at least one other blob.

* * * * *